US009348930B2

(12) United States Patent
Ali

(10) Patent No.: US 9,348,930 B2
(45) Date of Patent: May 24, 2016

(54) WEB-BASED APPLICATION OR SYSTEM FOR MANAGING AND COORDINATING REVIEW-ENABLED CONTENT

(76) Inventor: Junaid Ali, Lakewood, OH (US)

( * ) Notice: Subject to any disclaimer, the term of this patent is extended or adjusted under 35 U.S.C. 154(b) by 689 days.

(21) Appl. No.: 11/674,662

(22) Filed: Feb. 13, 2007

(65) Prior Publication Data

US 2007/0192333 A1 Aug. 16, 2007

Related U.S. Application Data

(60) Provisional application No. 60/772,809, filed on Feb. 13, 2006, provisional application No. 60/889,503, filed on Feb. 12, 2007.

(51) Int. Cl.
| | | |
|---|---|---|
| *G06F 17/30* | (2006.01) | |
| *G06F 7/00* | (2006.01) | |
| *G06Q 10/00* | (2012.01) | |
| *G06F 15/16* | (2006.01) | |
| *G06Q 30/02* | (2012.01) | |

(52) U.S. Cl.
CPC ............ *G06F 17/3089* (2013.01); *G06Q 30/02* (2013.01)

(58) Field of Classification Search
CPC ................................................ G06F 17/30011
USPC ........... 707/102, 104.1; 725/10; 709/219, 202
See application file for complete search history.

(56) References Cited

U.S. PATENT DOCUMENTS

| | | |
|---|---|---|
| 5,960,411 A | 9/1999 | Hartman et al. |
| 6,202,051 B1 | 3/2001 | Woolston |
| 2002/0026386 A1 | 2/2002 | Walden |
| 2002/0040311 A1 | 4/2002 | Douglass et al. |
| 2002/0046203 A1 | 4/2002 | Siegel et al. |
| 2002/0112035 A1* | 8/2002 | Carey et al. .................. 709/219 |
| 2002/0116372 A1* | 8/2002 | Ladouceur et al. ............... 707/3 |
| 2002/0138481 A1* | 9/2002 | Aggarwal et al. ................ 707/6 |
| 2002/0198784 A1* | 12/2002 | Shaak et al. ................... 705/26 |
| 2003/0055723 A1* | 3/2003 | English ........................... 705/14 |
| 2003/0074277 A1* | 4/2003 | Foutz .............................. 705/26 |
| 2003/0208624 A1 | 11/2003 | Grossman |

(Continued)

FOREIGN PATENT DOCUMENTS

| | | |
|---|---|---|
| WO | 0153922 | 7/2001 |
| WO | WO 01/53922 | 7/2001 |

(Continued)

OTHER PUBLICATIONS

Ye Diana Wang; An overview of online trust: Concepts, elements, and Implications; 2005; Elsevier; pp. 105-124.*

*Primary Examiner* — Mariela Reyes
*Assistant Examiner* — Jermaine Mincey

(57) ABSTRACT

A network based review management system and method for managing a plurality of enrolled websites and a plurality of review content items includes a network, a first database of enrolled websites connected to the network, and a second database of review content items connected to the network. Each of the enrolled websites of the first database is associated with one or more review content items of the second database. When one of the enrolled websites is accessed over the network, the one or more review content items from the second database are delivered over the network to the accessed one of the enrolled websites for viewing thereof and/or one or more review content items is added over the network to the second database through the accessed one of the enrolled websites.

23 Claims, 37 Drawing Sheets

A WS specifies who they are (in relation to a ICS) and so does an ADV. In addition both identify acceptable partners

(56) References Cited

U.S. PATENT DOCUMENTS

| | | | |
|---|---|---|---|
| 2004/0034631 A1* | 2/2004 | Julliard et al. | 707/4 |
| 2004/0167796 A1* | 8/2004 | Lynch et al. | 705/1 |
| 2004/0249786 A1* | 12/2004 | Dabney et al. | 707/1 |
| 2005/0004880 A1 | 1/2005 | Musgrove et al. | |
| 2005/0033657 A1* | 2/2005 | Herrington et al. | 705/26 |
| 2005/0132042 A1 | 6/2005 | Cryer | |
| 2005/0138078 A1* | 6/2005 | Christenson et al. | 707/104.1 |
| 2005/0187967 A1* | 8/2005 | Couch et al. | 707/102 |
| 2005/0193055 A1* | 9/2005 | Angel et al. | 709/202 |
| 2005/0234877 A1* | 10/2005 | Yu | 707/3 |
| 2005/0251458 A1 | 11/2005 | Perkowski | |
| 2005/0256616 A1* | 11/2005 | Rhoads | 701/1 |
| 2005/0289582 A1* | 12/2005 | Tavares et al. | 725/10 |
| 2007/0078699 A1* | 4/2007 | Scott et al. | 705/10 |

FOREIGN PATENT DOCUMENTS

| | | |
|---|---|---|
| WO | 2005017656 | 2/2005 |
| WO | WO 2005/017656 | 2/2005 |

* cited by examiner

Website Enrollment
Start >Enrollment >Website

90 → name: [Website A]

baseURL [http//www.websiteAexa]

contactName [John Brown]

contactEmail [JohnBrown@websiteAlex]

Insert Cancel

Website Types    Advertiser Types    Item Catalog

Website Types

[Small eRetailer] [✓]

Link Selected Type

92 →

Website Types

[Large eRetailer] [✓]

Link Selected Type

| type | |
|---|---|
| Small eRetailer | Delete |
| Large eRetailer | Delete |

— Web types selected for website

Advertiser Types selected for exclusion for website

94 →

[eRetailer] [✓]

⊙ Exclude
○ Include

Link Selected Type

| Type | Selection | |
|---|---|---|
| eRetailer | E | Delete |

FIG. 5

Website Enrollment — 96
Start >Enrollment >Website

Name: Website A
baseURL: http://www.websiteAexample.com
contactName:JohnBrown
contactEmail:JohnBrown@websiteAexample.com
Edit Delete New Website Types    Advertiser Types    Item Catalog Item Catalog Select Sections of the Item Catalog
- ☑ Electronics
  - ☑ Digital Cameras
    - ☑ 5MP
      - ☑ Z505AA
    - ☑ 4MP
      - ☑ DSC55
  - ☐ Film Cameras
    - ☐ 35MM
    - ☐ Other
- ☐ Computers
  - ☑ Desktops
  - ☐ Notebooks
  - ☑ Accessories Save Selections

FIG. 6

Adverts Selected for Distribution to Member Website 240

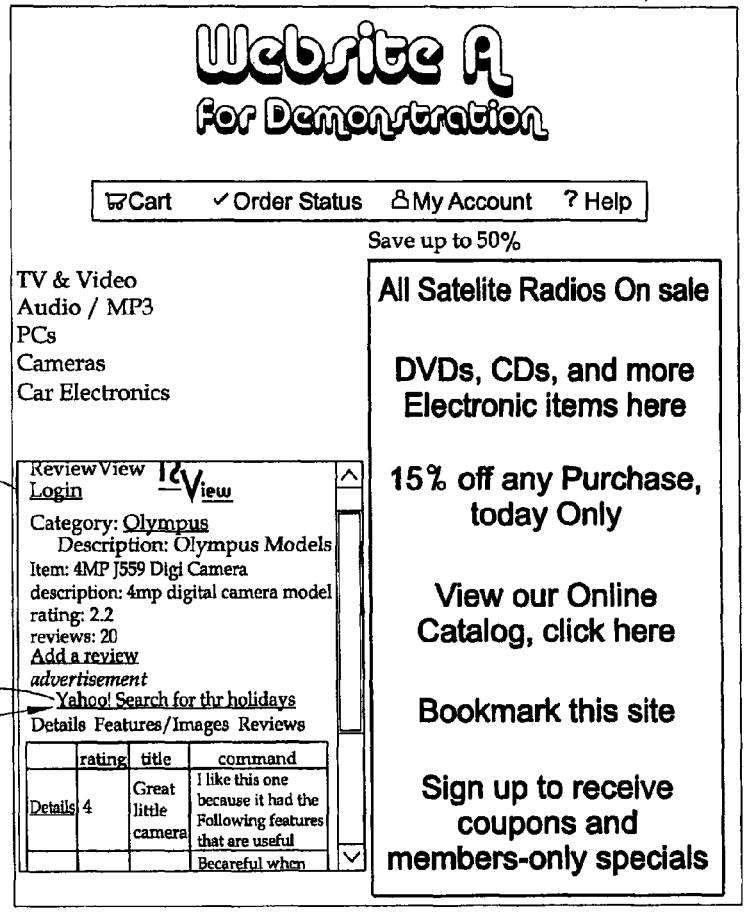

Member website is Website A

Website Type Selected by Website A is:
    Retailer

Advertiser Type Selected by Website A is:
    Retailer (exclude)

244 —
Advertisement for Member Advertiser Yahoo

Advertiser Type Selection by Yahoo is:
    Portal
    Classified Ads

242 —
There is no Website Type Selection by Yahoo

Since Yahoo is not a Retailer advertiser type, their advert was selected for distribution to Website A Advertisement for Member Advertiser Best Buy Advertiser Type Selection by Best Buy:
    Retailer Website Type Selection by Best Buy:
    Retailer (exclude)

246

This Advert for Best Buy was not selected for advert distribution to Website A because the relevancy matching prevented it since Website A excluded Retailer Advertising Types. Also note that even if Website A did not exclude Retailer types, this advert still would not have been selected since Best Buy excluded Retailer Website Types.

FIG. 8

A WS specifies who they are (in relation to a ICS) and so does an ADV. In addition both identify acceptable partners Basic AT

| Target Option | ALL |
|---|---|
| ICS | Electronics<br>　　Digital Cameras<br>　　Camcorders<br>　　MP3 Players |
| Types List | Retailer<br>Portal |

```
<iframe frameborder="yes" height="240" name="sample" scrolling="auto" src="http://
www.rms997.com/index.html?ws=1234" title="Sample IFRAME" width="215"></
iframe>
```

FIG. 42

```
<a href="page2.htm?wsid=1234">Page 2</a>
```

FIG. 43

WEB-BASED APPLICATION OR SYSTEM FOR MANAGING AND COORDINATING REVIEW-ENABLED CONTENT

CROSS REFERENCE

This application claims priority of U.S. Provisional Patent Application Ser. No. 60/772,809 filed Feb. 13, 2006 and U.S. Provisional Patent Application Ser. No. 60/889,503 filed Feb. 12, 2007 both expressly incorporated herein by reference.

BACKGROUND

The present invention relates generally to methods and systems to share, disseminate, and contribute review-enabled content. A central application is employed that implements review and ratings functionality.

In today's marketplace, consumers are flooded with information from various sources regarding desired goods and services and other data. Some of this information is biased in some manner based at least in part upon the party responsible for dissemination of the information. In some circumstances, the information provided to consumers is in the form of advertisements and other promotional materials designed to influence the consumer. Similarly, information can be prejudiced against one or more goods and/or services providers. This information can originate from a competitive good and/or service provider or a third party. Thus, a consumer is left to determine if the information they are receiving is influenced in any way.

In contrast to parties interested in promoting their own products or services or discounting others goods or services, consumers can disseminate information. Typically, consumers have no vested interest in providing information to others regarding goods and/or services. In many cases, consumers wish to relate their own personal experience and constructive feedback. Such information can be provided to other consumers in order to provide help regarding the quality, service, support, technical aspects, etc. of a good or service. Since consumers share the common interest of receiving value, quality, product support, etc. from those providing the goods or services, there is an inherent trust level that accompanies the information disseminated from one consumer to another.

However, the information provided by a consumer can have some inherent flaws. For example, this information can be provided by a consumer who was unfairly treated, had some misconceptions regarding the product and/or service, had some bias against the good or service provider, etc. In addition, a consumer can have shortcomings related to their exposure to the overall marketplace, technical expertise, ability to articulate, etc. Thus, information provided by a consumer should be considered in the context of their personal experience.

In one example, a first consumer has purchased only a single type of digital camera and did no research before making such a purchase. In another example, a second consumer has purchased several digital cameras from a plurality of various manufacturers and is familiar with the technical features of each product. It is likely the information provided by the first consumer will have shortcomings associated with it based on the limited personal experience of the first consumer. Thus, this information may not be as valuable to other consumers. In contrast, the information provided by the second consumer will likely be of greater value to other consumers.

Information provided to consumers from other consumers can be particularly appropriate when a consumer is researching a specific good or service. In one example, a consumer can research a good on one or more websites via the Internet. Such websites can be created by the manufacturer of the good (or provider of the service) or by one or more associated sales channels. The website content can include technical aspects of the good or service, a list of features, price, service options, etc. The consumer can review this information and try to determine which good or service best suits their needs.

In order to make a more informed purchasing decision, information from one or more consumers (in addition to information from the good or service provider) can give a consumer more balanced and thus more helpful information. The bias of a manufacturer can be tempered by the relative uninfluenced information provided by consumers. Providing such information in a web based setting can be particularly helpful to a consumer trying to determine which good or service to select for purchase since web based searches tend to provide a high density of data for the consumer to view.

There is a need for improved systems and methods that allow consumers to receive information from one or more disparate consumers in a web based setting regarding one or more items. This information needs to have additional data associated therewith to allow a consumer to determine the value of the information. In addition, if desired, a consumer should be able to provide information regarding one or more items for others to review.

SUMMARY

According to one aspect, a network based review management method is provided for managing a plurality of enrolled websites and a plurality of items. More particularly, in accordance with this aspect, a first database of enrolled websites and a second database of items are provided. Each of the enrolled websites is associated with one or more items. One of the enrolled websites is accessed on a network. Said one of the enrolled websites is associated with said one or more of the items. Said one or more items from the second database is delivered over the network to the accessed one of the enrolled websites for viewing thereof and/or one or more items is added over the network to the second database through the accessed one of the enrolled websites.

According to another aspect, a network based review management system is provided for managing a plurality of enrolled websites and a plurality of items. More particularly, in accordance with this aspect, the review management system includes a network, a first database of enrolled websites connected to the network, and a second database of items connected to the network. Each of the enrolled websites of the first database is associated with one or more items of the second database. When one of the enrolled websites is accessed over the network, the one or more items of the second database associated with the accessed one on the enrolled websites are viewable through a single frame of one or more web documents of the accessed website.

According to yet another aspect, a method utilized to identify one or more advertisements that are eligible for distribution to one or more websites within a review management system is provided. More particularly, in accordance with this aspect, for a website administrator associated with each of the one or more websites enrolled in the review management system, wherein each website includes one or more web documents, software code is implemented to create a web document frame in each of the one or more web documents in each of the one or more websites. One or more partner definition criteria are selected that identify the website. Zero or more partner relevancy criteria are selected that define one or more acceptable advertiser partners for the website. One or more item catalog subsets are selected and are relevant to web content that define which review management content will be prioritized and/or filtered for distribution to the website. For one or more advertisers enrolled in the review management system, wherein each advertiser is associated with one or more advertisements, one or more partner definition criteria are selected that identify each of the one or more advertisers. Zero or more partner relevancy criteria are selected that define one or more acceptable websites for the one or more advertisers. One or more acceptable advertiser partners are determined for the website by comparing the one or more advertiser partner definition criteria for each of the one or more advertisers to the website partner relevancy criteria. The review content is delivered to each website via the frame within the one or more web documents within each of the one or more websites. The web content is based at least in part upon the partner definition criteria, the partner relevancy criteria, and the item catalog subsets.

BRIEF DESCRIPTION OF THE DRAWINGS

FIG. 5 illustrates a website enrollment page that allows a user to enroll a website in the review management system in accordance with an exemplary embodiment;

FIG. 6 illustrates a website enrollment page that allows a user to specify sections of an item catalog in accordance with an exemplary embodiment;

FIG. 8 illustrates an example of advertisements selected for distribution on a member website in accordance with an exemplary embodiment;

FIG. 42 illustrates exemplary review management system access coding in accordance with an exemplary embodiment;

FIG. 43 illustrates website identification coding in a review management system hyperlink in accordance with an exemplary embodiment;

DETAILED DESCRIPTION

Figure 1:
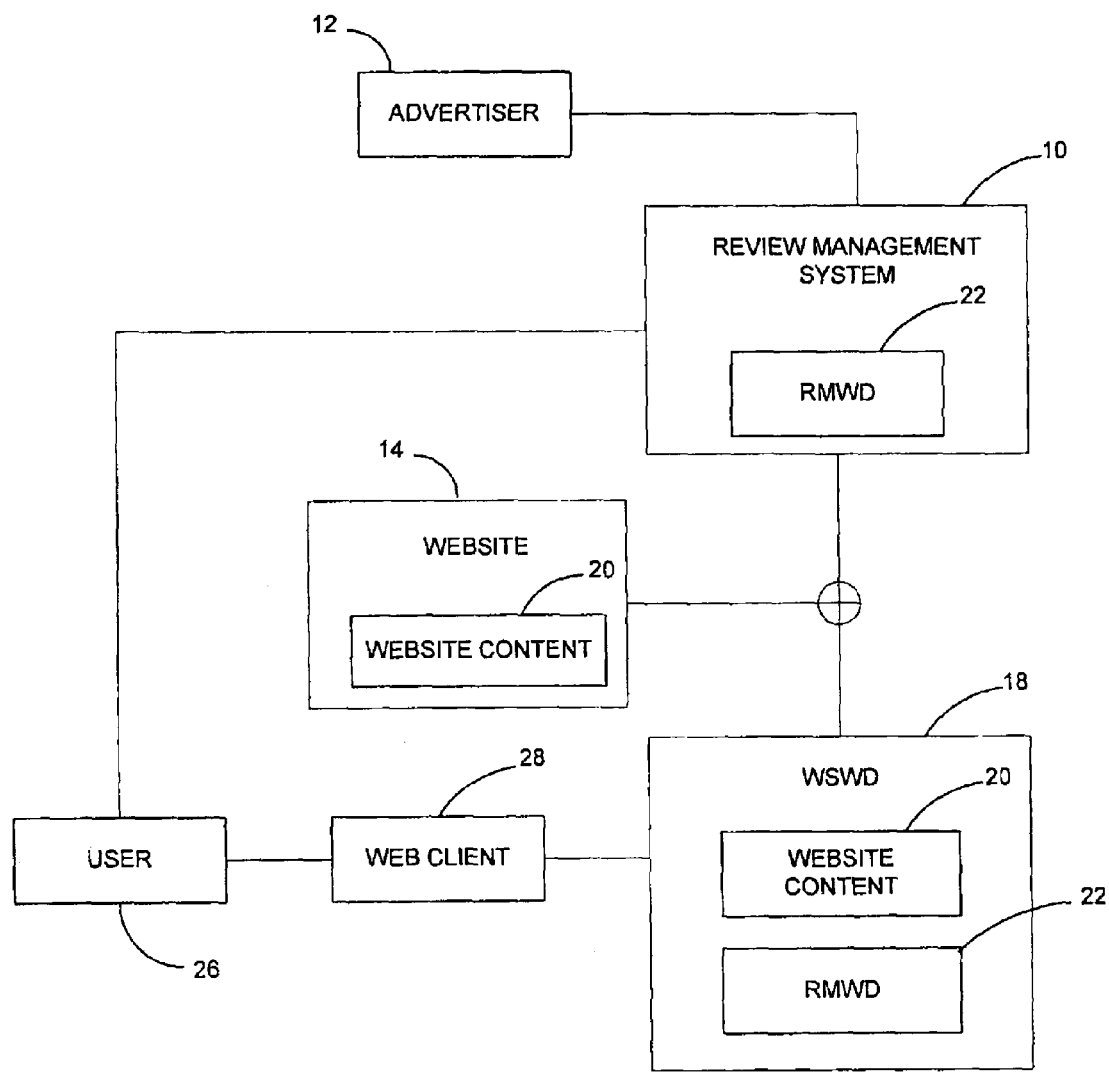
FIG. 1 is a block diagram of a distributed and automated review management system in accordance with an exemplary embodiment.

FIG. 1 shows a review management system 10 in accordance with an exemplary embodiment that allows an advertisement (not shown) of an advertiser 12 and a website 14 to be coupled for display to one or more users. A website web document 18 contains website content 20 and review management web document 22 (wherein an advertisement may appear). A user 26 can employ a web client 28 to access the website web document 18 and display the information contained therein. The review management system (RMS) 10 is a reviews and ratings system that can be accessed by a user directly or indirectly (via a website, for example) in a network such as the Internet. The review management system 10 can provide a plurality of useful functionalities for a user, one or more websites, one or more advertisers, etc.

A user can access the RMS 10 via a direct (DAM) and/or indirect (IAM) access method to generally utilize the RMS 10 functionality. In one approach, the user 26 accesses the RMS 10 directly. In another approach, the user 26 access the RMS 10 via the web client 28 to indirectly access the RMS 10. It is to be appreciated that there will be many users accessing and utilizing the RMS 10 system functionality both directly and indirectly.

In one aspect, the user 26 can also enroll in the RMS 10 as a member user. Such user enrollment can occur via a direct access method (DAM) and/or an indirect access method (IAM). A member user may have additional functionality available to him or her than would a user who is not a member user. For example, in one embodiment, only a member user may rate externally generated content in the RMS 10. In another example, the user 26 must be a member user to generate user generated content. Also there may be user settings that are only activated when a user logs in to the system 10 as a member user. An example of a user setting is when a user logs in and accesses item reviews that the user saved in a user account previously. Another user setting could be when a user accesses content prioritized and/or filtered based on user preferences that said user specifies in the user setting.

Any such limitations on user or other functionality are optional implementations in the RMS 10. Any reference to a user in this documentation also refers to a member user unless otherwise indicated. However, since a member user has additional functionality available compared to a user, references to a member user may not apply to a user unless said user is logged into the system as a member user.

In addition, a review management administrator can be employed to perform various administrative functions for the RMS 10. As described herein, interactions or activities performed by the administrator of an entity (for example a website administrator or others) may refer to the entity as performing the interactions or activities which implies that the administrator is performing said interactions or activities. For example, instead of specifying the website administrator of a website changes the enrollment options for the website, this disclosure may specify that the website changes the enrollment options which attains equivalent results regardless of whether the website or website administrator modifies the enrollment options for website.

Additionally, there may be external systems or locations not specifically identified in this document that receive content distributed from the RMS 10. As described herein, such locations or systems are referred to as distribution destination. The distribution destination can be charged fees for the content distribution. In one approach, other external entities of the RMS 10 may collect commissions for such distribution.

As is known in the art, there are pluralities of reviews and ratings and also other general functionalities that can be implemented in a network-enabled system such as the RMS 10. Functionalities for a user can include navigating an item catalog, viewing details about each item in the item catalog and performing a search for one or more items. Other functionalities can include, for example, allowing a user to generate, navigate and read reviews for one or more items. Also, a user can provide feedback on item reviews and read through feedback as well. Ads and Advertisers (ADV) can also be added to the RMS 10. Enrollment functions for one or more users, advertisers and any other external entity can be provided and are described in more detail below.

It is to be appreciated that substantially any technology that can generate a software system that can work on a network (e.g., the Internet) can be used to create the RMS 10. In an exemplary embodiment, the network is the Internet but, alternatively, the network could be any type of network such as a proprietary network, a local intranet, a wireless network, a telephone network, etc. In one example, Microsoft's .NET technologies and tools including MS SQL Server (for the database) is employed.

As utilized herein, an external entity is a party that interacts or has a relevancy with RMS. Examples of external entities are a website, a user, an advertiser and a provider (e.g., a manufacturer, a service provider, etc.) enrolled in the RMS 10. Enrollment by any external entity in the RMS 10 can occur through general network access (via DAM), for example by accessing an RMS site or a client RMS program such as a program that is installed on a computer and interacts with RMS over the network. When showing general access to the RMS 10, a web client or program that is utilized to access the RMS 10 may not be shown, as it is known in the art and not important for the purposes of this disclosure. A unique identifier is generated for each external entity enrolled in the RMS 10.

The website administrator 13 may enroll one or more websites (e.g., website 14) in the RMS 10 wherein a website account is created in the RMS 10 for each website. The website administrator 13 accesses RMS 10 via general network access. It is envisioned that many website accounts will be created in the RMS 10. As disclosed herein, a website account may also be referred to as a website. Also a website may be referred to as an enrolled website or a member website. A unique identifier for the website 14 is a website ID (or WSID). The website ID can be used to identify the specific website for which a review management web document is generated when delivering content to the user 26 via the website 14.

Figure 27:
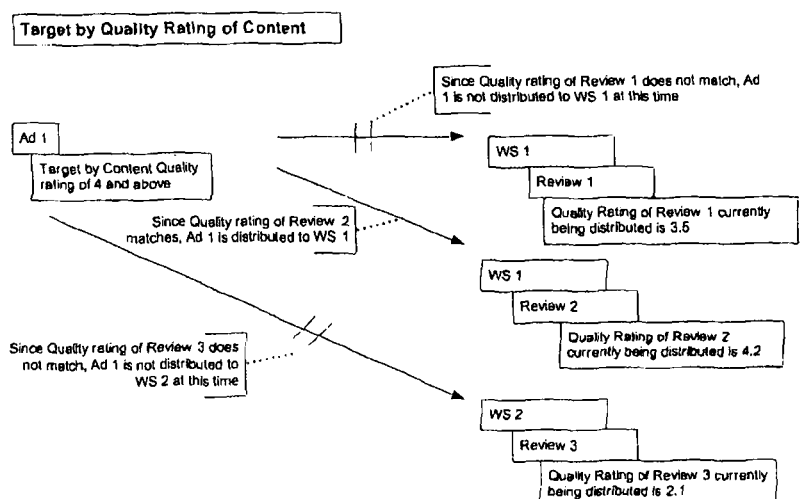
FIG. 27 illustrates ad targeting by quality rating of content in accordance with an exemplary embodiment.

FIG. 27 illustrates an overview of a website which can refer to an originating website (OWS) 2702 and/or an access website (AWS) 2704. The AWS 2704 is a website from which a user 2706 is currently accessing the RMS 10 via an indirect access method. If user generated content is generated when the RMS 10 is accessed via an indirect access method, the current AWS 2704 is identified as the AWS of the user generated content as well.

The OWS 2702 is used to identify the originating website for a user or user generated content. The OWS 2702 for a user is the initial AWS from which a non-member user accesses the RMS 10 and subsequently enrolls in the RMS 10. As shown in 2710, even if a user accesses the RMS 10 from other websites or directly (via a direct access method) before enrolling in the RMS 10, the first website that can be identified to have directed the user to the RMS 10 can be designated as the OWS.

Alternatively or in addition, as shown in 2712, an OWS can also be identified as the originating website for user generated content. The OWS of user generated content can be identified as the OWS of a user, sometimes or alternatively referred to herein as "U," that creates content in the system of the user generated content. If the entity that creates content in the system of the user generated content does not have an OWS, the AWS may be used as the OWS.

There can be many ways to identify a website as the OWS 2702 even when a user does not immediately enroll in the RMS 10 after accessing the RMS 10 via an indirect access method. The rules for identifying the OWS 2702 can be configured in the RMS 10 as well. For example, if a user 2706 accessed the RMS 10 via a website and did not enroll immediately, but moved around to other sites (including other member websites) before coming back to the RMS 10 to enroll, the first member website that directed the user to the RMS 10 can be identified as the OWS. The user session (USESS) or other identification methods can be utilized to identify which website directed a user to the RMS 10 first. However, if some predetermined time period elapsed since a website directed the user to the RMS 10 and the user did not enroll in the RMS 10, then said website may not be marked as the OWS 2702 even if the user 2706 did not access the RMS 10 from another website in that time period. It is to be appreciated that one skilled in the art would be able to recognize and implement various website identification methods.

The rules for designating the OWS 2702 of a user or user generated content may vary. For example, the OWS for user generated content may be identified as the OWS of the creating entity of content in a system. A variation of this is that the OWS for user generated content may be identified as the current AWS even if the AWS is different than the OWS of the creating entity of content in a system.

The RMS 10 may also be configured with various rules to determine the OWS 2702 of a user by indicating rules such as the last AWS that the user utilized before enrolling is the OWS 2702 and not the first AWS that the user utilized. Optionally, the OWS 2702 may be changed according to other rules such as, for example, if a user is accessing the RMS 10 via an AWS (that is not the OWS 2702) consistently for the past week, then the AWS may become the new OWS of the user.

In one aspect, the RMS 10 may expire the OWS of a user or user generated content after a certain time period or other situations such as if the OWS 2710 is no longer a website. When the OWS is expired or no other website is identified as an OWS for the user or user generated content, then the RMS 10 itself can be designated as the OWS of the user or user generated content or the RMS 10 will designate that there is no OWS of the user or user generated content.

Figure 28:
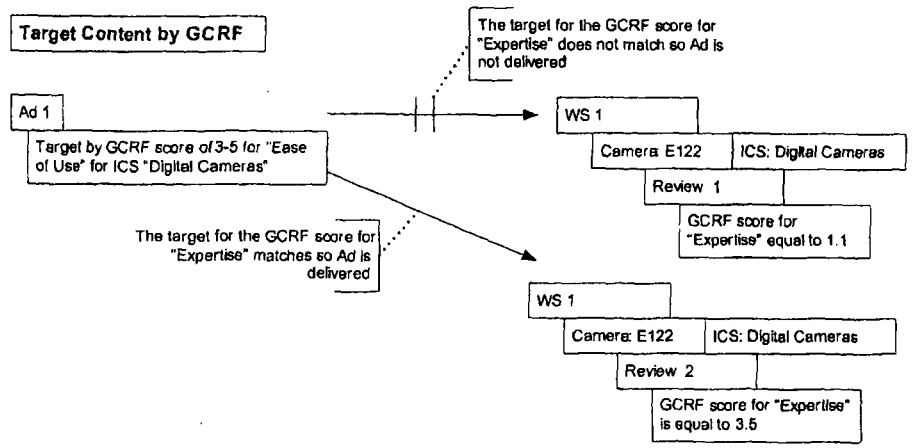
FIG. 28 illustrates ad targeting by generated content relevant factors in accordance with an exemplary embodiment.

FIG. 28 illustrates a system wherein an OWS 2802 and an AWS 2804 may or may not be the same website. Since a user 2806 can access the RMS 10 via any website (e.g., WS1 2808, WS2 2810, etc.), the user may have a different AWS than the OWS of the user 2806. This occurs for example when the user 2806 accesses the RMS 10 from an AWS which is different than the OWS of the user. Since the user may be accessing the RMS 10 from a plurality of websites, the AWS of the user 2806 may be changing every time the user 2806 accesses the RMS 10 via a website (e.g., WS1 2808, WS2 2810, etc.).

For example, if the user 2806 has the OWS 2802 of WS1 2808 and is currently accessing the RMS 10 via the WS2 2810, then the current OWS 2802 of the user is the WS1 2808 and the current AWS 204 is the WS2 2810. If in this situation the user 2806 creates user generated content, then the OWS 2802 of the user generated content can be recognized as the WS1 2808 and the AWS 2804 of the content can be recognized as the WS2 2810.

One way to implement the OWS and AWS identification functionality for a user is for RMS 10 to identify a website via a review management access component, an RHL, user session or other mechanism (various exemplary methods employed by the RMS 10 to identify a website are described herein). At the time a user enrolls in the RMS 10 and when a website ID of a website can be identified as the AWS for the user, then the website ID of the AWS is associated with the user as the OWS of the user and stored in the RMS 10. In addition, when a user generates user generated content, for example an item review, then the OWS of the user is identified and the user ID is stored with an item review. The current AWS is also identified and stored with the item review. A website that generates content is referred to as a participating website. In cases where a website, such as a participating website, generates content, the OWS of the content is said website.

In one embodiment, the review management system 10 can allow websites (e.g., website 14) to share, disseminate and contribute review content by utilizing a central application that implements review and ratings functionality. The review management system 10 provides instructions and necessary implementation code that allow websites to implement a reviews application interface on one or more of their website web documents. In one example, the reviews application interface is provided via the review management web document 22 included in the website web document 18.

In this manner, the user 26 is able to view real-time review data through the website web document 18 via the web client 28. The user 26 can also add and manage content and other interactions with the review management system 10 via member websites, such as website 14, and other web-interfaces including direct access to the review management system 10. The advertiser is able to enroll to place an advertisement (which may contain an advertiser link 46) in the review management system 10 for distribution to the website 14 via review management web document 22. It is to be appreciated that website 14 is a singular web presence employed for exemplary purposes only and that one or more websites are contemplated in accordance with one or more exemplary embodiments.

In one approach, the review management system 10 implements a relevancy matching scheme to provide relevant content to the website 14 and allows the advertiser 12 and the website 14 to participate in the system with relevant partners. In this manner, the review management system 10 provides an automated system that can connect multiple websites and advertisers to implement a reviews and ratings application functionality (among other functionality) accessible to users at a plurality of websites.

Alternatively or in addition, the review management system 10 can provide commission incentives to the website 14 and the user 26 and implement the necessary activity tracking functionality. The review management system 10 can be implemented such that the participants (e.g., the user 26, the website 14, and the advertiser 12) are presented with automated interfaces to enroll in the system 10, manage their accounts and use and contribute data. For example, the advertiser 12 can participate by creating an account and managing this account and advertisement data via a web interface (not shown). Utilizing the review management system 10, the advertiser 12 can indicate criteria such as website types and item catalog subsets to advertise alongside.

In another example, the website 14 can participate in the review management system 10 utilizing automated enrollment functionality of the review management system 10 to create and manage a website account. The website 14 is also able to select appropriate item catalog subsets, website types and advertiser types. In this manner, the advertiser 12 and the website 14 can decide to be coupled to appear within the website web document 18. However, an advertiser's advertisement will only appear in the website web document 18 together when both parties partner matching criteria is successfully matched.

In addition to the indirect access (for example in IAM), the review management system 10 can also be accessed directly (for example in DAM). In this approach, a website 14 is not employed by a user 26. Instead the review management system 10 is accessed through general network access and the user 26 can interact with the same content that the user 26 can interact with in the review management system 10 when accessing the review management system 10 through a website 14. Content that is generated through direct access may also be available to users throughout member websites 14.

In this manner, the review management system 10 can provide a review application that can be accessed through multiple independent websites and also directly through a review management site. Furthermore, when the review management system 10 is accessed through the website 14, the website content 20 can be interacted independently of the interaction with the review management web document 22. As the user interacts with review management system 10, only the review management web document 22 of the display changes, while the website content 20 remains unaltered. If the user interacts with the website content 20, then the review management web document 22 does not change in any substantial way. However, if the user interacts with the website content 20 that changes the current web document 18, then the review management web document 22 along with the current website web document 18 will be replaced with a new website web document 18. The review management web document 22 may or may not appear on the new website web document 18, depending on whether or not the code that implements access to the review management web document 22 exists in the new website web document 18.

Figure 2:
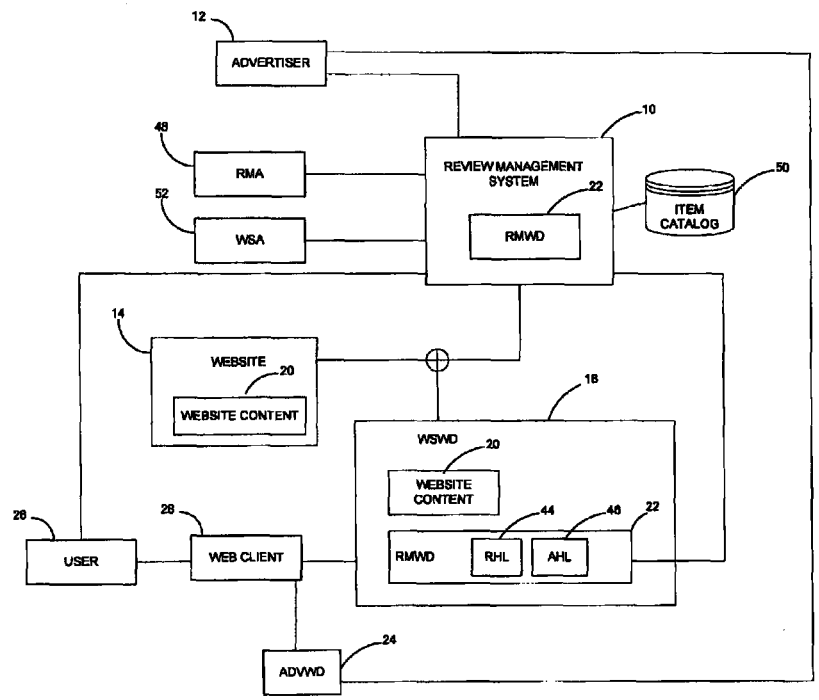
FIG. 2 is a block diagram of a detailed distributed and automated review management system in accordance with an exemplary embodiment.

FIG. 2 illustrates the review management system 10 further including a review management administrator (RMA) 48 that is added to perform administrative functions for RMS 10. An item catalog 50 is employed by the review management system 10 to provide items that can be reviewed and rated. A website administrator 52 is added to enroll, maintain and perform other functions in RMS on behalf of the website 14. A review management hyperlink 44 and an advertiser hyperlink 46 can be included in the review management web document 18 to allow a user to access desired content.

The RMA 48 can be employed to interact with the RMS 10 to access one or more administrative functionalities of the RMS 10. There are many functionalities that the RMA 48 can utilize in the RMS 10. Many such functionalities are common and others are unique and some functionalities will be further described as needed. In one approach, there can be a plurality of RMA for the RMS 10. An example of a function that the RMA 48 performs is to respond to help requests made by various entities in the RMS 10. In addition, the RMA 48 can be employed to create one or more of billing, commissions and tracking reports on activity in RMS that includes website and advertiser activity. In addition, various system maintenance functions and activities can be executed by the review management administrator 48.

RMS 10 can facilitate enrollment in the review management system 10 by the advertiser 12, the user 26, and the website 14. As described in detail below in reference to FIGS. 5-7, a website administrator can utilize an enrollment page to enter information associated with the website that is being enrolled. FIGS. 5 and 6 illustrate exemplary web documents that allow a website administrator to enroll in the review management system 10 via general network access to the RMS 10 (for example DAM). In one example, a WSA is prompted in a web document to enter a website name, a URL address, a contact name, a contact email, etc. In addition, a WSA can select the type of website and associate the website with one or more items from the item catalog 50.

Figure 7:
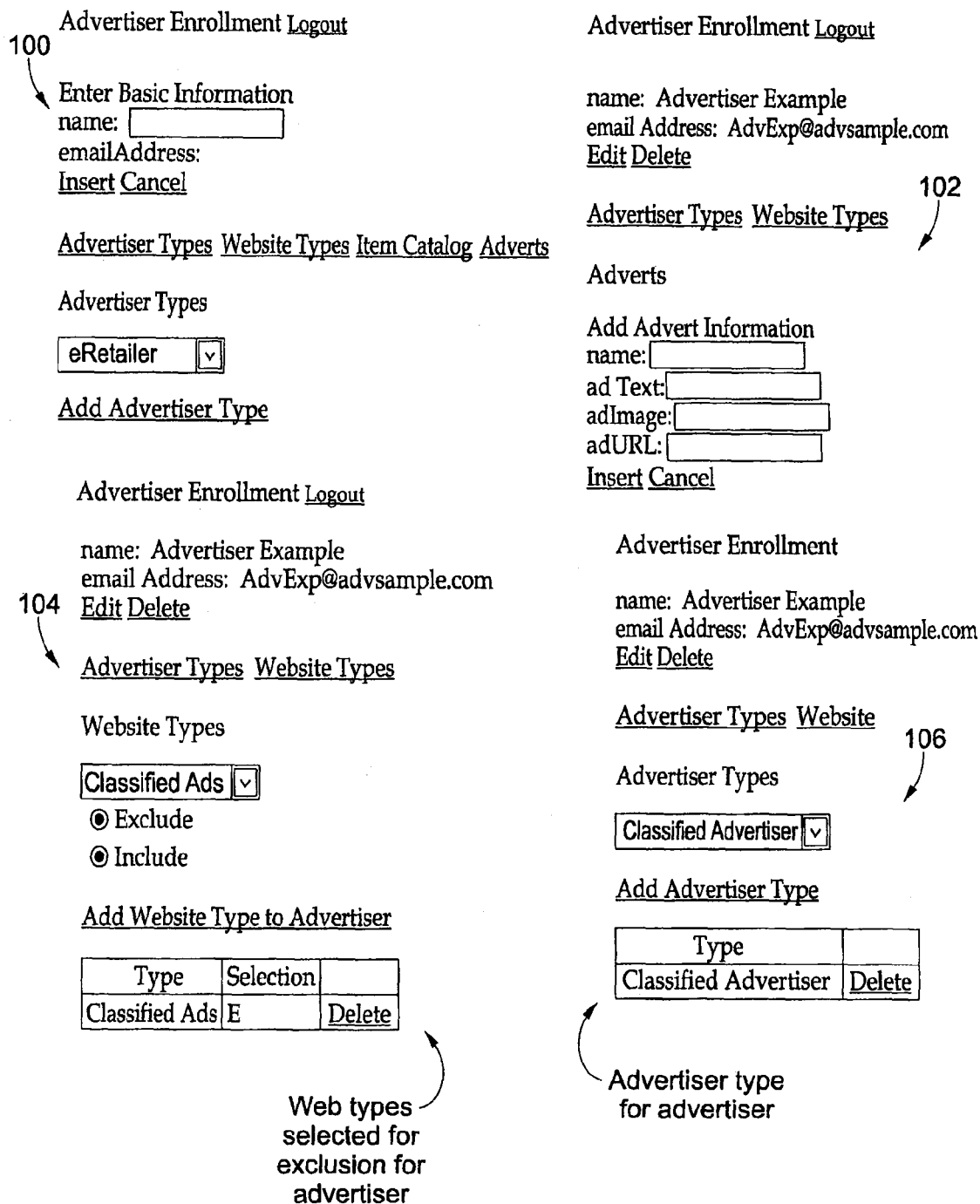
FIG. 7 illustrates an advertiser enrollment page that allows a user to enroll an advertiser in the review management system in accordance with an exemplary embodiment.
Figure 9:
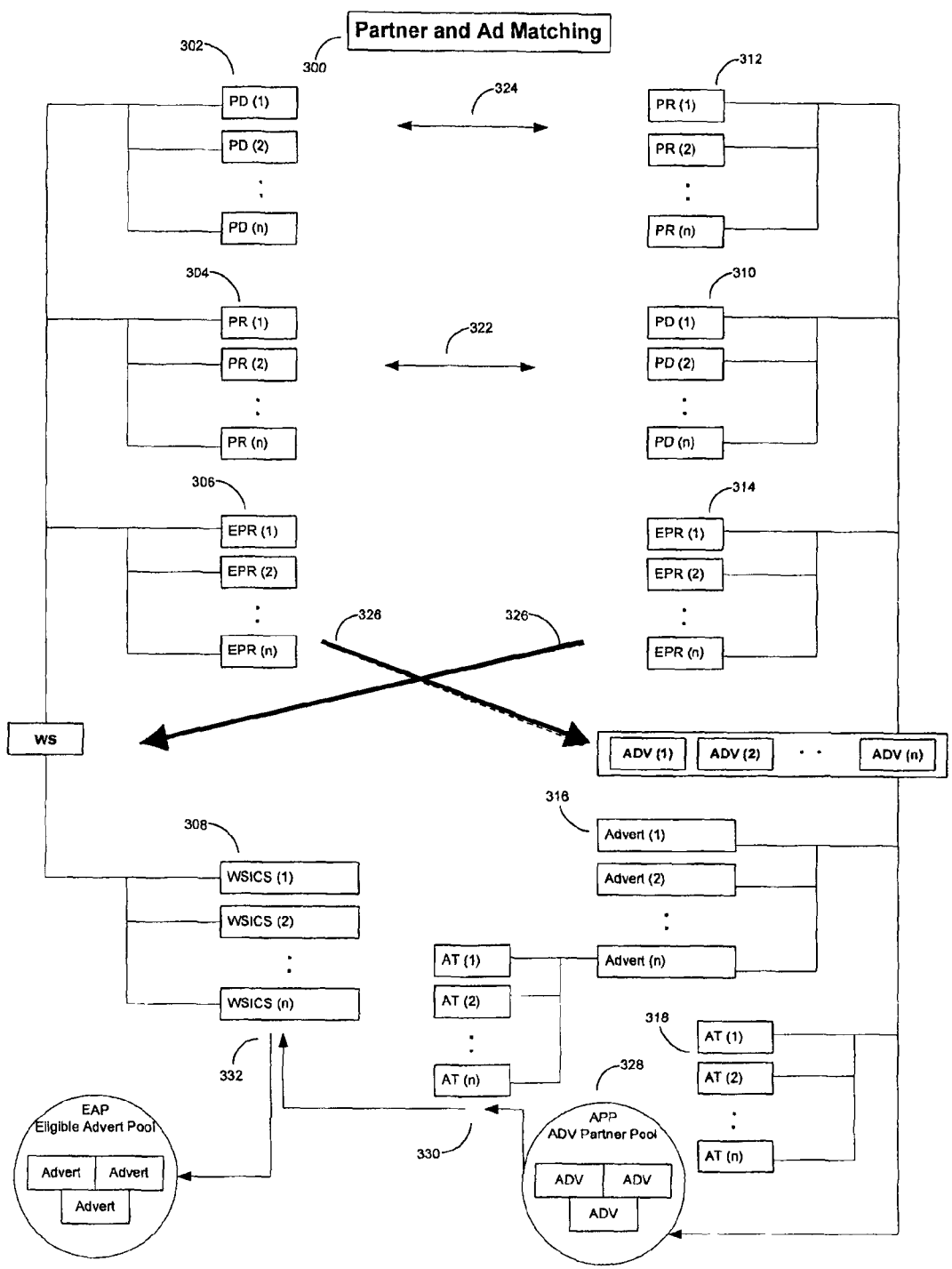
FIG. 9 illustrates a method to distribute matching advertisements to a member website within a review management system in accordance with an exemplary embodiment.
Figure 10:
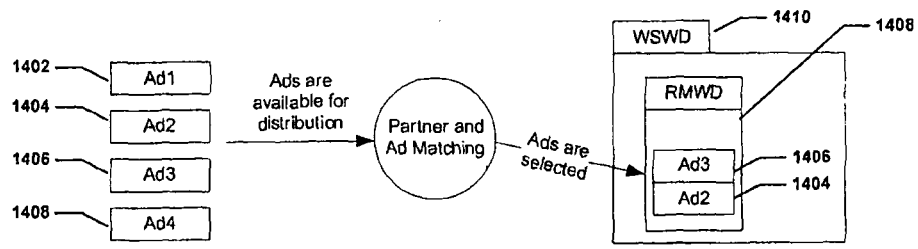
FIG. 10 illustrates an overview of partner and ad matching employed with the review management system in accordance with an exemplary embodiment.

FIG. 7 illustrates a web document that allows an advertiser 12 to enroll into the review management system 10. To enroll an advertiser in RMS 10, the advertiser accesses RMS 10 via general network access. A web document of RMS 10 can prompt the advertiser to enter advertiser name, email address, and various other contact and/or identification data. An advertiser can upload various advertisement information such as advertisement name, text, image, and URL address. In addition, an advertiser can select one or more advertiser types and website types.

In addition, the advertiser can be prompted to provide payment information for enrollment into the review management system 10. Once enrolled, the RMS can request identification data (for example login) from an advertiser, website and user to subsequently access the review management system 10.

The item catalog 50 can provide a list of items. It is to be appreciated that the data stored in the item catalog 50 can be arranged, stored and presented in substantially any manner.

The review management system 10 can provide appropriate revenues and billings for parties that participate in the review management system 10. Advertisement clickthroughs can be tracked in the review management system 10 and employed to calculate fees and commissions. As utilized herein, a clickthrough web document is defined as the web document from which a user selects an advertisement. This advertisement is referred to as a clickthrough advertisement.

In one example, there can be one or more user generated content (such as an item review) that are present on the clickthrough web document. In one implementation, each item review on the clickthrough web document is referred to as a clickthrough item review. In another implementation, the highest ranked item reviews in a particular item category can be referred to as clickthrough reviews. The number of reviews to be counted as clickthrough reviews is also configurable. In addition, for each clickthrough review there can be one or more creating entities (e.g., those who created the review) referred to as clickthrough reviewers. Other types of content can be similarly utilized other than reviews in this functionality, for example a clickthrough feedback.

For each clickthrough reviewer there may be an originating website. The originating website is the website that initiated the enrollment of the user account of the clickthrough reviewer. In one implementation, there is a time limit of how long the website may be defined as the originating website for a reviewer, after which the reviewer does not have an originating website. If the clickthrough reviewer does not have an originating website, then the website from which the clickthrough review was created is designated as the originating website by the review management system 10. The website on which the clickthrough occurred is referred to as the clickthrough website. When direct access to the review management system 10 is employed, the review management system 10 can be treated as a website in application coding to determine originating websites or clickthrough reviewers.

The RMS can calculate revenue to be paid based on each clickthrough advertisement. In one approach, the options for one or more of the functionality, fees and commissions formulae can be configured during setup of the review management system 10. Commissions for the clickthrough advertiser can be calculated relative to the originating websites, the clickthrough websites, the clickthrough reviewers, etc. In addition, commission payments can be subject to each recipient meeting pre-defined conditions and criteria. There are numerous options for commission and fees calculations in the review management system setup. For example, the commission for the clickthrough website may be omitted, etc.

The review management system can be extended to include fee calculations for the advertiser so that they can be billed for their advertisement clickthroughs. This can be accomplished by creating tracking datastores in the review management system 10 and creating records in the datastore for each activity that is to be tracked. Other data (such as clickthrough website) related to each clickthrough can similarly be stored in RMS.

Advertisement bidding functionality can also be employed. For this, the advertiser will be able to log into their account and bid on how much they are willing to pay for its advertisement clickthroughs and a daily budget for that amount. The bids can be incorporated in the Advertisement distribution logic of the web application such that they will help determine which advertisements are selected during advertisement distribution. Tracking functionality of the review management system 10 can be developed, as is known and understood by those skilled in the art, to be able to identify which member users enrolled at which website and at which website a review was created. This information will be used to calculate commissions for members.

The review management system 10 can also be extended to calculate commissions and fees for advertisement displays and clickthroughs. The commission and fee structure is configurable to business rules setup with the application. For example, the business rules can indicate a default amount advertisers will be charged for each clickthrough. Furthermore, the business rules can indicate the percentage commissions to be given to clickthrough reviewers, clickthrough websites and other members who are eligible for commission clickthroughs. The business rules can also indicate how the advertisement bidding functionality is to be used in the application.

Commission determination functionality can then be developed to calculate commissions for advertisement clickthroughs according to the business rules setup for the application. One such implementation is that commission is given to the highest quality item reviews in a given item category at the time of an advertisement clickthrough in said item category even if item reviews were generated at websites other than the clickthrough or originating website. The commission for the clickthrough item review is shared among the clickthrough reviewer and the originating website and the clickthrough website. The clickthrough website is the website on which the advertisement clickthrough occurred. This may or may not be the same as the originating website as content such as item reviews are distributed to multiple relevant member websites.

The review management hyperlink 44 can be employed to allow a user to navigate one or more review management web documents. The advertiser hyperlink (AHL) 46 can be employed to allow a user to navigate to advertiser sites (for example to an advertiser web document (ADVWD) 24) from a review management web document. In particular, the review management hyperlink 44 is available in the review management web document 22 for user interaction with the review management system 10. The advertiser hyperlink 46 is a hyperlink that is specified in an advertisement by the advertiser 12. The advertiser hyperlink 46 is available for user access in the review management web document 22. The target URL address of the advertiser hyperlink 46 can lead to a advertiser web document 24. When a user clicks on an AHL, the web client (WC) sends a web request to RMS and RMS may access the target URL of the advertisement of the AHL and send a redirect command to the WC so that the target URL is accessed by the WC for display of a ADVWD to the user.

As noted above, the review management system 10 allows participation of a plurality of websites. These websites can utilize the reviews and rating functionality of the review management system 10 within a website with minimal effort. The WSA can enroll the website 14 into the system by providing various types of data, including, for example: name and contact information, item and item categories (item hierarchies) to which subscription is desired, and one or more website types. In one embodiment, the WSA can select one or more website types that describe the website 14. Some examples of website types include but are not limited to: a 'retailer'—sells electronic products; 'informational'—provides information on products, does not sell products; and 'personal'—does not sell products. Alternatively or in addition, the WSA can select one or more advertiser types that the website would like to participate with in the review management system 10. This information can be used to appropriately match advertisers with websites. It is to be appreciated that substantially any number of website or advertiser types could be conceived and employed.

In addition, the review management system 10 allows participation of a plurality of advertisers and enables each to distribute their advertisements to appropriate member websites (e.g., website 14). In one example, an advertiser can enroll into the system by providing one or more of: name and contact information, and item and item categories (e.g., item hierarchies) to which they wish to subscribe. In addition, an advertiser can select one or more advertiser types.

In one embodiment, an advertiser can be one or more of the following types, including: retailer—sells electronic products; informational—provides information on products, does not sell products; and personal—does not sell products. It is to be appreciated that substantially any number of advertiser types could be conceived and employed. In addition, an advertiser can also select which website type(s) that it would like to participate with in the system. This information can also be utilized for relevancy matching.

The advertiser 12 can upload one or more advertisements that will be distributed in the review management system 10 alongside other review management content. In one example, when users clickthrough on one or more advertisements, the advertiser 12 will get billed a fee for each clickthrough. Each advertisement will default the advertiser types of the advertiser 12. However, it is also possible to specify different advertiser types, website types and item catalog subsets per advertisement. This can be useful in cases where the advertiser 12 wants to distribute different types of advertisements in the review management system 10.

The review management system 10 can be created utilizing substantially any development tool that can create database-enabled web applications. There are a wide variety of web application development tools available. In one example, Microsoft DotNet Technology can be employed to develop the review management application. A database can be created utilizing substantially any application, such as Microsoft SQL Server, for example. In another approach, java web development tools (e.g., Eclipse with web application add-in tools) can be employed. In yet another approach, MySQL can be utilized as a data store of the review management application.

The completed review management system 10 can be hosted on any web server that supports the technology used to develop the application. In one example, DotNet is employed wherein a computer running Microsoft Server is utilized as the web and application server. In another example, if the review management system is developed using Java-based technologies with a MySQL database, then any computer running a java-capable web and application server can be used to host the application. There are no application-specific requirements for deploying the review management system 10 on any particular server machine.

The review management system 10 implementation technology is also independent of the implementation technology of the websites. For example, even if a website used java technology, the review management system 10 may have been developed using DotNet technology and the two systems would still be able to generate a WSWD and an RMWD that can coexist.

In order to implement the review management application, a traditional-type of review and rating web application can first be developed. The application can implement reviews and rating functionality and can be capable of persisting data to storage such as a database. There are many examples of a reviews and rating application in existence already. The user presentation of the system should be developed so that it will display user interfaces in a relatively small area. In this manner, the user interface can fit reasonably into a frame that is part of a larger independent page.

A hierarchical and categorized item catalog that contains products/services to be reviewed and rated is created and maintained with data. Data may include text, images, video and other information of the item. User enrollment functionality is implemented so that users are able to review items or give feedback on reviews as member users. They may also enroll for other services such as subscribing to product updates or receiving reviews via email.

Reviews (or item reviews) in the system are subject to feedback such as useful/not useful or accurate/inaccurate. Users may enter such feedback on reviews created by other users. Anonymous and member users may also search and navigate the item catalog. Users can search for items that are reviewed with a certain rating and/or one or more particular keywords.

In one example, the review management system 10 can include quality functionality such that it is possible to determine which reviews have the highest quality. In one approach, a peer rating system can be employed wherein users can rate a review as helpful or unhelpful. Thus users can collectively determine the value of the information they are receiving from another user's review. In addition, users can be influenced to provide high quality reviews in order to receive favorable ratings from their peers.

In one example, the review management system 10 can be extended to implement an application that can be accessed indirectly via a website 14. Such an implementation is accomplished by tracking the website and activity when the review management application is accessed from the website. The website is given implementation code which is to be included in their website web documents to access the review management system 10. There are several ways to implement a system that can be accessed indirectly, such as the RMS 10. One implementation can be accomplished by using iframe coding on a web document. In one example, member website "Aexample" located at www.websiteAexample.com accesses the review management system 10 by inserting the following code into its webpages:

<IFRAME SRC="http://www.RMservice.com/Start.aspx?wid=23939" TITLE="Sample IFRAME" SCROLLING="auto" NAME="sample" WIDTH="200" HEIGHT="200" FRAMEBORDER="yes">
</IFRAME>"

To identify the website, the website ID is coded into the iframe coding. In this example, the website ID is 23939. The application can also be coded to lookup the website valid base URLs and verify that the request is coming from an authorized website.

A session object (or equivalent, depending on technology used) can be added in the review management system 10 when generating review management content for a member website. The session object could contain member website identification and user identification. This identification and any activity related to the member website and user ID can be persisted to a session object datastore (not shown) in the review management system 10. In subsequent user actions, the review management system 10 can know the user, website and other key information for the interaction by accessing the session object.

The review management application can also be developed so that if a page is requested without the appropriate website ID, the review management system 10 will look at the request and try to identify the member website by looking up the base URL of the web request. In order to determine the website from which a request to RMS is initiated, the web request can be examined to determine the IP address and the corresponding URL. Alternatively, the website ID can be passed in the web request in the implementation code (for example the RMAC) so that the review management system 10 can determine the website.

After identifying the website, the preferences of the website, such as layout options, can be considered in a review management web document. Also, after identifying the website, the item catalog-specific content subject to display at the website may be prioritized and/or filtered based on item catalog subset selections (for example the WSICS) by the website. For example, if the website selected only digital cameras item category (and subcategories) in the WSICS, the digital cameras item category and subcategories may be prioritized in item category listing in a review management web document at the website.

The review management system 10 can also be extended to track user activity at websites. This can also be accomplished using session objects and persisted to a review management system 10 datastore. The system should be extended to determine activity such as when and where (from which website) did the user member enroll into the system and from which member website did the user member create a review. Both the website from which the member user enrolled and the website from which the review was created can be determined to be originating websites (one for the user and one for the review). However, until the user logs into the review management system 10, activity will be tracked as occurring for an anonymous user. Then, after the user logins to the review management system 10, activity can be tracked with the user ID. The user identification between page requests in the review management system 10 can be accomplished with sessions (for example a USESS) implementation in review management system 10.

An example of a web request (that contains the website ID) to the review management system 10 for member website websiteBexample.com with website ID 20534 is:
http://www.RMservice.com/Start.aspx?wid=20534

Another example for member website websiteCexample.com with website ID 22332 is:
http://www.RMservice.com/Start.aspx?wid=22332

When a web request to the review management system 10 from a member website is requested, a session object (not shown), which stores information and identification for the member website and user, is created in the review management system 10. If the website ID is not sent in the web request, it is also possible to determine the website ID from the incoming request to review management system 10 by analyzing the web request as mentioned earlier. When the user then clicks on a review management hyperlink in the review management web document, by analyzing the session object, the review management system 10 will know which member website the action is occurring on and which user is interacting with the application.

The website can also be given instructions for implementation code or sample implementation code such that it can modify and incorporate into its websites web documents to give its users access to review management functionality alongside its own website content. The code (also referred to herein as RMAC) may cause the return the default starting web document of the review management system to the users of the member website or a specific starting page for the member website. The website may also opt to implement different versions of the code on different pages of their website. For example, in its digital camera website sections, it may default the review management starting page to digital cameras and in its film camera website sections, it may default the review management system starting page to film cameras. This can be accomplished by the website providing a item or item category in the iframe coding.

In addition, a website may dynamically generate the review management system implementation code on its dynamically-generated web documents. This is accomplished by giving the member website code templates with variable placeholders that can be inserted as dynamic parameters. An example of this is:

<IFRAME
SRC="http://www.RMservice.com/ItemView.aspx?itemID={0}&wid=23939"
TITLE="Sample IFRAME" SCROLLING="auto" NAME="sample" WIDTH="200" HEIGHT="200" FRAMEBORDER="yes">
</IFRAME>

The "{0}" string can be replaced with an item ID by the website's application when the website dynamically generates its webpages.

If a user is in the middle of a review management session at one member website and then switches to another member website, the session can be overridden with a new session for the second member website. This is accomplished by comparing the member website of the user session with subsequent requests that communicate member website identification (if any). If the subsequent member website ID and the current session website ID are different, then the current session is terminated and a new session with the new website ID is created for the user in the review management system 10.

Figure 3:
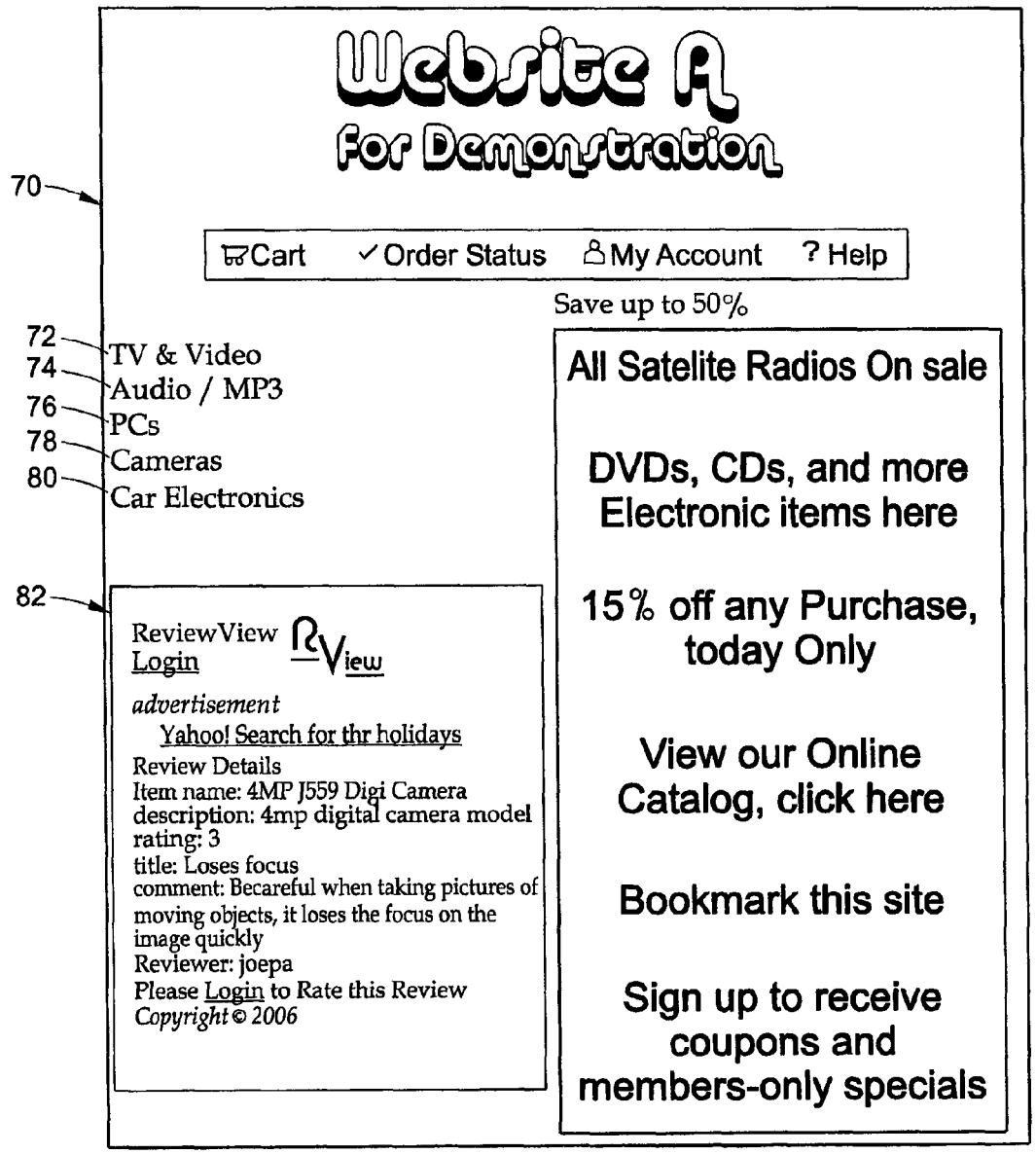
FIG. 3 is an exemplary website that includes a window that allows a user to receive and/or provide review information regarding a good and/or service in accordance with an exemplary embodiment.

FIG. 3 illustrates an example website 70 enrolled in the review management system 10. Website 70 is directed to the sales of electronic equipment. Hyperlinks 72, 74, 76, 78, and 80 allow a user to navigate to specific website web documents. For example, hyperlink 76 is labeled "PCs." When a user 26 clicks on hyperlink 76, the user is directed to a website web document that contains information dedicated exclusively to personal computers.

A review management web document 82 is included in the website 70. The review management web document 82 allows a user 26 to log into the review management system 10, go to an advertiser's website by accessing an advertiser hyperlink 46, and/or access general review content in the review management system 10. In this manner, a user 26 can add a review to one or more items and the review is available to other users 26 accessing the review management system 10.

In an alternate embodiment, the review management system 10 can employ a dynamic frame interface. The review management web document will be visible to the user in a frame, but the frame size does not have to remain fixed. Depending on which review management web document of review management system 10 is shown in the frame, the frame implementation coding may command an increase in the size of the frame for that particular review management web document. When the frame enlarges, it may move the member website content or overlay the member website content. A review management hyperlink 44 that a user clicks may also increase the size of the frame. Another review management hyperlink 44 could decrease the size of the frame. It is up to the review management system 10 implementation choices as to which pages and strategy are employed to incorporate the dynamic frame sizes. For example, when showing item listings, the review management application might extend the frame. Accordingly, when the user wants to interact with the member website content, the review management application frame can be decreased by the user clicking a review management hyperlink 44. One way to implement dynamic frame size is through JavaScript function and/or dhtml technology.

Figure 4:
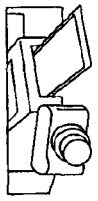
FIG. 4 illustrates the same review window associated with two disparate websites in accordance with an exemplary embodiment.

FIG. 4 shows the review management web document 82 employed in the website 70 and a website 84. As illustrated, an advertiser enrolled in the review management system 10 can select one or more websites with which to be associated. This selection can be accomplished by manual selection from the advertiser, wherein enrollment options overlap. Alternatively or in addition, advertisers and websites can be coupled via relevancy matching (described in further detail below). In this manner, advertisers can disseminate their advertisements only with desired review content and website 14 partners.

FIGS. 5 and 6 illustrate enrollment of a website in the review management system 10. FIG. 5 includes a web document 90 that allows a WSA to enroll one or more websites in the review management system 10. Web document 92 allows the WSA to specify Website types for the website. Web document 94 allows the WSA to specify the advertiser types for the website.

The web document 90 enables the WSA to provide various information regarding its website. This information can include a website name, a base URL, a contact name, and a contact email. It is to be appreciated that the WSA can be prompted to provide substantially any data desired. Web document 92 allows a WSA to select one or more website types associated with the website to be enrolled. In one approach, a WSA can select the one or more types from a drop down menu. Upon selection, the types selected can be placed into a table for review. Once placed in the table, a user can delete one or more types by clicking on a "Delete" hyperlink or equivalent.

Web document 94 allows a WSA to select the type of advertisers it would like to include and exclude as partners in the review management system 10. In one approach, a drop down menu can allow the WSA to select one or more advertiser types for inclusion or exclusion from the enrollee website. A radio button can allow selection of "Include" or "Exclude". A table can be populated with each advertiser type selected for inclusion or exclusion from the review management system 10.

As illustrated in FIG. 6, a WSA can associate the enrollee website with one or more items from the item catalog 50. As discussed above, the item catalog 50 can be organized in a hierarchal manner such that general categories contain one or more specific categories, which in turn contain more specific categories. Each category and item in the item catalog can have a checkbox associated therewith. In this manner, a WSA can select entire categories and/or specify particular models of items. In one example, when a category is selected, all of the associated sub-categories and items are selected as well.

Thus, when a website is enrolled in the review management system 10, at least three disparate metrics can be related to the website. One or more website types are selected. Optionally one or more advertiser types are selected to be associated or unassociated with the enrollee website. Moreover, the enrollee website is associated with one or more particular item categories or items. In one approach, the items and item categories are selected from the item catalog 50.

In one embodiment, websites that want to access the review management system functionality on their website web documents must enroll in the review management system 10. In one approach, the website administrator 52 accesses the review management system 10 via the Internet and enrolls the website 14 in the review management system 10 and gets a unique website identifier in the review management system 10. The website enrollment functionality of review management system 10 is implemented through automated enrollment functionality generally available on a network such as the Internet (for example, enrollment is enabled through web documents at a review management website).

The website administrator 52 selects website types for the website. Examples of website types are Retailer, Classified Ads or Informational. The selectable website types can be added when configuring the review management system 10 at system setup and maintained later on as well. The website type(s) can be used to match related advertiser advertisements with websites. For example, if an advertiser chose to exclude website type of "Retailer" in the advertiser enrollment process, the member websites that have selected website type "Retailer" will not receive the advertisements of that advertiser.

The WSA 52 can also select advertiser types. Examples are 'retailer', 'portal' and 'travel'. The website and advertiser types can be used to match advertisers with websites as will be described in more detail below. The selectable advertiser types can also be added when configuring the review management system 10 at system setup and maintained later on as well.

The WSA 52 can also select the relevant portions of the item catalog 50 that the website 14 will subscribe to. The website 14 can get RMS functionality prioritized and/or filtered for the portion of the item catalog 50 to which the website 14 has subscribed. Hierarchies of the item catalog 50 can be selected as well. For example, the WSA can select the general "Electronics" section of the item catalog and they will get content relevant to items assigned to the "Electronics" category and any subcategories of "Electronics" such as "Digital Cameras" and "Film Cameras." However, if a website subscribes to "Digital Cameras," that website will get content relevant to the items in the "Digital Cameras" item category and any sub category of "Digital Cameras," but not the content in "Film Cameras," as "Film Cameras" is not likely in the hierarchy of "Digital Cameras." Website enrollment information for each member website is to be persisted in review management system 10.

FIG. 7 illustrates one exemplary enrollment of an advertiser in the review management system 10 that utilizes web documents 100, 102, 104, and 106. Web document 100 prompts the advertiser to enter various data related to the advertiser such as name, email address, etc. Web document 102 prompts the advertiser to enter information specific to one or more advertisements. This information can include an advertisement name, a text, image and/or a URL address. Web document 104 allows the advertiser to select one or more website types with which to be associated or unassociated. In one embodiment, a drop down menu can be employed to select the website types and a radio button can be employed to "Include" or "Exclude" the website types selected from the drop down menu. A table can be created that shows the website types that are selected to be included and excluded from association with the enrollee advertiser. In this manner, the advertiser can review the selections and make changes as desired.

Web document 106 can allow the advertiser to select the type of advertiser that is to be enrolled in the review management system 10. A list of advertiser types can be selected from a drop down menu. The types selected can be placed in a table for review. The advertiser can edit the table as desired to include or exclude one or more advertiser types. The review management system 10 can utilize the advertiser enrollment information to correlate the enrollee advertiser with one or more websites based at least in part upon one or more of the advertiser and website enrollment data.

Advertiser automated enrollment functionality is also added to the RMS 10 such that advertisers can become members and add advertisements in the RMS 10. The advertisements will be shown within a RMWD that is distributed to websites and tracked as to which advertisements were shown and "clickthroughed" on websites and at what times the events occurred.

During the enrollment process the advertiser will select advertiser types. The advertiser will also select website types that they are interested in for distribution of their adverts. The websites that are of the website types selected by the advertiser would be subject to receive the advertisements of this advertiser and be displayed alongside the review content that is sent to the websites.

The advertiser also selects one or more item catalog subsets. This selection may overlap the item catalog subsets that are selected by the websites. Utilizing this and other information, the advertisers and websites are matched up through item catalog relevancy. The advertiser may also select different item catalog subsets for each advertisement or if they do not select a item catalog subset for a particular advertisement, the default item catalog subset selections for the advertiser may be used.

The advertisement distribution can be logged in a review management datastore (not shown) such that it is known which advertisements were distributed to which websites (i.e., activity tracking). In addition, when a user clickthroughs an advertisement, the system will get the clickthrough request and log that action to the review management datastore and redirect the user to the advertisement clickthrough target. In addition to tracking the website and the advertisements on clickthroughs, the system can determine the time of the clickthrough and which reviews or other types of content were displayed alongside the advertisement when the clickthrough occurred.

Figure 11:
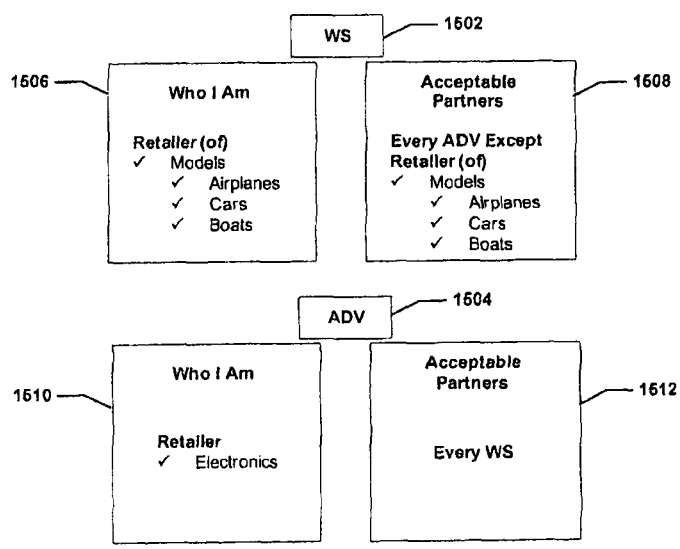
FIG. 11 illustrates an overview of enrollment in the review management system in accordance with an exemplary embodiment.
Figure 12:
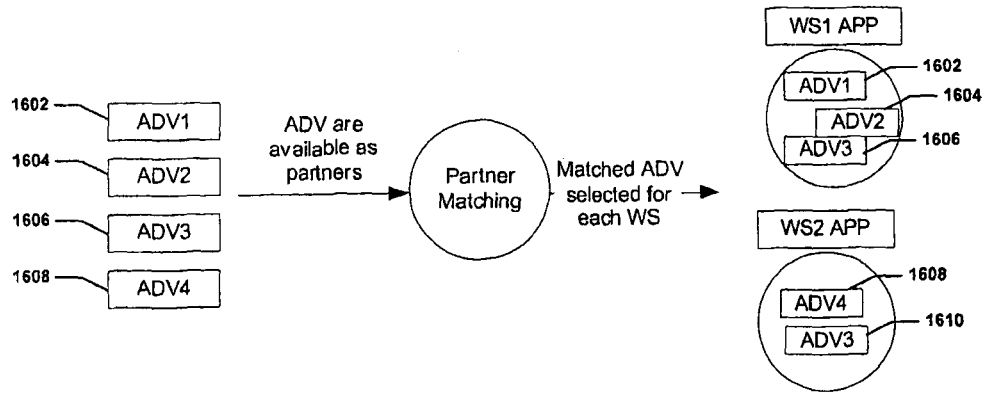
FIG. 12 illustrates an overview of a partner matching stage with the review management system in accordance with an exemplary embodiment.

FIG. 11 illustrates a specific example of matching a website 240 and an advertisement 242 within a review management web document 244 via a review management system (not shown). The advertisement 242 is placed by a first advertiser. In this example, the website 240 and the first advertiser are members of the review management system. The website type selected for the website 240 is "Retailer." The advertiser type selected by the website 240 is to exclude "Retailer." In this manner, advertisements that are from other websites identified as retailers can be excluded. Such logic can be employed to prevent competitive entities (e.g., other retailers) from appearing on the website 240 within the review management system.

The review management web document 244 includes product information such as a description, one or more ratings, etc. In addition, one or more advertisements (e.g., advertisement 242) can be included wherein a user can click on a advertiser hyperlink to navigate to the advertiser's website. In this example, the advertiser types selected by the first advertiser are "Portal" and "Classified Ads." There is no website type selection by the first advertiser. Since the advertiser of advertisement 242 did not select "Retailer" as an advertiser type, based on relevancy matching, the advertisement 242 was not excluded from the website 240.

In contrast, the advertisement 246 of a second advertiser is not selected for distribution to the website 240. In this example, the second advertiser selected the advertiser type "Retailer" and selected to exclude the website type "Retailer." Thus, because of relevancy matching, the advertisement 246 from the second advertiser was not selected for distribution to the website 240, since the website excluded "Retailer" advertiser types. Moreover, even if the website 240 did not exclude "Retailer" types, the advertisement 246 would not have been selected since the second advertiser excluded "Retailer" website types.

Figure 13:
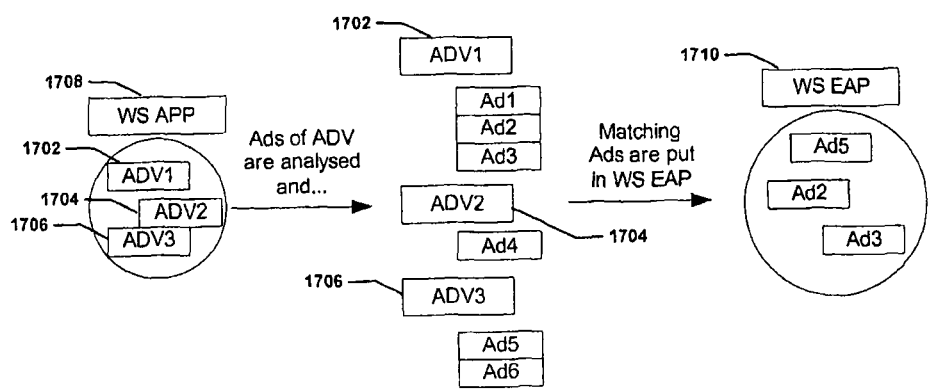
FIG. 13 illustrates an overview of the head eligibility stage with the review management system in accordance with an exemplary embodiment.

FIG. 13 illustrates a method 300 of partner and ad matching that may be employed by a review management system. Among other uses, matching can be employed to determine which advertisements are eligible for distribution to a website in a review management system. There are many functionalities that are enabled through the partner and ad matching, as will be appreciated and understood by those skilled in the art upon reading the present disclosure, some of which will be discussed in more detail herein.

By matching up advertiser and website types, member websites can get advertisements that will not conflict with their website. For example, an electronics retailer may not want to get advertisements from other retailers (e.g., competing retailers) and therefore, can select a "Retailer" website type for themselves and also opt not to allow advertiser types of type "Retailer." In this case, the system will not distribute advertisements that are from other retailers to the website. Similarly, advertisers also are able to participate in the system with websites who are not of the same type as they are.

Terms of the method 300 and their definitions are provided as follows:

1. Enrollment processes—A purpose is for every website and advertiser to generally indicate "Who I Am" and "Who are Acceptable Partners."

2. Partner-Matching stage—Eligible advertisers determined for a particular website.

3. Advertisement-Eligibility stage—Advertisements of the eligible advertisers can be further filtered based on advertisement target criteria 4. Advertisement to web document matching stage—further filtering can be done on the advertisements to determine the eligible ones based on business rules, bidding and quality factors.

5. Advertisement to web document selection—Final advertisement filtering can be done based on business rules, bidding and other factors and advertisements can be inserted into an RMWD.

Figure 14:
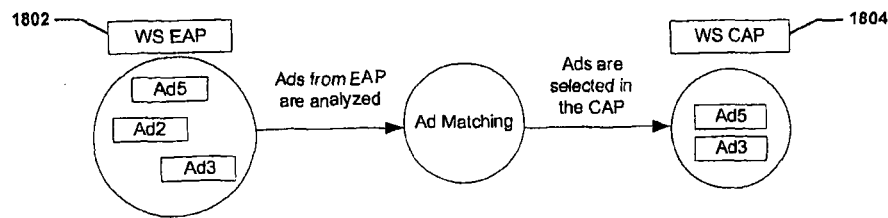
FIG. 14 illustrates an overview of an ad to web document matching stage with the review management system in accordance with an exemplary embodiment.

FIG. 14 illustrates an overview of partner and ad matching within the review management system (RMS) 10. The RMS 10 manages the automated enrollment and partner matching of advertisers and websites to allow innovative, easy and useful ad distribution to the websites enrolled in the RMS 10. In this manner, partner and ad matching can be used to identify which Ads are eligible for distribution to a WS in the RM System. Furthermore, Ad distribution logic can be utilized to select the most appropriate Ads at the time of content distribution.

Advertisements Ad1 1402, Ad2 1404, Ad3 1406, and Ad4 1408 are all enrolled in the RMS 10 and are available for distribution to one or more websites. Utilizing one or more partner and ad matching methods described herein, Ad2 1404 and Ad3 1406 are distributed to a WSWD 1410 via an RMWD 1408 contained therein.

The enrollment processes can be accessed by a website or advertiser via general access (for example DAM) to the RMS. One way to implement the enrollment processes is as follows:

At reference numeral 302, a website selects one or more partner definition criteria. This declares the "Who I Am" of the website. Optionally, the RMS can determine the website partner definition criteria. At 304, the website optionally selects zero or more partner relevancy criteria. This defines the acceptable advertiser partners for the website. If no partner relevancy or explicit partner relevancy criteria is defined for the website, this indicates that all partners are acceptable to the website. At 306, the website optionally selects zero or more explicit partner relevancy criteria. This can further define the acceptable advertising partners of the website.

Figures 20, 21:
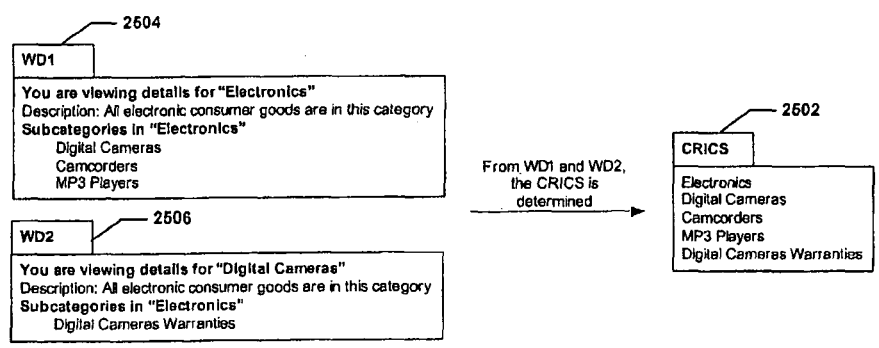
FIG. 20 illustrates ad target criteria employed with the review management system in accordance with an exemplary embodiment.
FIG. 21 illustrates an overview of content relevant item catalog subsets in accordance with an exemplary embodiment.

FIG. 20 illustrates an exemplary partner definition criterion 2000. This partner definition criterion can be employed with any advertiser and/or website enrolled in the RMS 10. The partner definition criterion 2000 includes a type list 2002 and an item catalog subset 2004. The Type List 2002 is a list of one or more website Types or advertiser Types. The Type List indicates a list of roles in relation to the item catalog subset of a partner definition criteria.

The type list 2002 consists of types "Retailer" and "Portal" in relationship to the item catalog subset 2004 of "Electronics" and its sub-hierarchy. When a website selects a partner definition criteria, the partner definition criteria can be referred to as a website partner definition criteria. When an advertiser selects a partner definition criteria, the partner definition criteria can be referred to as an advertiser partner definition criteria. A partner relevancy criteria comprises a partner definition criteria along with an Option field that specifies "Include" or "Exclude." When a website selects a partner relevancy criteria, the partner relevancy criteria can be referred to as the website partner relevancy criteria. When an advertiser selects a partner relevancy criteria, the partner relevancy criteria can be referred to as the advertiser partner relevancy criteria.

Returning to FIG. 13, at 308, the website selects one or more website item catalog subsets (WSICS). The WSICS is an ICS that is selected by a website at enrollment. The WSICS may influence the prioritization and/or filtering of review content that will be distributed to the website. Alternatively, the website can set the partner definition item catalog subset as the WSICS (the item catalog subset portion of all website partner definition criterion are used to determine the WSICS). If no WSICS is set by the website, the system can setup a default WSICS as the WSICS of the website.

At 310, an advertiser selects one or more partner definition criteria. This declares the "Who I Am" of the advertiser. Optionally, the advertiser can have the system determine the partner definition for the advertiser. At 312, the advertiser optionally selects zero or more partner relevancy criteria. This defines the acceptable website partners for the advertiser. If no partner relevancy or explicit partner relevancy is defined for the advertiser, this indicates that all partners are acceptable to the advertiser.

At 314, the advertiser optionally selects zero or more explicit partner relevancy criteria. This further defines the acceptable website partners of the advertiser. At 316, the advertiser creates one or more advertisements. At 318, the advertiser optionally selects one or more advertisement target criteria. This also defines a default of advertisement target criteria for the advertiser's advertisements. At 320, the advertiser optionally selects one or more advertisement target criteria (any type such as Basic, DR, etc.) for each advertisement that the advertiser creates. The advertisement target criteria is optional for the advertiser and the advertisement can specifically be marked to not use the advertiser default advertisement target as well.

Figure 15:
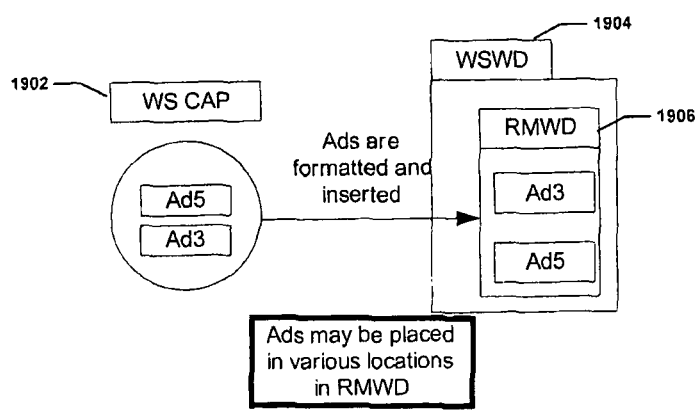
FIG. 15 illustrates the final ad selection for a web document with the review management system in accordance with an exemplary embodiment.

FIG. 15 illustrates an enrollment scenario of the RMS 10 for a WS 1502 and an ADV 1504. The WS 1502 and/or the ADV 1504 can utilize item catalog subsets and advertiser and website types that help identify the WS 1502 and the advertiser 1504 enrolled in the RMS 10. The enrollment information can also be employed to help identify acceptable partners for each website and ADV enrolled in the RMS 10.

At 1506, the WS 1502 selects an ICS to identify itself as a 'retailer' of models of airplanes, cars, and boats. In addition, at 1508, the WS 1502 identifies every advertiser enrolled in the RMS 10 with the exception of advertisers of type 'retailer' of 'model airplanes', 'cars', and 'boats' as acceptable partners. Thus, the WS 1502 can eliminate potentially competitive advertisement content distributed to its website. At 1510, the ADV 1504 identifies itself as a 'retailer' of 'electronics'. At 1512, the ADV 1504 identifies every website enrolled in the RMS 10 as an acceptable partner.

In the partner-matching stage, partner matching logic can be utilized to determine acceptable partners for a website. For each website, there exists an advertiser partner pool that represents the valid partners of a website. Initially, all advertisers enrolled in the review management system are put into the advertiser partner pool.

At 322, the website partner relevancy to advertiser partner definition matching stage occurs. If no website partner relevancy criteria exists, then this step can be skipped and all advertisers can be determined to have passed this stage. This logic can be repeated for each website with each advertiser in the RMS 10. The following logic is provided for specifically determining whether or not an advertiser is to be included in the advertiser partner pool for a website, in accordance with one exemplary embodiment:

For each website partner relevancy criteria of the website, compare to every advertiser partner definition criteria of the advertiser. If every website partner relevancy criteria matches with every advertiser partner definition criteria, then the advertiser is added to the advertiser partner pool of the website. This logic is repeated for every advertiser to determine all advertisers that are to be put in the advertiser partner pool of the website in this step.

At the end of PR to PD matching there is a set of ADV entities that have been added to the APP.

FIG. 21 is a flow chart that illustrates one exemplary method to match partner relevancy criteria with partner definition criteria. At the end of this process, the partner relevancy criteria is determined to either match or not match the partner definition criteria. At 2102, the method begins. More particularly, at 2102, a determination is made as to whether type lists match between the partner relevancy criteria and the partner definition criteria. If there is a match, at 2106, a determination is made as to whether there is an item catalog subset between the partner relevancy criteria and the partner definition criteria. If there is a match, at 2108, a determination is made as to whether the partner relevancy criteria has an option selected to "Include" or "Exclude." If an "Exclude" option is selected, at 2110, it is determined that the partner relevancy criteria does not match the partner definition criteria. Alternatively, if an option "Include" is selected, at 2112, it is determined that the partner relevancy criteria matches the partner definition criteria.

Figure 22:
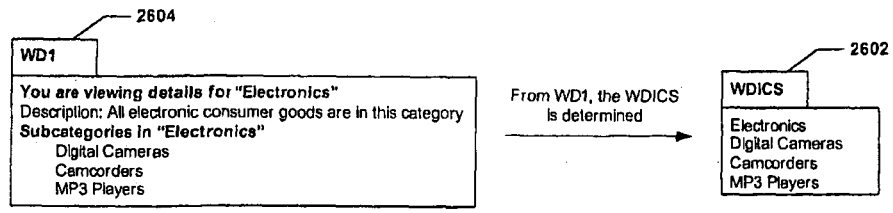
FIG. 22 illustrates an overview of web document item catalog subsets in accordance with an exemplary embodiment.

FIG. 22 shows an example of a partner relevancy criteria that is matched and also not matched with a partner definition based on which option has been selected for the partner relevancy criteria. A partner relevancy criteria 2202 includes a partner definition criteria 2204 which is compared to a partner definition criteria 2206. As shown, the partner definition criteria 2204 includes a type list selected as "Retailer" and "Portal." The partner definition criteria 2204 also includes an item catalog subset that includes "Digital Cameras," "Camcorders," and "MP3 Players" within an "Electronics" category. The partner definition 2206 includes a type list "Retailer" and an item catalog subset that includes "Camcorders" within an "Electronics" category.

As shown in FIG. 22, if an "Include" option is selected by the partner relevancy criteria 2202, then the partner relevancy criteria 2202 and the partner definition criteria 2206 match each other. Conversely, if an "Exclude" option is selected by the partner relevancy criteria 2202, then the partner relevancy criteria 2202 and the partner definition criteria 2206 do not match each other.

As a further example, when any one type in the type list included in the partner definition criteria 2204 is contained in the type list included in the partner definition criteria 2206, the two type lists are said to match. Otherwise, the type lists from the partner definition criteria 2204 and the partner definition criteria 2206 are not matching. For example, Type List A of partner definition criteria A contains "retailer" and "portal", Type List B of partner relevancy criteria B contains "portal" and "magazine" and Type List C of partner definition criteria C contains "retailer". Type List A and B match because at least one Type in the list is contained in the other list. However Type List B and C do not match since there are no type from one of the lists contained in the other list. Type List A and C also match because "retailer" is contained in both lists A and C. Also, if any one of the two Type Lists is empty, then the Type Lists are said to match. It is to be appreciated that although this is only one approach to match Type Lists, other logic can also be used. In addition, within the RMS 10, specifying a type list in either a partner relevancy or partner definition criteria is optional.

If there is no type lists match at 2104, or no ICS match at 2106, at 2114, a determination is made as to whether the partner relevancy criteria has an option selected to "Include" or "Exclude." If an "Exclude" option is selected, at 2112, it is determined that the partner relevancy criteria matches with the partner definition criteria. Alternatively, if an option "Include" is selected, at 2110, it is determined that the partner relevancy criteria does not match the partner definition criteria.

Returning to FIG. 13, at 324, the website partner definition criteria are matched to the advertiser partner relevancy criteria of every advertiser in the advertiser partner pool and further advertiser filtering occurs in this stage. The following logic can be employed for every advertiser in the advertiser partner pool.

For each advertiser partner relevancy criteria of the advertiser, compare to every website partner definition criteria of the website. The matching method described above in FIG. 21 can be employed to make such comparison. If every advertiser partner relevancy criteria matches with every website partner definition criteria, then the advertiser remains in the advertiser partner pool of the website. Otherwise, the advertiser is removed from the advertiser partner pool of the website. This logic is repeated for every advertiser in the advertiser partner pool of the website to determine whether the advertiser will remain in the advertiser partner pool of the website.

At each step 326, explicit partner selections for both the website and the advertiser are determined for further filtering. In this step, explicit partner relevancy criteria selections for the website and each advertiser in the RMS 10 are analyzed to further determine the advertise partner pool of the website.

Figure 23:
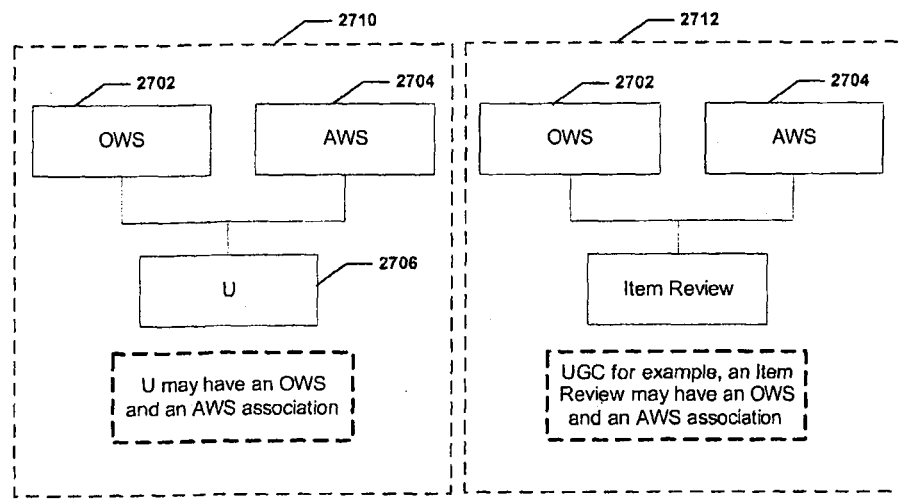
FIG. 23 illustrates an overview of access websites and originating websites employed with the review management system in accordance with an exemplary embodiment.

FIG. 23 illustrates an explicit partner relevancy criteria 2302 that includes a list 2304 and an option 2306. The List 2304 contains one or more Partner Names and Base URLs. In this example, the list 2304 excludes three entries in a list 2304, particularly Best Buy, Circuit City and www.yahoo.com. The explicit partner relevancy criteria 2302 contains an Include or Exclude Option 2306 similar to the partner relevancy criteria. The Option 2306 is used to determine which partners are to match based on lookup of the partner name and URLs. An explicit partner relevancy criteria EPR for website WS can be referred to as the website explicit partner relevancy criteria and an explicit partner relevancy criteria for an advertiser can be referred to as an advertiser explicit partner relevancy criteria.

The following logic can be used to match EPR. For every website explicit partner relevancy criteria, it is determined if there are any advertisers outside of the current website advertiser partner pool that are to be included as partner matches based on the website explicit partner relevancy criteria. For every advertiser that is to be added due the above step, it is confirmed that the advertiser partner relevancy criteria to website partner definition criteria selections allow the advertiser to be a partner match with the website and if so add the advertiser to the current website advertiser partner pool.

For every advertiser still outside of the current website advertiser partner pool, check each advertiser explicit partner relevancy criteria to determine if the advertiser is to be included as a partner of the website. For every advertiser that is found in the above step, confirm that the website partner relevancy to advertiser partner definition criteria selections allow the advertiser to be a partner match with the website and if so add the advertiser to the current website advertiser partner pool. For every advertiser in the current website advertiser partner pool, check again that the each website explicit partner relevancy criteria and each advertiser explicit partner relevancy criteria allow the advertiser to remain in the website advertiser partner pool.

Figure 16:
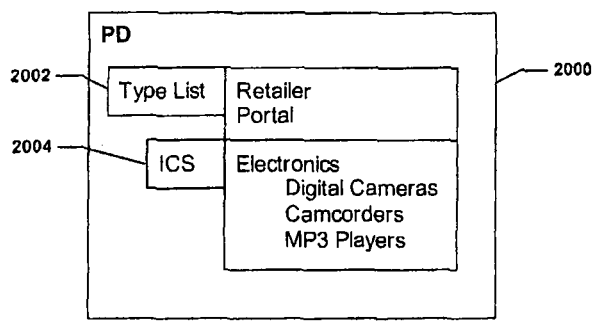
FIG. 16 illustrates part of definition criteria employed with the review management system in accordance with an exemplary embodiment.

FIG. 16 illustrates exemplary partner matching logic that can be employed to determine acceptable partners for a WS. For each WS, there exists an ADV Partner Pool (APP) that represent the valid partners of a WS. APP data for each WS is persisted in RMS and available for other processes.

Figure 17:
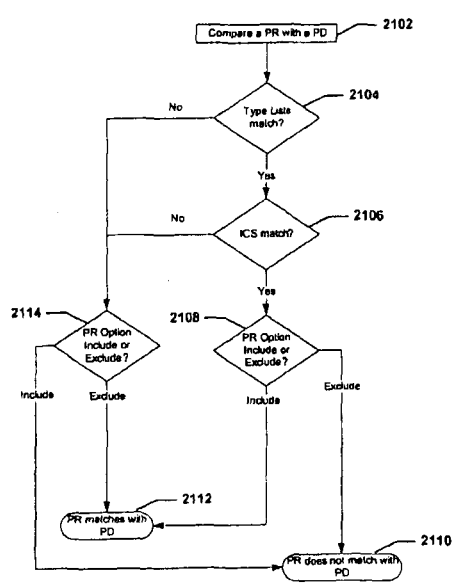
FIG. 17 illustrates a method for partner relevancy to partner definition matching with the review management system in accordance with an exemplary embodiment.

Returning to FIG. 13, at 328, the advertiser partner pool contains only acceptable advertiser partners for the website. At this point ad eligibility logic can be utilized to determine eligible advertisements for the website. At 330 and 332, the advertisements of the advertisers in the advertiser partner pool of the website are eligible for distribution to the website and put into an eligible advertisement pool. The eligible advertisement pool represents the advertisements that are eligible for distribution to the website. As shown in FIG. 17, advertisers ADV1 1702, ADV2 1704, and ADV3 1706, are included in a website advertiser partner pool 1708. Each advertiser 1702, 1704, and 1706 includes one or more advertisements. In this example, ADV1 1702 includes advertisements Ad1, Ad2, and Ad3; ADV2 includes advertisement Ad4, and ADV3 includes advertisements Ad5 and Ad6. The matching ads, Ad2, Ad3, and Ad5, are placed into a website eligible advertisement pool 1710.

The following logic can be used to determine the eligible advertisement pool for a website. First, every Ad that belongs to any of the advertiser entities in the advertiser partner pool for the website can be put into the eligible advertisement pool. For each Ad, the ad target criterion can be analyzed. If no ad target criterion is defined, the Ad is put into the eligible advertisement pool and no further processing of the Ad occurs in this step. Otherwise, the Basic ad target criterion of the Ad is matched with the website advertiser partner definition criteria and if a match occurs in any of Ad's Basic ad target criterion, the Ad is put in the website eligible advertisement pool.

If the Ad is not in the eligible advertisement pool yet, the demographic relevancy ad target criteria that has a demographic relevancy Context of 'WS' are compared. If the demographic relevancy Target is 'IT', then the website ITDRP is compared with the DR Factor and DR Score Range of the demographic relevancy ad target criterion and if the demographic relevancy Target is 'GC' then the website GCDRP is compared in place of the website ITDRP. If there is a match in the comparisons, then the Ad is placed in the eligible advertisement pool. If the demographic relevancy Context is 'RMC', then the Ad is automatically placed in the eligible advertisement pool without any comparison at this point.

If the Ad is not in the eligible advertisement pool yet, the REP ad target criteria of the Ad is analyzed to determine whether the Ad is to be placed in the eligible advertisement pool by comparing the relevant REP score of the website with the REP Score Range of the REP ad target criteria. This comparison is done if the REP Target is 'AWS'. If the REP Target is any other value then the Ad is automatically placed in the eligible advertisement pool for later processing. Optionally, if one ad target criteria is specified that does not result in a match, the Ad may not be subject to other ad target criteria comparisons depending on the configuration of the Ad. At the end of this step, the eligible advertisement pool contains all Ads that are eligible for distribution to the website and subject to further processing.

The remaining Ads are eligible for distribution to the website but, in one exemplary embodiment, are subject to further filtering based on business rules, quality determination and other rules of the review management system 10. One such filtering mechanism is where distribution priority is given to Ads that have at least one ad target criteria defined for them versus other Ads that do not have any ad target criteria. Another filtering mechanism that gives distribution priority can be the bidding amounts on each Ad. The item catalog of the review content that is being distributed may also be a factor in which Ads are distributed. Up to this point, the ad and partner matching can be done in advance of content delivery and stored in the RMS 10 for later use.

Partner-matching and advertisement-eligibility logic can occur in real-time (as advertisement distribution is to occur) or the matches can be predetermined. The acceptable partners matching a website with a pool of advertiser entities can be predetermined (for example on a nightly or hourly schedule) and stored so that the logic does not have to occur every time content is to be distributed. The advertisements that are to be distributed to a website can also be queued up. Predetermination of matching partners and advertisements can also occur selectively when the relevant master data for an advertiser or website changes or is added. Up to this point the ad and partner matching can be done in advance of content delivery and stored in RMS for later use.

Figure 24:
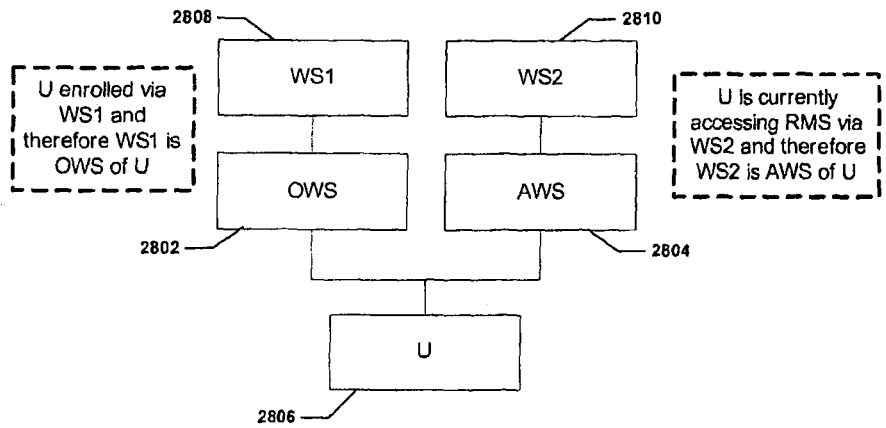
FIG. 24 illustrates disparate implementations of originating websites and access websites in accordance with an exemplary embodiment.

FIG. 24 illustrates an ad target criteria 2402 which specifies the target of an Ad. The ad target criteria 2402 consists of three components, the Target Option 2404, an item catalog subset 2406 and a Types List 2408. The Target Option 2404 specifies either 'WS', 'RC', 'WD' or 'All'. The target option 2404 'WS' specifies that the target of the Ad is to be a website whose website partner definition criteria selections match. The target option 2404 'RC' means the target will be the review management web document. The target option 2404 'WD' means the website web document is targeted. The target option 2404 'All' specifies all options of website, review content, and web document are targeted. The item catalog subset 2406 specifies an item catalog subset for which the Target Option 2404 is valid. The Types List 2408 contains a list of website Types that the Ad will be targeted to. The combination of the three components 2404, 2406, and 2408 of an ad target criteria may be used to specify how an advertisement is targeted in the RMS 10.

In this example, the ad target criteria 2402 is targeted to "Retailers" and "Portals". In addition, the ad target criteria 2402 is targeted to the ICS 2406 that contains "Electronics" (among other item categories under the Electronics hierarchy). The Types List 2408 is optional such that if no Types List is specified, the ad target criteria targets all website Types. The item catalog subset is also optional. One or more Target Options may be selected in the ad target criteria 2402. The Target Option 2404, the item catalog subset 2406 and the Types List 2408 of the ad target criteria 2402 is also known as the basic ad target criteria of the Ad.

The ad target criteria of an Ad can be extended to include targeting an Ad to demographic relevancy profiles and scores. This portion of the ad target criteria is called the demographic relevancy ad target criteria. In one example, the following fields are the added to the ad target criteria:

DR Context—Value of "WS" can mean the DRP of the WS is targeted. Value of "RMC" can mean the RMWD content is targeted.

DR Target—"IT" can mean the ITDRP is targeted. "GC" can mean GCDRP is targeted.

DR ICS—The ICS for which the comparison is valid.

DR Factor—This can be the factor being targeted. For example, "ease of use".

DR Score Range—A score range is specified. For example ">3.5".

When comparing an ad target criteria to website partner definition criteria, the Ad of the ad target criteria is said to match if the Types List and the item catalog subset of the ad target criteria match the Types List and the item catalog subset of the website partner definition criteria.

When comparing the ad target criteria to review management web document, the advertisement of the ad target criteria is said to match if the item catalog subset of the ad target criteria matches with the item catalog subset of the review management web document. When comparing the ad target criteria to website web document, the advertisement of the ad target criteria is said to match the website web document if the item catalog subset of the ad target criteria matches with the item catalog subset of the website web document and the Types List of the ad target criteria matches with at least one Type List in any of the website partner definition criteria of the website web document.

When comparing the demographic relevancy ad target criteria of an Ad with a website ITDRP, the demographic relevancy Target should be 'IT' and the demographic relevancy Context should be 'WS'.

The DR Factor field is used to determine which factor (of the ITDRP) to compare. If the DR factor is in the website ITDRP, then the Score Range is compared with the corresponding score range in the ITDRP (otherwise there is no match). If the score for the corresponding factor in the ITDRP is within the DR Score Range of the DR ad target criteria then the DR ad target criteria matches with the ITDRP. For example, if the ad target criteria values are demographic relevancy Target='IT' and the DR Factor is 'Ease of Use' and the DR Score is '>3.0', then ITDRP with score of '>3.0' for the factor 'Ease of Use' will match and those ITDRP with a score of 3 or below for the factor of 'Ease of Use' will not match.

If the demographic relevancy Target is 'GC' and the demographic relevancy Context is 'WS', then the comparison is valid for the website generated content DRP and compared similar to how the website ITDRP is compared. Also, in an exemplary embodiment, only DRP within the item catalog subset specified by the demographic relevancy item catalog subset are valid for comparison (otherwise, it is not a match).

When comparing the demographic relevancy ad target criteria of an advertisement with an item from an item catalog, the demographic relevancy Target should be 'IT' and the demographic relevancy Context is 'RMC'. The rest of the comparison can be done similarly to how the website ITDRP was compared, but in this case, the IT's score for the DR Factor of the demographic relevancy ad target criteria is used to determine whether there is a match or not. When the demographic relevancy Target is 'GC' and the demographic relevancy Context is 'RMC', then the comparison can be done similarly to the comparison with IT except that the comparison is valid for generated content instead.

Alternatively or in addition, the ad target criteria of an Ad can be extended to include targeting the Ad to reputation of various entities such as a user or a website. The fields in a reputation ad target criteria can include:

REP Target: OWS, AWS or CE.

REP Type: Multiple REP Types for an entity are possible and this specifies which REP to analyze. This can be optional.

REP Score Range: A score range is specified. For example ">2.5".

When comparing the reputation ad target criteria of an Ad with an Entity, the Ad can be said to match the Entity if the reputation of the Entity is within the REP Score Range. If a REP Type is specified, then the comparison is done utilizing the corresponding REP score of the Entity. For example, if REP Type is for item reviews and the REP target is OWS, then the corresponding REP score for item reviews of the OWS is analyzed to determine if there is a match.

Moreover, the ad target criteria of an Ad can be extended to include targeting the Ad to the quality scores of item in an item catalog or generated content. The fields in a quality targeting of an advertisement can include:

QUAL Target: IT or GC

QUAL Type: This specifies the type of QS for comparison

QUAL Score Range: A score range is specified. For example ">2.5".

When comparing the quality ad target criteria of an Ad with content (such as an item review), the Ad is said to match the content if the QS score of the content is within the QUAL Score Range. If a QUAL Type is specified, then the comparison can be done utilizing the corresponding QS score (for same QUAL Type) of the content.

If some ad target criteria is specified that does not result in a match, the Ad may not be subject to other ad target criteria. For example if basic ad target criteria is specified and does not match in one matching process and then no matter if the reputation ad target criteria matches (in the same or other matching processes), the Ad is not to be distributed. This type of rule and others can optionally be specified for each Ad.

If multiple comparisons are specified then if any of the above matches occur for an ad target criteria then it can be said that the ad target criteria matches to the comparison target. Optionally if multiple comparisons are specified and also that all comparisons have to match are specified as well for the ad target criteria, then every comparison has to match in order for the ad target criteria to match the comparison target.

The remaining advertisement are eligible for distribution to the website but subject to further filtering based on business rules, quality determination and other rules of the review management system. One such filtering mechanism is where distribution priority is given to advertisements that have an advertisement target criteria defined for them versus other advertisements that do not have any advertisement target criteria.

Another filtering mechanism that gives distribution priority can be the bidding amounts on each advertisement. The item catalog of the review content that is being distributed may also be a factor in which advertisement are distributed.

Figure 18:
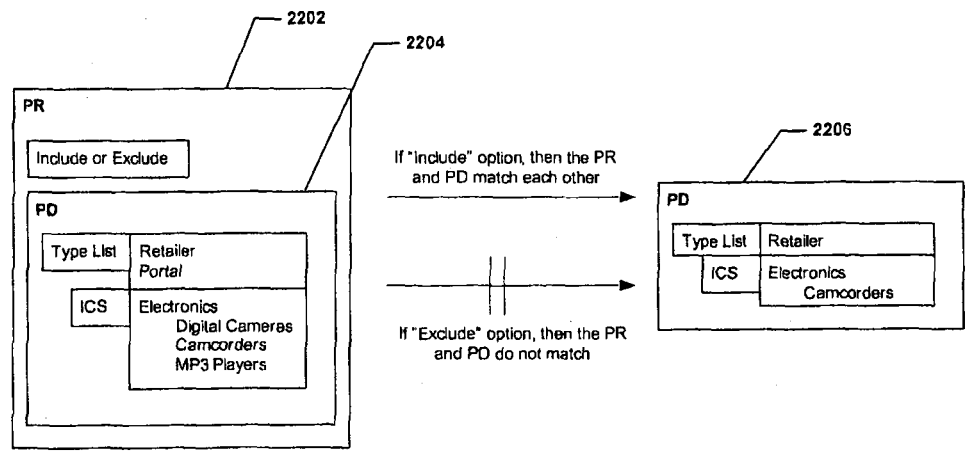
FIG. 18 illustrates partner relevancy compared to a partner definition with the review management system in accordance with an exemplary embodiment.

As discussed in further detail below, a description is provided as to how Ads may be selected for a particular review management web document from the eligible advertisement pool into the current ad pool. A current ad pool may be generated for each review management web document at the time the review management web document is distributed via a website. At this point in the method, a review management web document is being generated and delivered to a user via a website. FIG. 18 illustrates an Ad to web document matching stage overview which includes ad matching from a website eligible advertisement pool 1802 to a website current ad pool 1804. The website eligible advertisement pool 1802 includes three advertisements Ad2, Ad3, and Ad5. These advertisements are analyzed and ad matching is performed to select Ad3 and Ad5 for selection into the website current ad pool 1804.

The user of the review management web document can be determined for the review management web document if the user has not been already determined. In some cases, it may not be possible to identify a particular user. However, the absence of an identified user does not materially affect Ad distribution functionality and functionality specific to an identified user can be omitted. There should or can already be an eligible advertisement pool for the relevant website (the AWS) at this point. If not, an eligible advertisement pool can be generated for the website.

The RMS can utilize the WSICS of the AWS and prioritize and/or filter content when generating a RMWD. For example, when generating item category listings in a RMWD home page of RMS, the WSICS of the AWS can influence which item categories are listed above others. Demographic relevancy can also be utilized to determine prioritization and/or filtering of content as well. For example, if the AWS had a GCDRP for an ICS of 'Digital Cameras' item category and in said GCDRP, the 'Expertise Level' factor was specified to be '<2.5', then GC such as item reviews that have an 'Expertise Level' score of less than 2.5 may be prioritized to the top of the listings when displaying an item's item reviews (i.e., item is in the ICS of 'Digital Cameras') in an RMWD.

Other WS or ADV enrollment factors may influence the generation and presentation of an RMWD as will be understood and appreciated by those skilled in the art upon reading the present disclosure.

Continuing with the Ad matching, a determination can be made as to whether or not Ads are to be distributed to the website. This analysis of whether or not ads are accepted at the WS, may be done in advance (before the other stages) so as not to unnecessarily match the website with advertisers. Settings in the account master of the website will indicate whether or not Ads are to be distributed in the review management web document. Furthermore, one or more business rules of the RMS 10 such as the types of data currently being distributed determine whether or not Ads will be distributed in the review management web document. There can be other business rules and system configuration options and account settings that may affect whether or not Ads are to be distributed in the review management web document.

Based on the website, user and review management web document, Ads in the website eligible advertisement pool can be identified for distribution in the review management web document and put into a current ad pool for the review management web document. The following logic can be used to populate the current ad pool for a review management web document:

Determine the review management web document item catalog subset (RMWDICS), website web document item catalog subset (WSWDICS), User information (DR and reputation information), DR and quality information of the items from an item catalog and generated content in the review management web document and also the AWS reputation. This information can be referred to as ad-relevant information of the review management web document. The RMS 10 can be configured as to when and what ad-relevant information is determined in content delivery and what ad-relevant information is targeted. RMS may also determine ad-relevant information in previous batch processes and keep it in a RMS datastore for use in this stage. An example is to determine the ad-relevant information of a WSWD beforehand and store said ad-relevant information in RMS for access (and comparisons with ad targeting criteria) when content is delivered.

The Ads in the EAP are accessed and the Ad targeting options (if any) are analyzed for each (the process may stop and move on to the next step if determined that there are enough Ads in the CAP).

Depending on the AT of an Ad, the Ad is matched to the appropriate ad-relevant information of the RMWD:

The DR ad target criteria (if DR Context is 'RMC') is compared with the DR information of the review management web document for a match. The DR information of an review management web document is, for example, the DR of an item from an item catalog or the DR of generated content contained with the review management web document.

The Basic ad target criteria is compared with the appropriate ad-relevant information of the review management web document if the Basic ad target criteria Option is 'RC', 'WD' or 'All'. For example if the Target Option is 'RC', the RMWDICS is used for comparison or if the Target Option is 'WD', the WSWDICS is used for comparison to the advertisement.

The REP AT may be compared with the appropriate REP score of the AWS, OWS or CE depending on the REP Target. OWS and the CE are determined from the content on the RMWD. For example, if there are three (3) item reviews in an RMWD, then each item review is analyzed to determine a group of CE and OWS. The REP AT may then be compared to the corresponding REP score of the group of CE and OWS.

The QUAL AT may be compared with the appropriate QS scores of the IT and GC in the RMWD. For example, if there are two (2) IT in the RMWD, then the corresponding QS of each IT are compared to the QUAL AT for a match.

If any Ad comparisons result in a match, then the Ad is selected to the current ad pool. However, if the ad target criteria is configured to require all comparisons to match, then even if one ad target criteria comparison fails to match, the Ad is not selected to the current ad pool.

According to the business rules of the RMS 10, the highest prioritized Ads can be selected from the current ad pool and the rest are removed. Ads can also be prioritized for selection utilizing many different methods. Also, if there are multiple Ads available for distribution, then the bidding information on the Ads can be used to determine which Ads are prioritized over other Ads based on the bids. Implementation of Ad prioritization can occur by adding an integer value representing the priority of the Ad to each Ad and specifying that a higher value indicates a higher priority for the Ad.

In a final step, for partner and ad matching in one exemplary embodiment, the Ads in the current ad pool of a particular review management web document have been identified for distribution and further selection processes determine the final Ads that are distributed in the review management web document. Further selection processes could include, for example, review management business rules, maximum number of Ads to be displayed on a particular review management web document and other selection processes as well.

Figure 19:
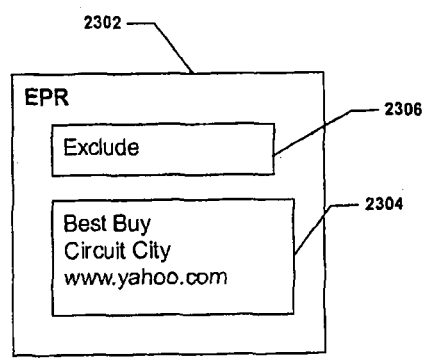
FIG. 19 illustrates explicit partner relationship criteria employed with the review management system in accordance with an exemplary embodiment.

FIG. 19 illustrates a final ad selection process in accordance with an exemplary embodiment. Advertisements Ad3 and Ad5 from a website current ad pool 1902 are formatted and inserted into a review management web document 1906. It is to be appreciated that the ads can be placed in various locations in the review management web document 1906.

Once the above steps are completed, the advertisements in the eligible advertiser pool of a particular website are eligible for distribution to said website and further selection processes determine the final advertisements that are distributed in the review management web document. Further, selection processes can include for example review management system business rules, maximum number of advertisements to be displayed for a particular webpage view, quality and bidding ad selection processes and others as well.

For each website web document, the final selected advertisements may be different depending on a cycling of advertisements and also the review management web document item catalog subset currently being distributed to the website. For example, if the web document being distributed contained review content for digital cameras item categories, advertisements that are explicitly targeted to digital cameras may be displayed before other advertisements that are not specifically targeted to the digital cameras item category.

The RMS 10 utilizes business rules or prioritization to eliminate Ads from the current ad pool if necessary. An example of one such business rule is that there are too many Ads for the current user viewing the review management web document.

Remaining Ads in the current ad pool for the review management web document are formatted and placed in various locations in said review management web document according to business rules. In some situations, Ads can be inserted adjacent the content that caused the selection of the Ad. In other situations, the Ads can be inserted in non-adjacent sections (to the relevant content) in the review management web document.

In cases where there are no Ads selected for a review management web document, the eligible advertisement pool may again be accessed and one or more Ads may be selected based on prioritization and business rules that convey which Ads to display in case Ad matching was unsuccessful. There may be cases where no Ads are found to be distributed for a review management web document and also it is not required to distribute an Ad in a review management web document.

It is to be appreciated that the algorithms described herein may be altered to distribute Ads using different logic as is known and understood by those skilled in the art. Optimization techniques that change the logic may be implemented to increase the efficiency or for other reasons.

In addition, website and advertiser types can be combined to one type and referred to as website types. This is useful to simplify the matching and selection of website and advertiser types. When advertiser types are consolidated with the website types, the website types can be used in place of advertiser types everywhere (i.e., globally).

Figure 25:
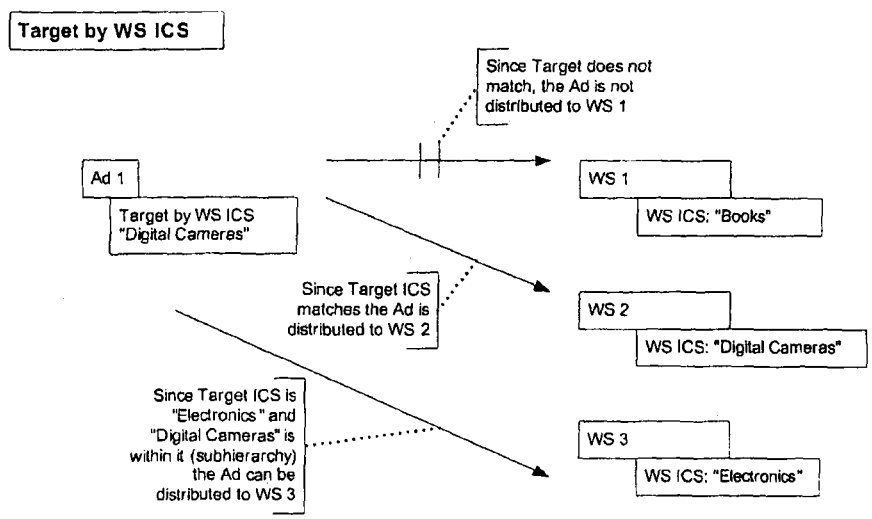
FIG. 25 illustrates ad targeting by item catalog subsets of disparate websites in accordance with an exemplary embodiment.

A content relevant item catalog subset (CRICS) is an item catalog subset that is used to describe the various items and item categories that are associated with content. Also, there may be key areas of the content that are analyzed for the ICS and thus limit the analysis of the content for purposes of the determining the CRICS of the content. For example, each item and item category associated with one or more web documents make up the CRICS for said group of web documents. FIG. 25 illustrates an overview of a CRICS 2502. In this example, the CRICS 2502 is determined based on analysis of content. A website may also describe a CRICS and store it as an enrollment option in which case the CRICS may also be referred to as the website item catalog subset (WSICS). Web documents WD1 2504 and WD2 2506 each contain content detail employed by the CRICS 2502.

In the illustrated example, WD1 2504 specifies details for "Electronics" wherein all electronic consumer goods are in this category. As shown, there are three subcategories within Electronics, Digital Cameras, Camcorders, and MP3 Players in this example. WD2 2506 specifies details for Digital Cameras wherein all electronic consumer goods are in this category. One subcategory is specified as Digital Cameras Warranties. From the analysis of content contained within WD1 2504 and the WD2 2506, the CRICS is determined. As a result of this analysis, the CRICS 2502 includes the following item catalog subset: Electronics, Digital Cameras, Camcorders, MP3 Players, and Digital Cameras Warranties.

A web document item catalog subset (WDICS) of a web document is an item catalog subset that is related to any key content area of said web document. The content is analyzed and any item from an item catalog or item category within said content are included in the WDICS of the web document. A key content area could be a listing of an item from an item catalog or an item category on the web document.

Figure 26:
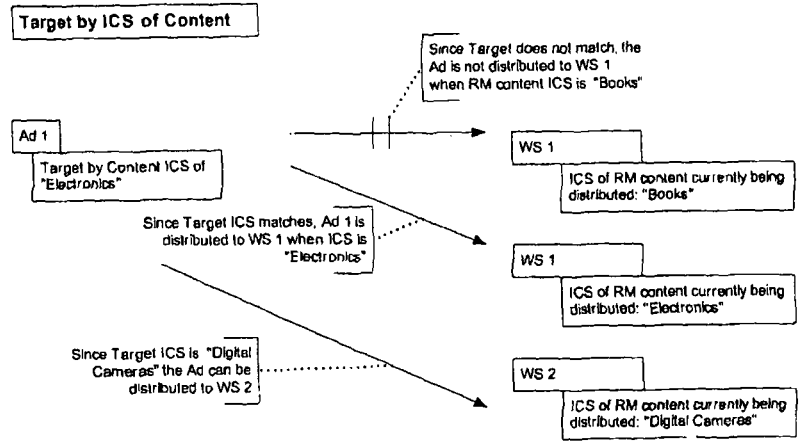
FIG. 26 illustrates ad targeting by item catalog subsets of content in accordance with an exemplary embodiment.

FIG. 26 illustrates an overview of a WDICS 2602 in relation to a web document WD1 2604. Across multiple requests for a web document, the content in a web document may change between requests and therefore the items from an item catalog and item categories associated with said web document may change and therefore the WDICS may be different for various requests of a web document. In this example, the web document WD1 2604 includes details for Electronics which includes the Subcategories Digital Cameras, Camcorders, and MP3 Players. From the WD1 2604, the WDICS is determined to include Electronics, Digital Cameras, Camcorders, and MP3 Players.

Figure 60:
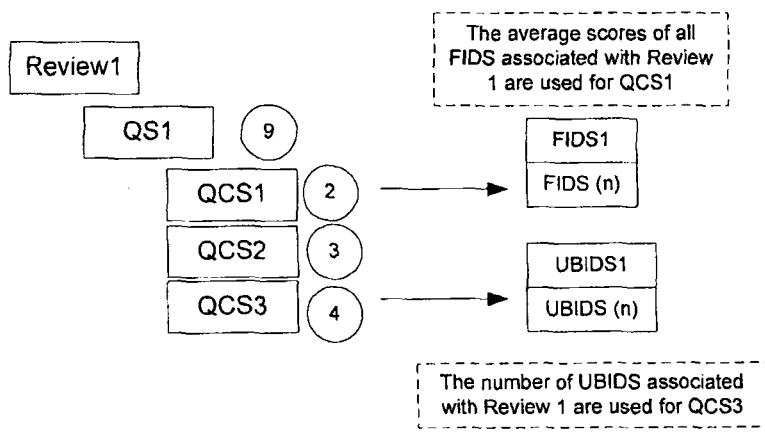
FIG. 60 illustrates a Quality Contributing Score being calculated using feedback on item reviews and another Quality Contributing Scores begin calculated using user baskets in the review management system in accordance with an exemplary embodiment.

In one embodiment, the RMS 10 allows Advertisers to target ads very specifically. As described herein, an advertisement may consist of text, hyperlink, images, and other media such as video, etc. All or part of the ad may be hyperlinked. By utilizing various algorithms, specific advertisements can be delivered to one or more appropriate websites via a review management web document. Partner and ad matching (as described herein at FIG. 13, etc.) and additional ad targeting insure that advertisements are targeted to be delivered to one or more appropriate websites (e.g., the website web document 6002). FIG. 60 generally illustrates an overview of the ad target system. Advertisements Ad1, Ad2, Ad3, and Ad4 are available for distribution to a website web document 6002 via a review management web document 6004. In this embodiment, after partner and ad matching and additional ad targeting analysis is conducted, advertisements Ad2 and Ad3 are selected to be delivered to the review management web document 6004.

The ad targeting functionality described below can be integrated with the partner and advertisement matching method 300 in various points of said method. For example, when implementing ad targeting by website types, the ad matching can be done in the ad eligibility stage by analyzing the basic ad target of an ad and comparing if any website types specified in said basic ad target match with the website types of the website for which the ad matching method 300 is being used. In another example, if an advertisement has a DR ad target and a DR Context of 'RMC' then the advertisement would be matched in the Ad to WD matching stage of method 300 since information about the review management web document is available in this stage.

The Basic, DR, REP, QUAL and TC ad targets can be utilized and in some cases extended as needed to implement ad targeting functionality.

Matching Ads by criteria that identifies the WS based on WS enrollment selections or WS enrollment preferences or a criteria that defines a WS, can be done in processes that run in the RMS 10 before content delivery processes so that matches between Ads and websites are done in advance of content delivery (pre-matching). Thus, the RMS 10 can identify and store the matching Ads for a website beforehand to save on resources required at time of delivering a RMWD for a website. The matching can also be done in real-time as well. Examples of situations where pre-matching can be done include targeting Ads by website Types or targeting Ads by website DRP. It is to be appreciated that other methods can be implemented to improve performance so that for any targeting functionality the matching of Ads to WS is done before content is to be delivered.

Figure 61:
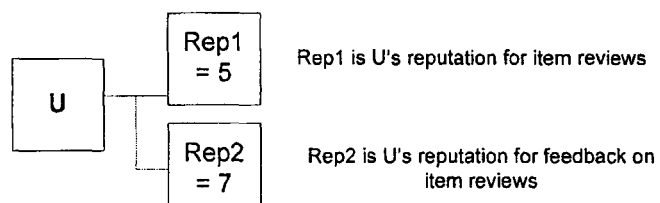
FIG. 61 illustrates a reputation calculated by utilizing quality ratings of feedback content that a user generated in the review management system in accordance with an exemplary embodiment.

There are a plurality of methods that can be employed to target particular ads to particular websites. One method for ad targeting in the RMS 10 is via website type. Utilizing this method, the Ad is to be distributed to a website which is of the website Type or website Types specified by the advertiser for the Ad. Multiple website Types can be specified per Ad. In FIG. 61, Ad 1 is subject to distribution to website 2 (matching website Types) but not subject to distribution to website 1 because the website Type of website 1 does not match the website Type of Ad 1. In particular, Ad 1 is targeted by website types "Retailer" or "Portal." WS 1 has the website type "Blog" and thus does not match the website types targeted by Ad 1. Thus, Ad 1 is not delivered to WS 1. In contrast, WS 2 has website types "Retailer" and "Magazine." Since there is a matching website type "Retailer" between WS 2 and Ad 1, this ad is delivered to WS 2.

Another method of ad targeting is via an item catalog subset of a website. An Ad in the RMS 10 may be targeted by item catalog subset selections of the website. For example, an Ad may be targeted to a website item catalog subset of "Digital Cameras" and any website whose item catalog subset profile contains "Digital Cameras" could then be eligible to receive the Ad in the RMS 10.

Figure 29:
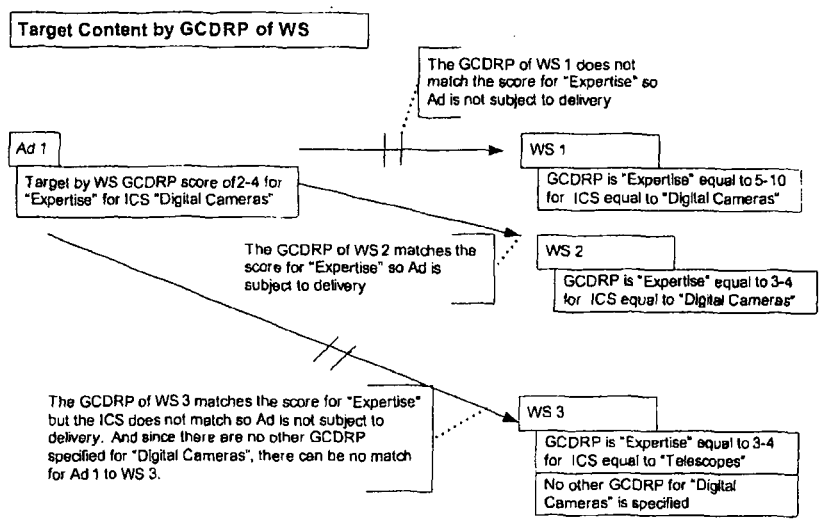
FIG. 29 illustrates ad targeting by generated content telegraphic relevancy pool in accordance with an exemplary embodiment.

Ad targeting via an item catalog subset of a website is illustrated in FIG. 29 wherein Ad 1 is matched to both WS 2 and WS 3 because of the item catalog subset matches. Note that "Digital Cameras" is within the sub hierarchy of "Electronics" of WS 3 and therefore it is also a match. In the reverse case where the Ad's specification of the item catalog subset is a parent category of the website item catalog subset selection, then that is also a match. For example, if Ad 2 was targeting website item catalog subset of "Electronics" and WS 4 had an ICS selection of "Digital Cameras," then that is also a match for targeting since "Digital Cameras" are within the hierarchy of "Electronics."

Additionally, ad targeting can be accomplished by utilizing both website type and an item catalog subset of a website. In the RMS 10, a website enrolls in the system by specifying among other things, one or more website types and an item catalog subset related for each website type. As discussed above, Ads can be targeted for website Type and item catalog subset independently. However, it is also possible to target Ads by both website Type and item catalog subset selections of the website at the same time. In effect, this allows Ads to be targeted specifically to website Types that are related to a certain item catalog subsets for said website types. For example, an Ad can be targeted to "Retailers" (website Type) of "Digital Cameras" (item catalog subset). In this case, the Ad would not be distributed to "Retailers" of "Film Cameras" and so the targeting of the Ad is specific to both website Type and item catalog subset.

Figure 30:
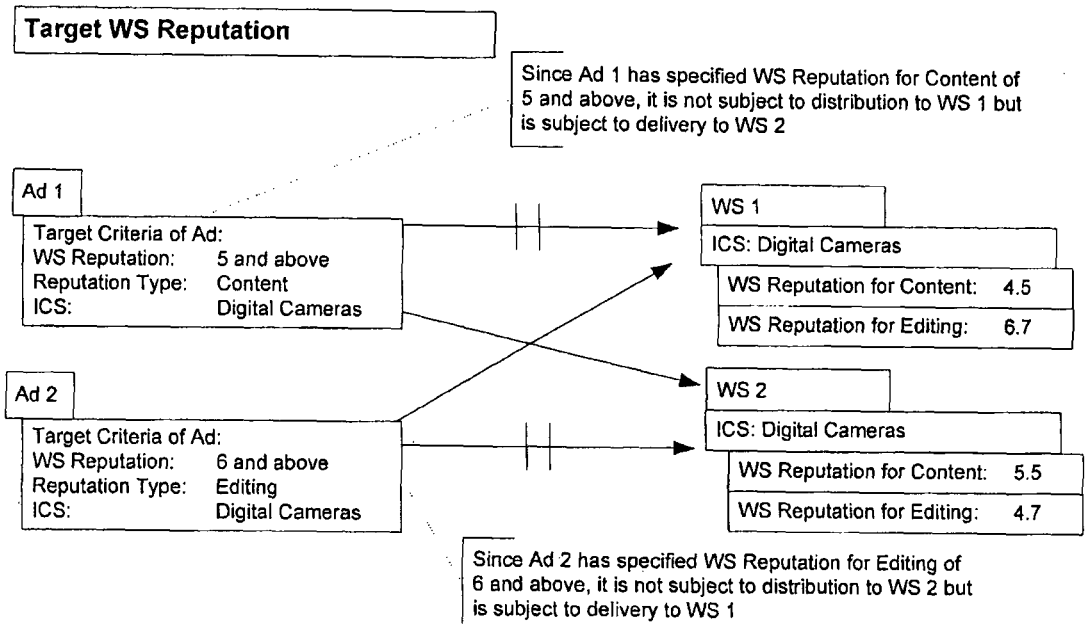
FIG. 30 illustrates ad targeting by website reputation in accordance with an exemplary embodiment.

An Ad in the RMS 10 may also be targeted by the item catalog subset of the content that is currently being distributed. For example, if reviews for "Digital Cameras" are currently being distributed, then the Ad targeted for "Digital Cameras" may be distributed due to targeting. In FIG. 30, the targeting is dependent upon the item catalog subset that is currently being distributed to the WS 1. When the item catalog subset of the content (for example, the "Electronics") matches the targeting specification then Ad 1 will be distributed to WS 1 alongside the content, but when the item catalog subset associated with the content is "Books", Ad 1 is not subject to distribution to WS 1 at that time.

Figure 31:
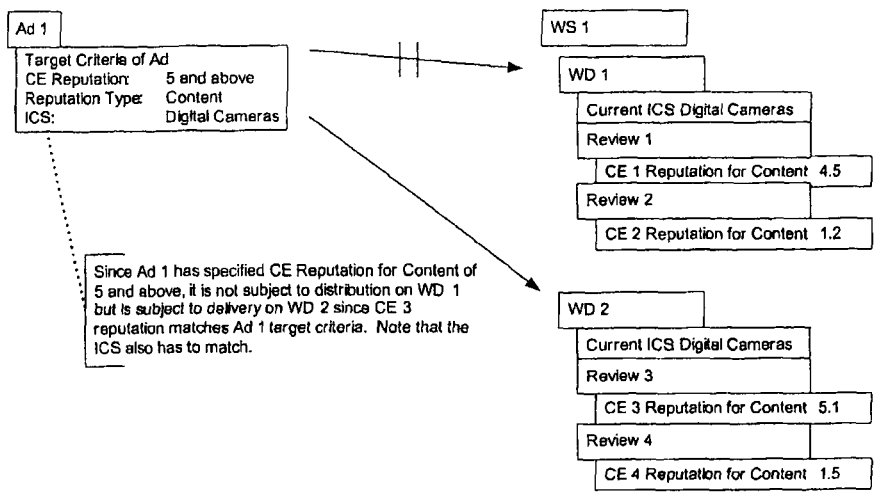
FIG. 31 illustrates ad targeting by creating entity reputation in accordance with an exemplary embodiment.

Alternatively, or in addition, an Ad in the RMS 10 may be targeted by the Quality Rating of the review management content being distributed. In one example, the advertiser may indicate that a quality rating of 3 or above is required for an Ad to be distributed alongside or near (or even on the same page of) RM Content that has such quality rating. When quality ratings can be determined for Content (such as for item reviews in RMS), Ads that are targeted for distribution by quality rating can be analyzed and matched. For example, as shown in FIG. 31, at the time of content distribution, Review 1 and 3 had low quality (e.g., 3.5 and 2.1 respectively) and therefore Ad 1 was not distributed alongside said reviews in the review management web document. However, Review 2 had a quality level that matched with Ad 1 since it had a rating greater than 4 of 4.2. Therefore, Ad 1 was subject for distribution alongside Review 2.

An Ad in the RMS 10 may also be targeted by the DR of the content currently being distributed. Any content that is subject to DR functionality can be targeted by the advertiser. For example, an item from an item catalog or generated content may be subject to DR and can be targeted for Ad distribution by specifying the factor and score range for factor and the item catalog subset. For example, an Ad may be targeted to the ITRF score of 2-4 for "Ease of Use" related to the item catalog subset of "Digital Cameras". More particularly, in this example, when an item from an item catalog, such as the E122, is distributed in the RMS 10, the Ad is also subject to distribution alongside or near the E122 content since the E122 is within the item catalog subset of "Digital Cameras" and also has a ITRF score of 2.4 for "Ease of Use".

Figure 32:
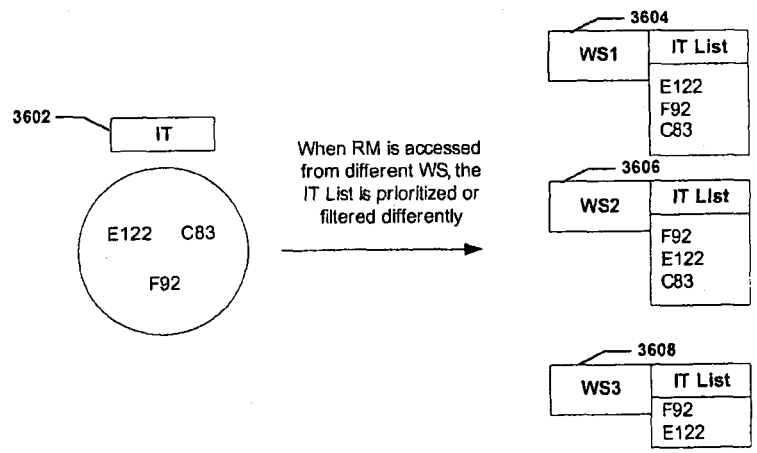
FIG. 32 illustrates an overview of demographic relevancy in the review management system in accordance with an exemplary embodiment.

Similarly, an Ad may be targeted to generated content in DR technology. For example, as shown in FIG. 32, Review 2 for the E122 is distributed to a WS and the GCRF score of the Review 2 is 3.5 for "Expertise", so that Ad 1 may be targeted to said Review by specifying the Ad target to be targeted to GCRF of "Digital Cameras" (since E122 is associated with ICS of "Digital Cameras") and also Ad 1 is targeted to GCRF score of between 3-5 for "Expertise". In this case, the Ad will be subject to distribution alongside Review 2. However, in this example, Ad 1 will not be targeted to Review 1 since the GCRF score for "Expertise" for Review 1 does not match up.

An Ad in the RMS 10 may also be targeted by the DRP (ITDRP or GCDRP) of a website. The item catalog subset for which the DRP score is relevant can also be specified as well in Ad targeting. For example, an item catalog subset of "Digital Cameras" may be specified and also an ITDRP score of 4-5 for "Ease of Use" could be specified to target the Ad to a website that has a matching criteria.

When the item catalog subset of "Digital Cameras" (and sub hierarchies) are distributed to WS 1, if WS 1 had a ITDRP score for "Digital Cameras" of 2-3 for the "Ease of Use" factor, then the Ad would not get targeted to WS 1. However, when "Digital Cameras" are distributed to WS 2, if WS 2 had a ITDRP score for "Digital Cameras" of 2-4 for "Ease of Use" then the Ad would get targeted to WS 2 since the DR profile score overlaps with the DR targeting parameter of 4-5 for "Ease of Use" for the Ad.

At the time of GC (such as a Review) distribution to a WS, Ads may be targeted to the GCDRP of said WS by specifying Ad targeting. The Ad target specifies the ICS, the factor and the score range for such factor in the GCDRP. For example, the ad target of Ad 1 could be specified for the "Digital Cameras" ICS, and an "Expertise" score between 1-2 (Beginner). If WS 1 had a GCDRP for the ICS of "Digital Cameras" and a score for "Expertise" of 1-2, then the aforementioned Ad 1 would be subject to distribution to WS 1. Another example follows.

Figure 33:
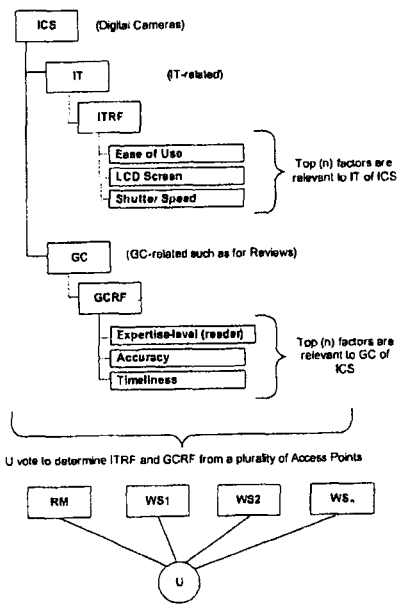
FIG. 33 illustrates an overview of item relevant factors and generated content relevant factors with the review management system in accordance with an exemplary embodiment.

Ad targeting by GCDRP is illustrated in FIG. 33. Ad 1 is subject to distribution, has a "Expertise" score range of 2-4 and is also specified for an ICS of "Digital Cameras". Since WS 1 has a GCDRP equal to 5-10 for "Expertise" in "Digital Cameras", Ad 1 is not subject to delivery to WS 1 (the scores do not match up). However for WS 2 both the score for "Expertise" and the ICS of Ad 1 match the GCDRP for WS 2 and therefore, Ad 1 is subject to delivery to WS 2. For WS 3, there is no GCDRP for "Digital Cameras" and therefore Ad 1 is not subject to delivery to WS 3.

An Ad may be targeted by reputation of the websites such that an Ad is subject to distribution in the RM system 10 to those websites whose reputation meets the specified criteria of the Ad target. For example, using reputation, the Ad may only be distributed to a website whose reputation is above 3 in the item catalog subset of "Digital Cameras".

The WS reputation can be an Editing reputation as well. Also, any type of reputation may be targeted. In this manner, the Ad target would be a score specification as well as an ICS specification and a type specification. When matching Ads to websites utilizing the aforementioned ad targeting, the target criteria is matched to website reputation. For example, in FIG. 34, ads are targeted based on website reputation. Since Ad 1 has specified WS Reputation for Content of 5 and above, it is not subject to distribution on WS 1. However, Ad 1 is subject to delivery to WS 2 since the relevant WS reputation of 5.5 matches Ad 1 target criteria.

Figure 34:
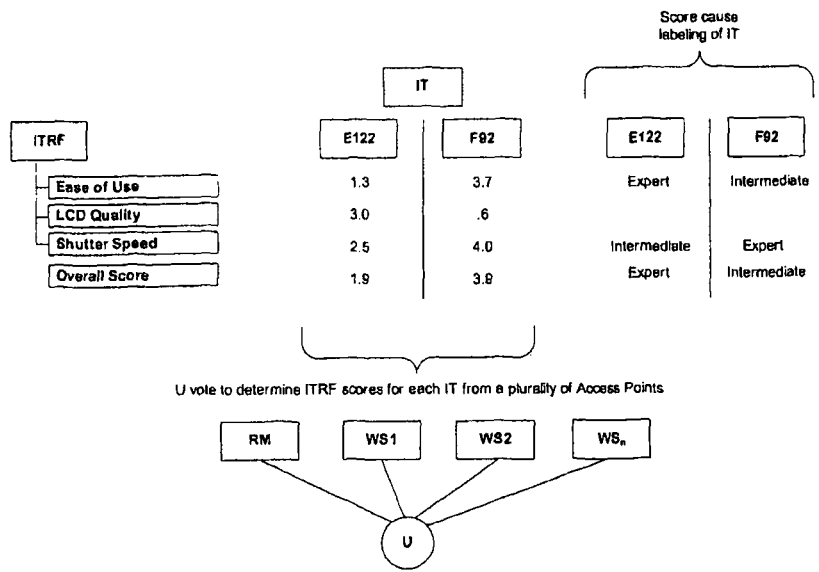
FIG. 34 illustrates scoring and labeling of items with the review management system in accordance with an exemplary embodiment.

FIG. 34 contains another example of matching an Ad to WS reputation. In the other example, Ad 2 is targeted to the 'Editing' reputation of websites. Since the 'Editing' reputation of WS 1 is 6.7, Ad 2 is successfully matched at WS 1. However, since the for 'Editing' of WS 2 is 4.7, Ad 2 will not match with WS 2.

Figure 35:
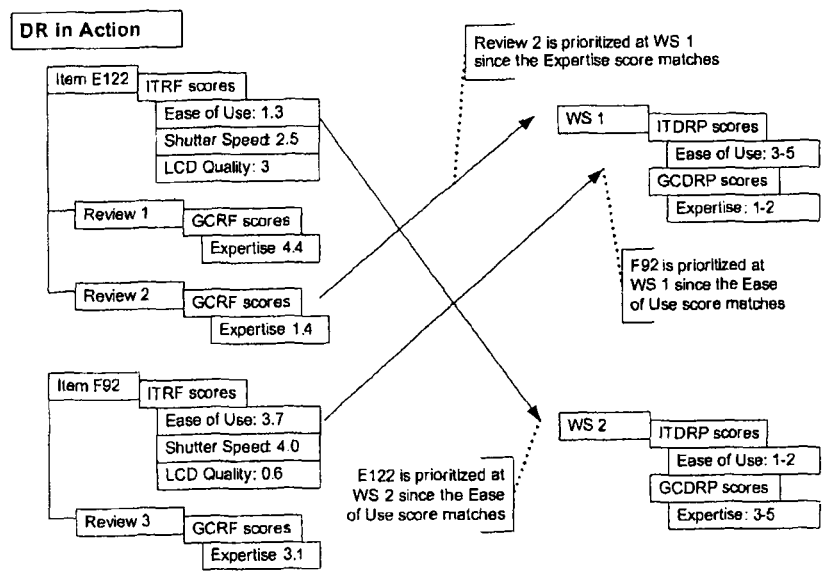
FIG. 35 illustrates an example of demographic relevancy profiling of items and generated content in accordance with an exemplary embodiment.

In another aspect, an Ad may be targeted by reputation of the CE whose content is currently being distributed in the RMS 10 (for example content delivered via an RMWD). The specification of the reputation value is for a specific item catalog subset. For example, in FIG. 35, CE 3 (whose reputation in the current ICS is 5.1) generated Review 3 is being distributed in WD 2. Due to Review 3, Ad 1 is subject to distribution on WD 2 due to targeting the CE reputation for content of 5 and above in "Digital Cameras". However, since WD 1 does not contain any associated CE reputation for Content that scores 5 or above, Ad 1 is not subject to distribution on WD 1. In cases where there are multiple CE on the web document being delivered, then the RMS 10 may be configured to either ensure all CE meet the targeting criteria or even if one CE meets the targeting criteria the Ad is subject to delivery. As more types of reputations are added for websites or CE, such types are available for Ad targeting similar to how reputation targeting is described above.

A final approach to ad targeting is provided for illustration and not limitation wherein an Ad may be targeted to the task-context of the user. By analysis of the interaction a user has with the RMS 10 via one or more websites, it can be determined the level of task-context of said user. Such that by analysis of time between interactions, requests made and other information about users interacting with the RMS 10 via a website, a task-context can be determined. Ads may be targeted to one or more task-contexts in the RMS 10. For example, an Ad can be targeted for a minimum of five interactions of item reviews in a fifteen minute span by a user, wherein the advertisement will show on the fifth interaction of the user with the RMS 10.

The AT of an advertisement may be extended to add fields related to task-context ad targeting. TC (Task-Context) AT fields (all fields are optional) may be added to an AT. Some TC AT fields are, for example:

TC (task-context) Interactions: A field that records the number of interactions (such as RMWD deliveries) a user has had with RMS.

TC Time: A field that specifies the time a user has been interacting with RMS.

TC Breadcrumbs: A field list that specifies a breadcrumb of user activity. A breadcrumb is a series of interactions (such as the access of three reviews) a user has with the RMS 10. The ad may specify which minimum activities must have occurred for the Ad to be targeted to the user.

TC ICS: An ICS for which the task-context is valid.

The RMS 10 can be expanded to record user activity that helps target ads with task-context.

When one or any number of the targeting functionalities are used, Ads may subject to bidding functionality. More particularly, when Ads are successfully matched they may undergo a bidding process to determine which Ads (if there are more than one Ad available for distribution in an available Ad spot in the review management web document) are to be distributed and also to determine the fee charged to the advertiser for the distribution or subsequent click-through of the Ad.

Even when Ad Bidding functionality is used, the RMS 10 may determine when certain Ads are to be displayed instead of other Ads to maximize the click-through rates on Ads or other business reasons. This is useful in cases where Ads are charged by click-through and also to increase the value to the user by showing Ads that are more likely to be clicked-through.

For each targeting function that is specified for an Ad, the advertiser (during enrollment processes) may specify a bid for which it is willing to pay for display or click-through of said Ad. For example, an Ad may be targeted by Content Reputation of CE in "Digital Cameras" of 3 and above and at the same time the Ad may be targeted to the WS DRP score of 4-5 for "Ease of Use" for "Digital Cameras". The advertiser will specify bids for each targeting parameter, for example:

For Reputation of CE: $0.10 for display and $0.50 for click-through

For WS DRP: $0.12 for display and $0.40 for click-through

When there are multiple Ads subject to delivery for the same Ad spot, bidding information may be used to prioritize which Ad is selected for distribution. The highest bidding Ad may be selected for distribution in the aforementioned situation. Bids for display and/or click-through are not required to be specified for an Ad. In such cases where there is no bid information, if an Ad is distributed and subsequently clicked-through (click-through is optional) then general RM system rates for display and click-through may be charged.

During Ad creation or maintenance in the RMS 10, the advertiser of the Ad specifies any Ad targeting, relevancy or bidding functionality through the RMS 10 Ad maintenance functionality or enrollment processes. For example, to specify WS Types Ad targeting, the advertiser would select website Types for the Ad using drop down combo box. All targeting, relevancy and bidding can be specified for each Ad in the Ad maintenance interfaces in the RMS 10.

Ad targeting can be subject to limitation of partner matching functionality of the RMS 10. Even if the Ad is successfully matched to a website through the above ad targeting functionality, the advertiser must also be a valid partner of the website in order for the Ad to be distributed to the website.

When review management content is specified, it is meant to be any review or rating or other types of content that is distributed in the RMS 10.

Ads may have multiple targeting criteria specified and in such cases the advertiser can indicate whether all targets must match or if just one (or a subset) out of the targets must match in order for the Ad to be successfully matched and subject for distribution. When content is distributed and an Ad is distributed in the same web document, then the Ad is said to be distributed alongside or near or on the same page of the content. In some cases, a website will indicate in their enrollment that they do not wish to accept Ads and therefore the Ad will not be subject to distribution to said website despite Ad targeting matches.

Figure 36:
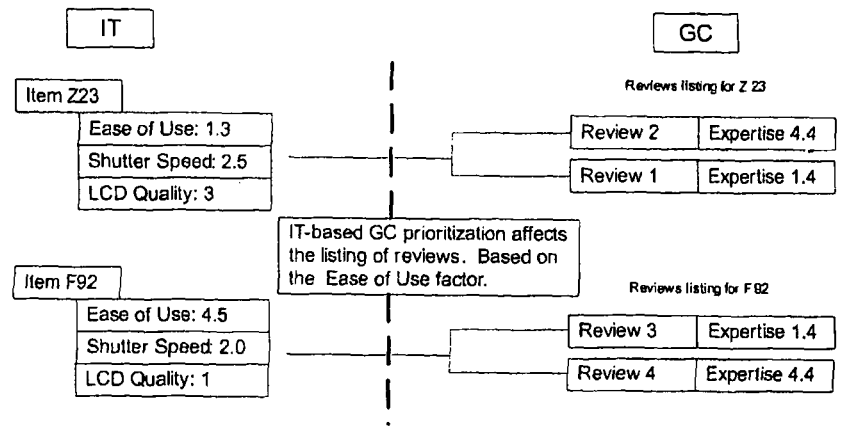
FIG. 36 illustrates an item based generated content prioritization method employed with the review management system in accordance with an exemplary embodiment.

Using Demographic Relevancy (DR) technology, among other functions, content in the RMS 10 can be distributed with prioritization or filtering based on matching a demographic relevancy profile of the website with the demographic relevancy properties of the content. Among other content, Items and Generated Content (GC) such as item reviews are subject to DR. FIG. 36 illustrates an overview of DR Technology according to one exemplary embodiment. An item list 3602 provides items to websites WS1 3604, WS2 3606, and WS3 3608. Utilizing DR Technology, items from the item list 3602 are filtered and prioritized and sent to the websites 3604-3608. Thus, as shown, when the RMS 10 is accessed from different websites (e.g., WS1 vs. WS3), the IT list is prioritized or filtered differently. In addition, GC (not shown), such as item reviews, can be filtered and prioritized similar to items.

Implementation of DR in accordance with one exemplary embodiment is described below. Content from the RM system 10 can be prioritized or filtered when distributed to a WS based on DR technology by:

1) Determining relevant factors for IT associated with an ICS. Said factors are called IT-Relevant Factors (ITRF) of said ICS. ITRF can be determined from a plurality of access points such as via a WS in IAM or at RMS in DAM and others.

2) Determining relevant factors for GC associated with an ICS. Said factors are called Generated Content-Relevant Factors (GCRF) of said ICS. GCRF are also determined from a plurality of access points.

3) Determining scores for factors of an ITRF for each IT and determining scores for factors of a GCRF for each GC. For ITRF, this can be done via IRIDS (Reviews) and for GCRF this can be done via FIDS (Feedback on Reviews).

4) Determining a IT-related DR Profile (ITDRP) for one or more WS. The ITDRP is relevant for an ICS.

5) Determining a GC-related DR Profile (GCDRP) for one or more WS. The GCDRP is relevant for an ICS.

6) Prioritizing or filtering the IT based on a matching up of the ITRF score of the IT to the ITDRP score of a WS.

7) Prioritizing or filtering the GC based on a matching up of the GCRF score of the GC to the GCDRP score of a WS.

Figure 37:
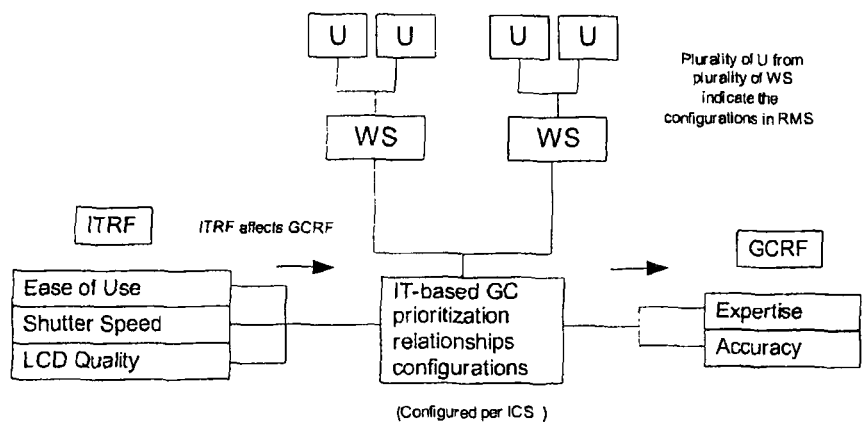
FIG. 37 illustrates collaboration on item based generated content prioritization in accordance with an exemplary embodiment.

FIG. 37 illustrates an overview of ITRF and GCRF for a high-level example of relevant factor design in accordance with one exemplary embodiment. Below is a description along with examples to demonstrate DR technology and various aspects associated therewith. In this example, the item catalog subset is "Digital Cameras". The item relevant factors (ITRF) associated with an item catalog subset can be determined by user voting (by accessing the system from a plurality of websites) on which top (n) factors are most relevant for said item catalog subset. In this example, n will be three (3), however the number of factors can be changed depending on the implementation choices for the RM system 10.

For example, a plurality of users voted as follows (where each user U is given 3 votes) for the top factors of an ICS (ICS is "Digital Cameras" and its sub hierarchy in this example):

Ease of Use: 49 votes
Flash Quality 19 votes
LCD Screen: 22 votes
Expertise-Level of Owner: 15 votes
Shutter Speed 21 votes The top 3 factors are "Ease of Use", "LCD Screen" and "Shutter Speed" and will be used as the ITRF for the "Digital Cameras" and its sub hierarchies. All sub hierarchies (including all items and item categories under "Digital Cameras") will take on the ITRF unless a different ITRF is determined for a sub hierarchy of said item catalog subset. In one alternative embodiment, instead of voting by user, a review management administrator may determine the ITRF for an item catalog subset.

The scores for factors of an ITRF can be labeled by an RMA. The labels can be used to further classify the IT for which the ITRF is used, for example:

Labels Example for Ease-of-Use Factor:
1-2: Expert User
2.1-3.9: Intermediate User
4-5: Casual User The DR labels can also be determined by user voting (accessing the RMS from a plurality of websites) for classifying or labeling different scores. For example, fifteen (15) users voted that 1-2 score for "Ease of Use" is to be labeled "Expert User" and seven (7) users voted that a 2.1-3.9 score for "Ease of use" is to be labeled "Expert user". Since more users voted for the 1-2 to be labeled "Expert Use", the 1-2 score for "Ease of Use" factor will be labeled "Expert User" for the ITRF. In this example, "Shutter Speed" uses the same label as "Ease of Use". However, not every factor needs a label. And there may be different labels for different factors.

A plurality of users (from a plurality of WS) vote on the ITRF of each IT to come up with a DR score for each IT within aforementioned ICS. For example, for an IT (Digital Camera E122), one hundred and five (105) users voted scores for each factor in the ITRF to come up with average scores:

1. Ease of use: 1.3
2. LCD quality: 3.0
3. Shutter speed: 2.5

In addition, not every factor needs to be included in the overall score. For example, the LCD quality is not considered in determining the Overall score in the example above. Also, there may be more than one overall score that utilizes the average of factors in an ITRF.

In this case, the overall score can also be determined. Overall score can be an average of all or a subset of factors, for example:

(1.3+2.5)/2=1.9 (overall score)

In this example for the E122, each factor can now be labeled:

Ease of Use: Expert (since score is 1.3)
LCD Screen: (no label)
Shutter Speed: Intermediate User (since score is 2.5)
Overall Score: Expert User (since average score was 1.9)

Figure 38:
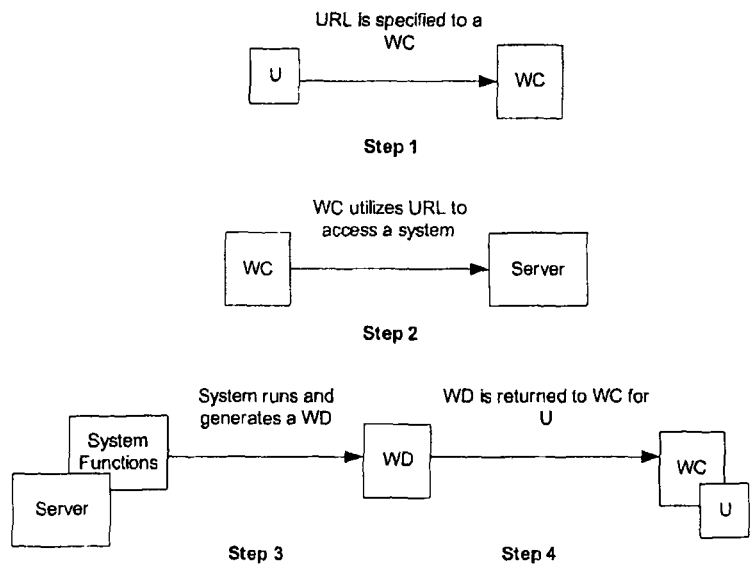
FIG. 38 illustrates an overview of a system in a network in accordance with an exemplary embodiment.

FIG. 38 illustrates an overview of scoring each item via the ITRF according to one exemplary embodiment. In this way, each item or item catalog subset can be classified with a DR score. The DR score can be composed of scores for each individual factor and also one or more overall scores, To implement the ITRF functionality, IRIDS (Reviews) can be utilized to get feedback on each IT. In this example implementation, the IRIDS can dynamically utilize the ITRF as factors in said IRIDS.

At a website (website is AWS), items can be filtered or prioritized utilizing DR technology. This is done by setting up an item-related DR Profile (ITDRP) for said website. The ITDRP for an item catalog subset contains the same factors as the ITRF for said item catalog subset. Each factor in the ITDRP will be scored to determine an ITDRP score. The ITDRP score can be determined by a website administrator for said website or by user voting for the ITDRP at said website (for which said website is the AWS for a user accessing the RMS 10).

When a user votes to determine the ITDRP score, a user at a particular website, may indicate the ITDRP that will be used to prioritize data for said website by voting on scores for each factor in the ITDRP. Expanding on the previous example of the E122, the user at a website may indicate (i.e., by voting) for items that have scored for "Ease of Use" as 1-2 (Expert User) in the ITDRP score and, by such consensus of users at the website, the items prioritized or filtered for said website will be those items that are scored between 1-2 for "Ease of Use" in its ITRF score such as the E122.

By a user searching for one or more items, the ITDRP can be determined indirectly. For example, a user searches for items (for an item catalog subset) that have "Ease of Use" set to 1-2 at a website, then that counts as a vote for the ITDRP of said website to set "Ease of Use" between 1-2 in said ITDRP for said item catalog subset. The same concept of searching counting as voting can be applied to the GCDRP as well if desired.

GC can also be subject to DR functionality similar to how the functionality has been described in association with items. In the case of GC, GC-Relevant Factors (GCRF) can be determined for GC within an item catalog subset in the same way described herein as how ITRF is determined. A review management administrator may setup the GCRF or a user may vote on the GCRF similar to how an ITRF is determined for an item catalog subset. The difference is that the GCRF is associated with GC such as Reviews whereas the ITRF is associated with or for one or more items.

Similar to how an ITDRP is generated for a website, a GCDRP can also be generated for a website. Similar to how an ITDRP for an item catalog subset includes the same factors contained in the ITRF for said item catalog subset, an GCDRP for an item catalog subset can include the same factors contained in the GCRF for said item catalog subset. The GCDRP can also be score provided by a website administrator or by user voting similar to how an ITDRP is scored.

An example of GCRF can be seen utilizing the example of "Digital Cameras" (ICS) and the E122 (IT). GC such as Reviews (IRIDS) for the E122 can be associated with an "Expertise" (of the reader) factor. Subsequently, by determining the GCRF score for "Expertise" for each Review, Reviews can be prioritized or filtered to various WS who have a matching GCDRP score. Reviews rated with "Expertise" (score is between 1-2) will be prioritized or filtered for WS that have the GCDRP score of 1-2 for Expertise. Other GCRF examples are "Accuracy" and "Timeliness". The CE of GC such as a Review may indicate the initial GCRF scores of the Review.

Figure 39:
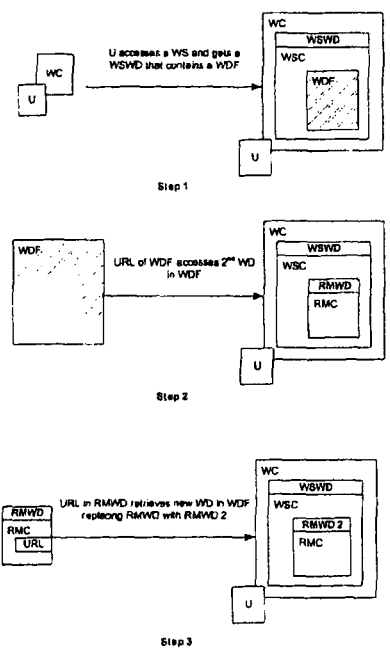
FIG. 39 illustrates accessing two web documents at the same time in accordance with an exemplary embodiment.

FIG. 39 illustrates an example of DR profiling of items and GC. E122 has an ITRF score of 1.3 for "Ease of Use" and the F92 has a ITRF score of 3.7 for "Ease of Use". Since WS 1 has a ITDRP score of 3-5 for "Ease of Use", the F92 item will be prioritized when items are listed at WS 1. However, for WS 2, E122 will be prioritized when items are listed at WS 2 since the ITRF score of WS 2 is 1-2 for "Ease of Use" and matches with E122. Both items may be listed at both WS but the prioritization in the listing of those items is different at each WS because the ITDRP of each WS may be different.

When Reviews are listed for E122 at WS 1, since the GCRF score for "Expertise" is 1.4 for Review 2, it is prioritized when distributed at WS 1 due to the GCDRP score of 1-2 for "Expertise" at WS 1. However, Review 2 is not prioritized at WS 2 since WS 2 has a 3-5 GCDRP for "Expertise".

Relevant factors refer to both item-relevant factors and GC relevant factors. DRP can refer to both ITDRP and ITDRP. When multiple factors have relevant factor scores and a particular website has DRP score for more than one factor, the website may elect to prioritize factors and so the highest priority factor will be utilized to filter or prioritize the items or GC distribution to said website. In addition, more than one factor may be used to prioritize or filter data using DR technology at the same time. Utilizing DR technology, items and GC can be prioritized or filtered at the various websites (when WS is AWS) when content is delivered in the review management system 10.

Optionally, when a user votes in the RMS 10, the user may be required to register and be signed into the RMS 10 when voting. This is to limit votes to each user. However, some voting mechanism such as when indirectly voting by specifying search parameters may not be limited or require sign-in.

The ITRF scores for an item may affect the prioritization and/or filtering of GC for said item due to the GC relevant factor scores of said GC. This is referred to as IT-based GC prioritization. For example, if a Digital Camera IT such as Model#Z23 was rated as 1.3 (very low) for an ITRF "Ease of Use" factor, then GC for Model#Z23 will be prioritized or filtered by those GC that have a higher value for the GCRF "Expertise Level" factor. In this example, it is presumed that since the IT Model#Z23 has a low ease-of-use, that the audience most interested in reading the rating for said model will have a higher level of expertise.

Figure 40:
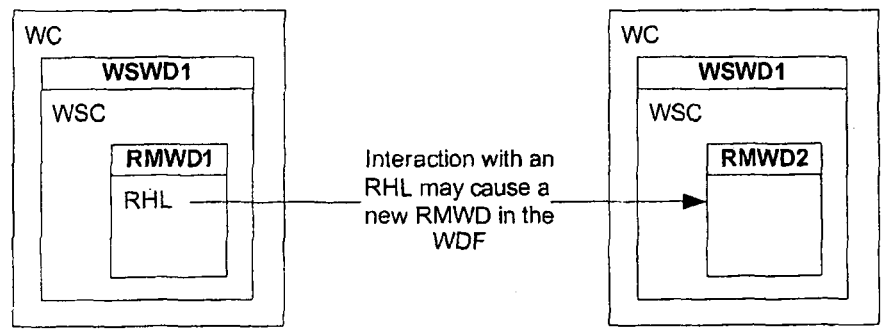
FIG. 40 illustrates interaction of a review management system hyperlink with the review management system in accordance with an exemplary embodiment.

FIG. 40 illustrates item-based GC prioritization wherein the reviews listings order (prioritization) are affected by the item's Ease of Use score. For example, for IT Z23, the score for Ease of Use was 1.3 and therefore Review 2 is prioritized over Review 1 because the Expertise factor is configured to have a inverse prioritization relationship with Ease of Use and the lower the Ease of Use score causes reviews with the higher GC Expertise factor score to get priority. For IT F92, since the Ease of Use Score is high, Review 3 is prioritized over Review 4 since the Expertise factor is lower in Review 3.

The relationships between the ITRF and GCRF can be extensively configured for an item catalog subset in the RMS 10. One ITRF can be related to one or more GCRF to prioritize and/or filter GC. Also the combination of two or more ITRF can be related to one or more GCRF to prioritize and/or filter GC. Also an ITRF may not have any effect on GCRF even other ITRF have effects on one or more GCRF. There can be inverse or proportional relationships between the factors as well.

Once the relationship of the ITRF to the GCRF for prioritization is defined for an item catalog subset, a website can elect to utilize said relationship when content related to said item catalog subset is delivered via said website. This technology is optional in the RMS 10 and may be utilized selectively for one or more website. Also, this technology can be applied selectively to one or more item catalog subset.

Figure 41:
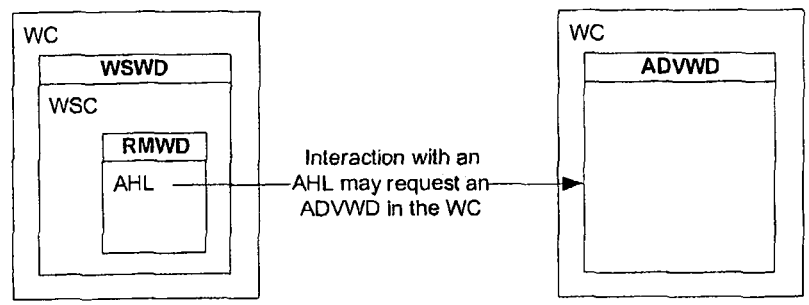
FIG. 41 illustrates interaction of an advertiser hyperlink with a review management system in accordance with an exemplary embodiment.

In FIG. 41, a plurality of users from a plurality of websites may indicate the configuration for IT-based GC prioritization. An external entity such as a user may vote in the RMS 10 to configure the item-based GC prioritization by indicating the item relevant factors and the relationship to the GCRF. A plurality of users from a plurality of websites help determine the relationship through voting. The RMS 10 will tabulate votes and periodically setup or change IT-based GC prioritization for an item catalog subset based on the voting. The RMS 10 may utilize one or more rules to weight each vote. For example, the RMS 10 may weight votes based on the vote's OWS REP or OWS DR profile. Alternatively, an RMA may determine the configuration for IT-based GC prioritization in an ICS.

Relevant factors can be further distinguished into consumption-related relevant factors (CSRF) and content-related relevant factors (CTRF). This is useful to define profiles (IT-DRP or GCDRP) that indicate relationship between one or more relevant factors. For example in the item catalog subset of Digital Cameras, a CSRF such as Expertise-Level can be compared to a CTRF such as Low-Light Performance. For example, a profile can be made as follows:

If Expertise-Level is "High", then Low-Light Performance should be above 3.

In addition, relevant factors can be implemented as search parameters such that a user at various websites can be presented with ITRF or GCRF as prioritized search parameters. In this way, top search parameters can be dynamic such that, as the relevant factors in an ICS change, the top search parameters will reflect said change. The top search parameters may be presented to a user to help user search for IT or GC. Also, the defaults and configuration of dynamic search parameters can be done per website profile for relevant factors. As new items and GC appear, and thus may cause new relevant factors, the system will evolve to generate the most relevant factors for the user to help user search.

When a user votes in RMS 10 on a topic, such as for example (but not limited to) determining the ITRF for an ICS, the votes may be generated from a plurality of WS via the IAM. The votes may be weighted by various factors (there are many factors envisioned) of AWS or the OWS of the vote or the user (the user is CE of the vote) who generated the vote or a combination of each in RMS. For example, the vote may be weighted by the reputations of the CE, AWS, OWS or a combination of each reputation. User voting may result in a consensus about the target voting topic.

In one implementation, a WS (or WSA for the WS) may associate content such as but not limited to item reviews, items or feedback with a WSSIDS (website sticky). The WS may be limited as to how many content pieces (of the same type) may be associated with a WSSIDS within a designated ICS. When content is delivered via a WS, content that has a WSSIDS associated with it may be prioritized at said WS.

Content can also be analyzed to determine how many different WS have associated WSSIDS therewith and thus a relative quality can be determined and disseminated for said content. The quality functionality can be implemented by configuring a QS to utilize WSSIDS with rules that count the different number of WS that are associating WSSIDS with the content for which the QS is being calculated.

Also, by determining and utilizing the different number WSs that have associated a content piece with WSSIDS, the relative reputation of the creating entity of the content piece can be determined. For example, if item review 1 had ten (10) different WS associate WSSIDS therewith, the REP score based on association of WSSIDS may be determined to be "3" for item review 1. If item review 2 had twenty-five (25) different WSs associate WSSIDS therewith, the REP score based on association of WSSIDS may be determined to be "5" for item review 2. The aforementioned example is one way of many that the WSSIDS can be utilized in RMS.

The following provides a foundation related to the terms and concepts discussed herein above. Generally, a User is able to access one or more systems in a network via the following mechanism. FIG. 42 shows the general access of a Web Document by a user. By accessing and interacting with a web document, the user is able to interact with the functionalities of a system in a network such as the Internet.

In Step 1 of FIG. 42, a URL is provided to a web client and this initiates access to a server (location of server specified by the URL) in the network as shown in Step 2 of FIG. 42. The server will run a system that provides functionality and generates a resulting web document as shown in Step 3 of FIG. 42. And then as shown in Step 4 of FIG. 42, the web document is returned to the web client for further user interaction. One or more URL may be contained within the web document such that by accessing said URL, Step 1 is again initiated. Thus a user accesses and interacts with a system via one or more web documents and we will refer to one or more users accessing a system (or web document of system) without describing the access details each time. As known by those skilled in the art, the web document may contain one or more URLs that may or may not point back to the same system that generated the web document.

FIG. 43 illustrates access of more than one system simultaneously. In this example, two systems are employed, a website and the RMS 10. Utilizing a web client, a user may access both the website and the RMS 10 in what looks to the user to be one web document. So that both website content (contained in the website web document but outside of the web document frame section) and the RMS 10 (contained in the review management web document) are simultaneously accessible to a user in a web client. The web client contains both a website web document (web document of website) and a review management web document (web document of the RMS 10). The review management web document may be contained within a frame web document frame of the website web document. When a user interacts with the review management web document to access the functionality of the RMS 10, the website content portion of the website web document remains accessible to a user. As will be evident from the present disclosure, user interaction with the RMS 10 via the review management web document within the context of a website web document provides a foundation for unique and innovative functionalities.

In Step 1 of FIG. 43, a user accesses a website (via a web client) to get a website web document. The website web document contains a WDF. In Step 2 of FIG. 43, the web client automatically (without requiring any user action) accesses the URL specified for the web document frame. The URL in this example is accessing the RMS 10 and thus returns a review management web document for display within the web document frame. The web document of the web document frame can be referred to as a web document frame web document (WDFWD) and in this case the review management web document is the WDFWD. By this process, two web documents were retrieved from two systems (one web document each) and displayed as though one web document was accessed. To a user, it may seem as though only one web document was accessed.

In Step 3 of FIG. 43, the user interacts with a URL in the review management web document and this causes the web client to access the URL and retrieve review management web document 2 which replaces the first review management web document in the web document frame and the rest of the website web document (the website content) remains accessible to a user. In this Step, it could seem (to a user) as though the website web document has changed, whereas what occurs is the review management web document is replaced.

Accessing the RMS 10 indirectly via a website can be referred to as the Indirect Access Method (IAM). Accessing the RMS 10 directly via a RMS website or other direct method without a website can be referred to as Direct Access Method (DAM).

Figure 44:
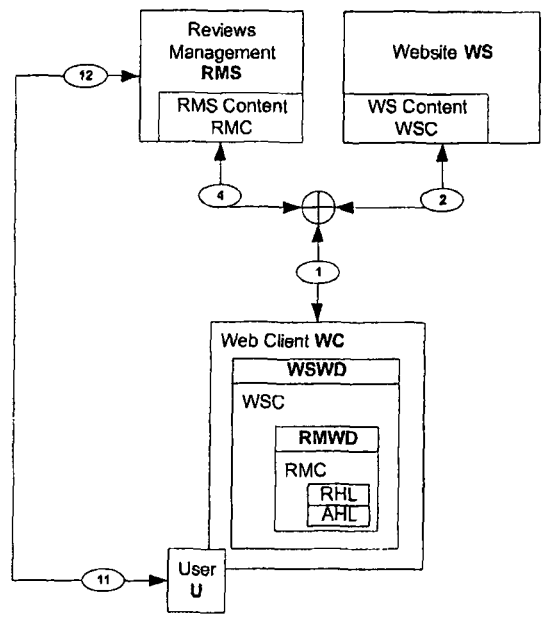
FIG. 44 illustrates an overview of accessing multiple systems employed with the review management system in accordance with an exemplary embodiment.

FIG. 44 illustrates interaction to the RMS 10 via one or more RMS hyperlinks. A hyperlink in the review management web document is referred to as an RMS Hyperlink (RHL). If a user clicks on an RHL, then the RHL will cause the web client to send a request to the RMS 10 and subsequently may cause a new review management web document to replace the current review management web document. However, not in all cases will a new review management web document be generated. In some cases, the current review management web document will be updated when a user interacts with a RHL. A corresponding flow occurs when a user interacts with a RHL wherein, when the flow is from a web client to the RMS 10, a review management web document is returned to a web client.

Figure 45:
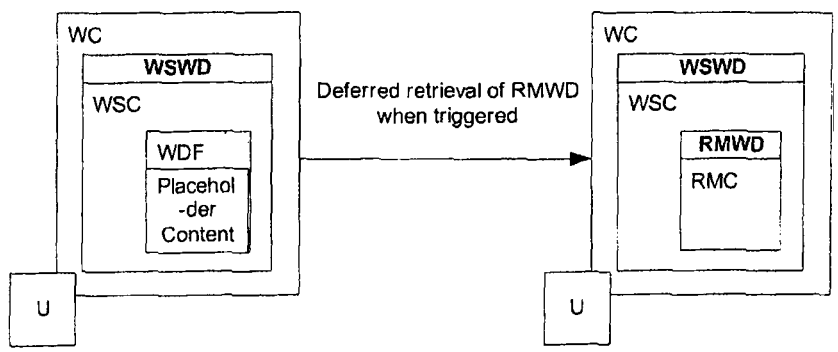
FIG. 45 illustrates deferred retrieval of a web document in accordance with an exemplary embodiment.

FIG. 45 illustrates interaction to the RMS 10 via one or more advertisement hyperlinks. An advertisement Hyperlink (AHL) is an RHL that is intended to eventually navigate the user to an advertiser web document (ADVWD). The AHL may initiate a request to RMS and then RMS subsequently generates a redirect for a user to the ADVWD. Such a redirect may cause a new web document, referred to as an ADVWD (based on the target URL of the Ad for which the AHL was generated) placed in a new window of the web client or the replacement of the current website web document in the web client.

Figure 46:
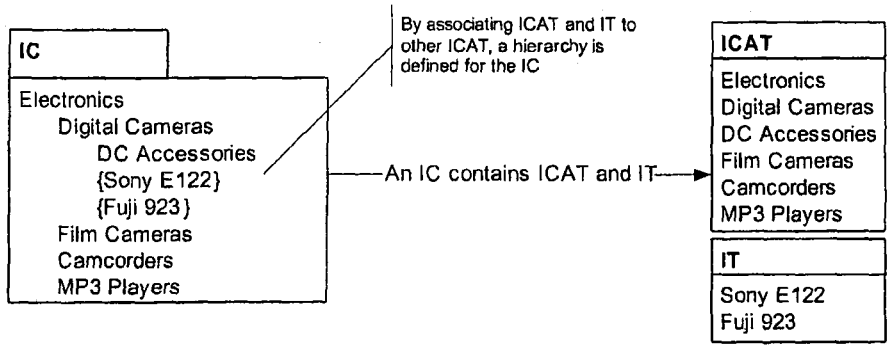
FIG. 46 illustrates an overview of an item catalog in accordance with an exemplary embodiment.

FIG. 46 illustrates exemplary coding in a website web document that specifies a web document frame in a website. Coding in website web document specifies a web document frame including a URL that retrieves a web document for the web document frames. When the coding accesses the RMS 10, it is referred to as RMS Access Coding (RMAC). In the example provided, such coding is to utilize an iframe for the web document frame.

In the FIG. 46, an example the WDF is generated by the iframe command and the URL of the iframe is a particular website address. The website may receive RMAC from the RMS 10 (or generate the RMAC itself) and implements the RMAC on each website web document in website system for which website wants to implement access to the RMS 10. It is not necessary to implement RMAC on every web document in the website, only on each web document that is to be enabled access to the RMS 10. Any web document that contains RMAC (or equivalent coding) can be referred to as RM-Enabled WD (RMEWD). As disclosed herein, it is presumed that each website web document is an RMEWD unless specifically mentioned that a website web document is not RMEWD.

The RMAC contains the identification of the website and sends the identification to the RMS 10 when the RMS 10 is accessed via the aforementioned website web document. For example in FIG. 46, the "ws=1234" is a query string that specifies the unique identifier of the WS. Thus, the RMS 10 can identify the website from the URL received. The website identifier is established for each website that enrolls in the RMS 10.

Figure 47:
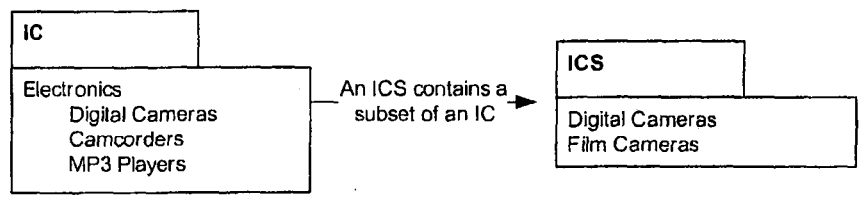
FIG. 47 illustrates an overview of an item catalog subset in accordance with an exemplary embodiment.

When a user accesses the RMS 10 in an indirect access method and subsequently accesses the RMS 10 via interaction with a review management web document in a website web document, the website identification may be sent over in each URL of the review management web document (RHL) by adding the website identification in a query string of the URL. FIG. 47 illustrates an example wherein an RHL contains the website identification that may be specified by the code listed. In FIG. 47, the query string "wsid=1234" contains the WSID.

The WSID may also be stored in a user session for access later to determine the previous website that was utilized by a user to access the RMS 10. For example, if a user accesses the RMS 10 via WS1 and then subsequently accesses the RMS 10 via WS2, the RMS 10 will know that the user accessed WS1 before the current access via WS2 and thus store the listing of each website that was utilized by the user to access the RMS 10 as long as the user session is valid. Such historical website information in the user session can also be persisted to a database in the RMS 10 and if the user can be identified as a member user, the historical website information may also be associated with the member user. By utilizing the WSID, the RMS 10 can provide many innovative functionalities when generating a review management web document for a user. For example, the prioritization and filtering of items in a review management web document may be affected by which website the review management web document is accessed at by a user.

Figure 48:
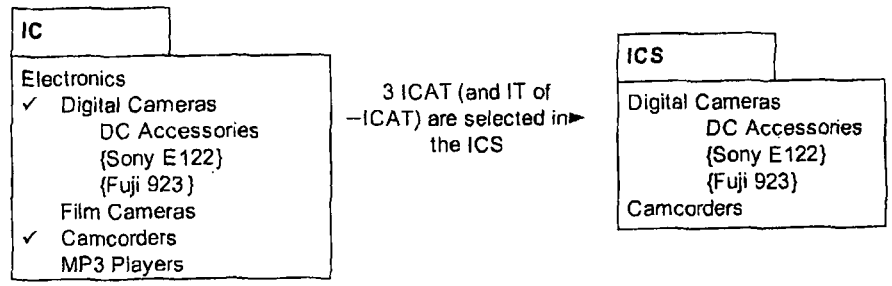
FIG. 48 illustrates item catalog subset selections employed with the review management system in accordance with an exemplary embodiment.

FIG. 48 illustrates a overview of accessing web applications within the RMS 10 in accordance with one exemplary embodiment. As illustrated, two systems (the RMS 10 and a website) are accessed by a user in a web client. This is accomplished by 1) the user utilizes a WC to access WS and 2) a resulting WSWD contains a WDF that causes the WC to access RMS. It is to be appreciated that this is only one way to implement the access of two interactive systems wherein one system is contained in a frame of the other. There may be other ways to implement this system as well.

More than one web document frame may exist in a web document and a different URL may be specified for each web document frame in a website web document. When each URL accesses a different system, then said system is available to a user for interaction (via the WDFWD) and therefore it is possible to have more than two systems accessed at one time (one for the website web document and one for each web document frame in the website web document).

When a user accesses a RMEWD, there may be multiple user sessions that are generated. The website may manage a user session for the website web document and also the RMS 10 may manage a different user session for the WDFWD. One user session may be generated for each different system accessed in a web document.

In the example shown in FIG. 43, the RMAC in website web document caused the web client to automatically retrieve the review management web document from the RMS 10 and present it in a web document frame. In an alternative implementation, the retrieval of review management web document can be deferred to a later time until a trigger causes the URL of the web document frame. In this case, placeholder content can be contained within or alongside the web document frame. One trigger for activating the URL of the web document frame may be when the user begins interacting (i.e., clicking on or other interaction) with the placeholder content and this causes the web client to access the URL of the web document frame to retrieve review management web document. Such a design helps performance (i.e., reduces time to generate and present the website web document) by accessing the review management web document only when a user causes it to be accessed. This implementation can be done by changing the RMAC in the website web document to contain deferred retrieval code.

Figure 49:
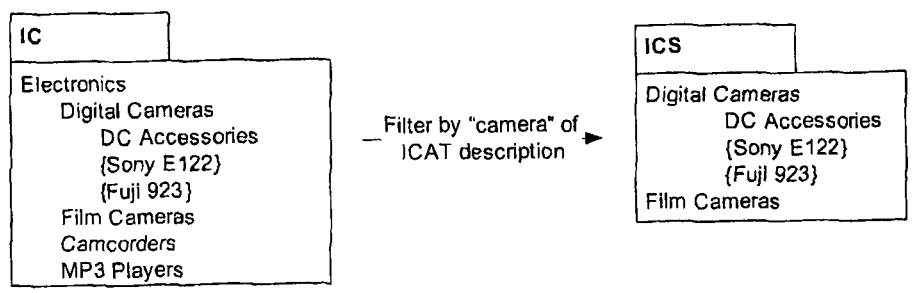
FIG. 49 illustrates item catalog subset filters employed with the review management system in accordance with an exemplary embodiment.

FIG. 49 illustrates the deferred retrieval of the RMWD. The RMAC specifies the placeholder content, URL and the URL trigger. If there are multiple web document frames implemented in one website web document, the RMAC coding for each web document frame may be configured such that all web document frames will retrieve their corresponding WDFWD in deferred mode by a trigger as described earlier for one web document frame. The URL trigger may exist in zero or more RMAC in the website web document.

Figure 50:
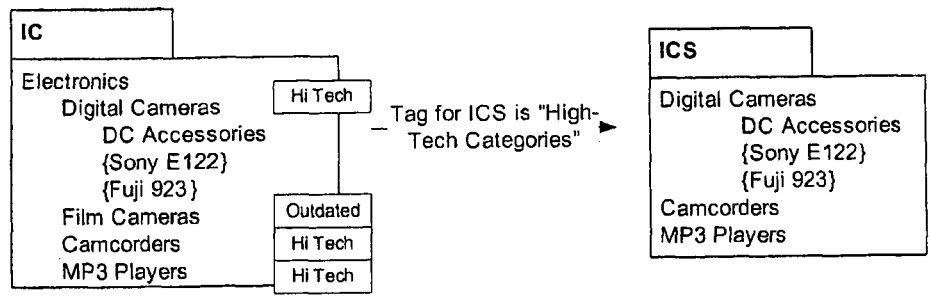
FIG. 50 illustrates item catalog subset tags employed with the review management system in accordance with an exemplary embodiment.

FIG. 50 illustrates an item catalog that includes a catalog of Items and is also known as a product catalog. There are many item catalog implementations already in existence and substantially any of those implementations can be utilized in the RM system 10. An item may be a product, good or service or other information. An item catalog also has Item Categories that help categorize the items in said item catalog. Items can be contained or associated with one or more item categories. There can also be hierarchies within the item catalog by containing or associating an item category with one or more other item categories. One or more items may also be associated with one or more other items. Generated content such as reviews of items or category summaries may be associated with one or more items or item categories.

Figure 51:
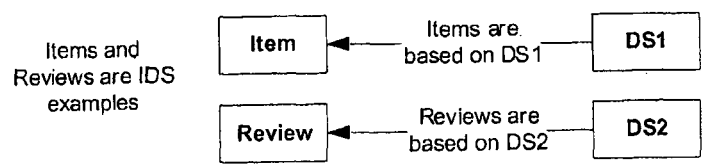
FIG. 51 illustrates examples of data types employed with the review management system in accordance with an exemplary embodiment.

As shown in FIG. 51, an item catalog subset identifies a subset of an item catalog. An item catalog subset contains one or more items and Item Categories which define a subset of the item catalog. It is possible that all items and item categories of an item catalog are included in an item catalog subset. An Administrator may be presented with an item catalog to create an item catalog subset. The Administrator can utilize selections, filters and tags to generate one or more item catalog subset.

An item catalog subset may optionally be labeled. A label helps identify the subset within the item catalog subset. For example, an item catalog subset may contain the item category of "Digital Cameras" and "Film Cameras" and be labeled "All Cameras" to identify the item catalog subset.

An ICS specification may contain one or more selections. Items and item categories can be selected to be included or excluded in the item catalog subset. This can be accomplished by presenting an item catalog (e.g., to an Administrator) with an Include option that indicates whether an item or item category is to be included in the item catalog subset. When selections have been made by the Administrator, the identifications of the selected items and item categories are transferred to the item catalog subset.

If an item category is selected for the item catalog subset, then all items directly associated with said item category are also selected for the item catalog subset. However, if an item is selected, then only said item is selected and the item category that said item is associated with is not necessarily selected in the item catalog subset.

Figure 52:
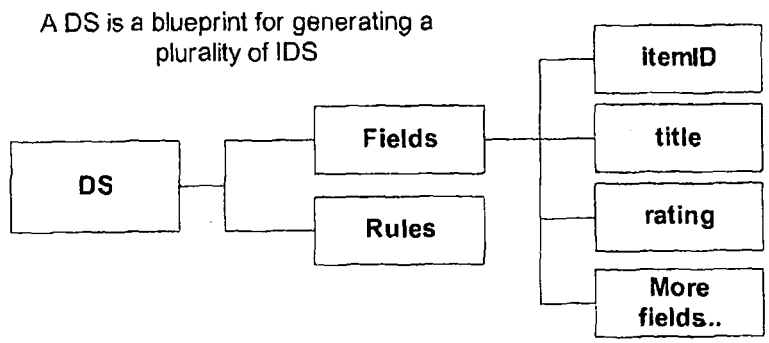
FIG. 52 illustrates composition of a data structure employed with the review management system in accordance with an exemplary embodiment.

Selections may or may not be hierarchal such that by selecting one item category, all item categories under the hierarchy of the item category may be selected. Selecting by hierarchy is an option presented to the Administrator. In FIG. 52, the example item catalog subset contains three item categories and two items (Sony E122 and Fuji 923 cameras) by an Administrator selecting two item categories from the item catalog. Items and sub-hierarchies in item categories other than "Digital Cameras" are omitted in this figure (and other figures) for simplicity.

Figure 53:
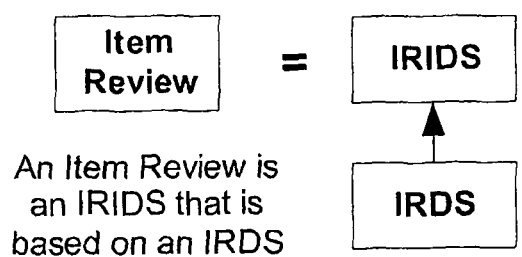
FIG. 53 illustrates an example of item review item data structures employed with the review management system in accordance with an exemplary embodiment.

FIG. 53 illustrates example item catalog subset filters. A filter identifies a subset of an item catalog dynamically in an item catalog subset. A filter specification contains a Field, Option and Value. The Field identifies what field in the item catalog to run the filter on. The Option contains an operator for the filter. The Value contains a number or text that is used in conjunction with the Field and Option to complete the filter. A filter can be specified for items or item categories.

For example to filter all items that contain LCD screens that are larger than 2.2 inches, the filter values are as follows: Field equals "LCD Screen in IT features", Option equals ">" and Value equals "2.2". For this filter all IT that contain LCD Screens features and are larger then 2.2 will be dynamically included in the ICS. As shown, to filter item categories that are "camera" categories is Field equals "Descriptions of ICAT" and Option equals "Contains" and Value equals "cameras". In this filter, all item categories that have "camera" in their description will be selected. Filters are optionally hierarchical, similar to how selections are optionally hierarchical. Multiple filters may be specified for an item catalog subset.

Figure 54:
FIG. 54 illustrates persist data using unique identification for instantiated data structures with the review management system in accordance with an exemplary embodiment.

FIG. 54 illustrates example tags that can be associated with an item catalog subset. A Tag is a textual description that is attached to one or more item category or item to dynamically identify and group items that may be located in different hierarchies of the item catalog. A Tag is specified by a description and is associated by an Administrator to one or more item categories or items of an item catalog. An item catalog subset may specify one or more Tags to associate one or more items or item categories to said item catalog subset.

As shown, a Tag for high-tech categories may be created with the description of "Hi-Tech Categories" and associated with the "Digital Cameras", "Camcorders" and "MP3 Players" item category. Another Tag is created for "Outdated Categories" and "Film Cameras" item category is associated with it. Then, subsequently, the Tag "Hi-Tech Categories" may be utilized to dynamically identify and include high-tech categories in an item catalog subset. It is noted that, as shown in FIG. 54, the "Film Cameras" item category is not included in the item catalog subset. Multiple selections, filters and tags may be used in conjunction to indicate an item catalog subset.

Tags and Filters are dynamic in that if they are used to generate an item catalog subset, then when items and item categories are added or subtracted from the Tags or Filters (due to new or deleted item/item category or changes in the Tags or Filters), the item catalog subset will be updated to reflect the changes.

When comparing two item catalog subsets, if any items or item categories in the first item catalog subset is also in the second item catalog subset, then the two item catalog subsets are said to match. Optionally, there can also be other rules that determine when an item catalog subset matches with another. For example, the first item catalog subset may match a second item catalog subset if any item category of the first is contained in the second (items are not compared). There can also be optional hierarchical limitations such that only the top-level hierarchies are compared to determine whether two item catalog subsets match.

For implementation of an item catalog subset, the item catalog subset may be described with a label such as "All Cameras" and simply contain the identifiers of the various items and the item categories that have been identified for association (due to Selections, Filters and Tags) with said item catalog subset. The item catalog subset may be persisted to a database for later access.

Figure 55:
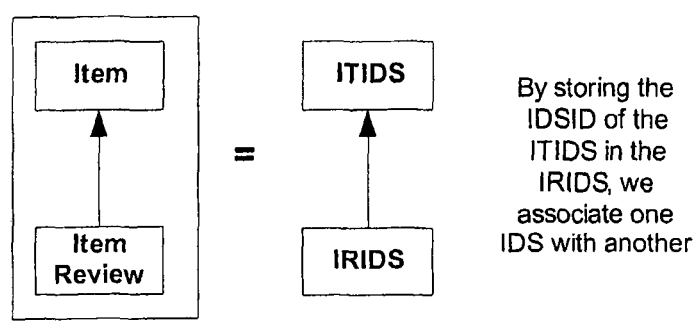
FIG. 55 illustrates associating instantiated data structures with the review management system in accordance with an exemplary embodiment.

FIG. 55 illustrates several examples of data employed with the RMS 10. Generally, data can be described as content. Creation of content can be based on a data structure (DS) and in such cases the content is called an instantiated data structure (IDS) or content piece or CT. There are usually many instantiated data structures generated per data structure.

Instantiated data structures are common in information systems (for example, the items in an item catalog or the reviews for an item).

Figure 56:
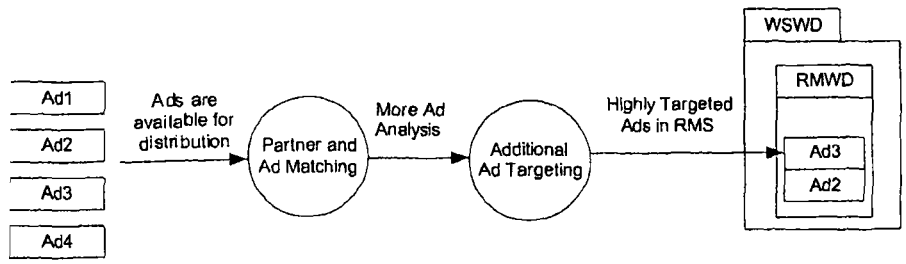
FIG. 56 illustrates an overview of ad targeting employed with the review management system, in accordance with an exemplary embodiment.

FIG. 56 illustrates composition of data structures employed with the RMS 10. A data structure is a general data structure which is a grouping of fields and specifies the field type and rules (for example, an ID field must contain only integers) for each field and also rules for when data is created based on the data structure. There can be many different types of data structure in the RMS. By changing the fields, rules and other functionality for a data structure, different types of data structure may be defined. An example of a specific type of data structure is the item review data structure of which a few of the main fields of the IRDS are described here for illustration. Fields of an item review data structure may include item identification, title, rating, comments, OWS, CE and other fields.

The data structure may be defined with rules that are enforced when an instantiated data structure is generated or maintained based on said data structure. The rules of a data structure may specify different requirements based on the type of creating entity (or many other factors) that is generating an instantiated data structure utilizing the data structure. A creating entity is the Entity (such as a user or other entity) that creates an instantiated data structure. For example, if a user creates an item review said user is the creating entity of the item review.

Figure 57:
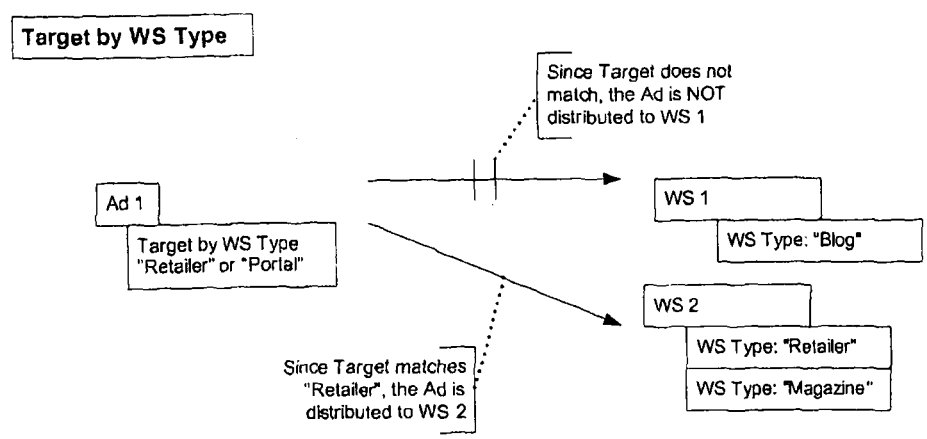
FIG. 57 illustrates ad targeting by website type employed with the review management system in accordance with an exemplary embodiment.

FIG. 57 illustrates an example of an Item Review IDS (IRIDS) employed with the RMS 10. An example of an instantiated data structure is the item review instantiated data structure which is based on the aforementioned item review data structure. In this example, an external entity such as a user may have created an item review instantiated data structure and the data for each field may be populated such as item ID is the integer that represents the item that the user is reviewing. The creating entity will be the integer that uniquely identifies the Entity creating the content. The user will enter text for the title such as "Bad item—do not buy" and enter more text in the comments section. Also the user will enter a valid number in the rating field. The OWS will be populated with the unique number that identifies the website who is the OWS of the user. Rules of the data structure will be enforced. An example of a rule is the title cannot contain more than fifty characters. There may also be a limit of generating a maximum of one item review instantiated data structure for each creating entity for any one particular item. However, the rule may also indicate that a creating entity may generate a different item review instantiated data structure for a different item. An IRIDS may also be referred to as a review.

An ID is a field type that is defined as a string usually containing integers, but also may contain characters, that is used to uniquely identify a specific instance among a group. If an ID is to only contain integers, the field type will be defined as an integer field. An example of an ID is if there are ten items in an item catalog, each item will be assigned a unique string in the ID field so that each item can be uniquely identified. All instantiated data structure, such as an item will have an ID to uniquely identify it. The ID is useful when persisting an instantiated data structure to storage or retrieving from storage as is well known in the art.

Figure 58:
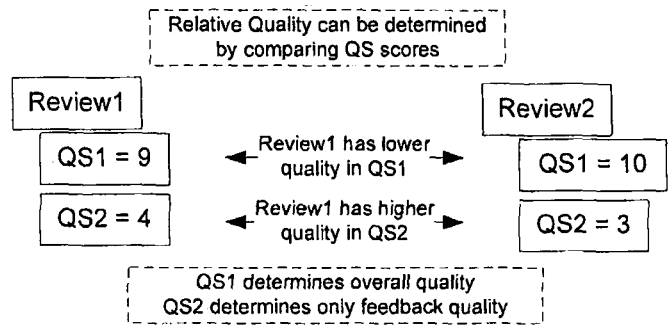
FIG. 58 illustrates a quality comparison between two item reviews in the review management system in accordance with an exemplary embodiment.

Each instantiated data structure has a unique ID (IDSID) that identifies the instantiated data structure uniquely among other instantiated data structure of the same type. For example, each item review instantiated data structure has a unique IDSID among other item review instantiated data structure. However, it is not necessary to have a unique IDSID across different types of instantiated data structure. The IDSID is also used to persist data so that each instantiated data structure can be identified when retrieving and working with persisted data. FIG. 58 illustrates persisting data using IDSID. As described above, any field whose name ends with ID will be defined as an ID. For example, the field itemID is an ID field that contains a unique integer. The itemID field may be used in an IT to persist the IT to the database.

Figure 59:
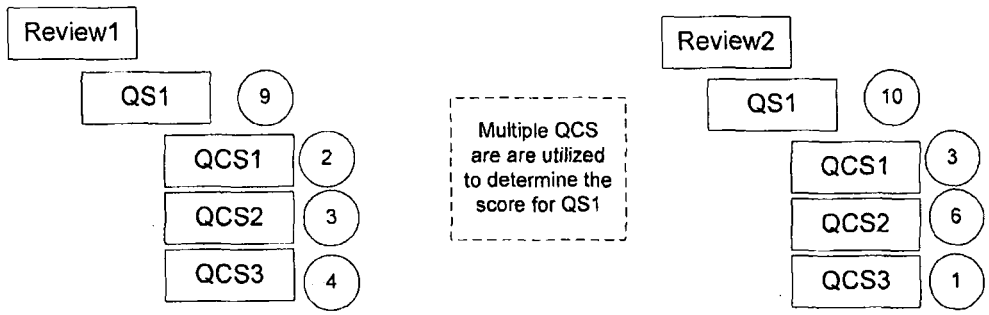
FIG. 59 illustrates scoring for a Quality Scores in the review management system in accordance with an exemplary embodiment.

FIG. 59 illustrates associating instantiated data structures employed with the RMS 10. Certain types of instantiated data structure can be associated with one or more other IDS. An instantiated data structure (for example IDS1) is said to be associated with another IDS (IDS2) if IDS1 contains a reference to IDS2. And the aforementioned referenced instantiated data structure is said to be the Target instantiated data structure. In the earlier example, IDS2 is the Target instantiated data structure of IDS1.

As described herein, generated content refers to either internally generated content (IGC) or externally generated content (EGC). EGC refers to an instantiated data structure that is generated by an external entity in the RMS 10. In one example, EGC is user generated content.

An instantiated data structure that is generated or acquired by the RMS 10 and utilized in the RMS 10 is referred to as IGC. The creating entity of IGC is the RMS 10. IGC may be distributed throughout the RMS 10 alongside other types of instantiated data structures. The RMS 10 may have many methods and mechanisms to generate IGC that will co-exist with other instantiated data structures (such as EGC) and may also be distributed throughout the RMS 10.

IGC may be based on the same data structure that EGC is based on. System functionality and business rules for EGC and IGC that are based on the same data structure may be the same or similar, but may also differ significantly as well.

User-Generated Content (UGC) can refer to an instantiated data structure that is generated by a user (creating entity is a user) in the RMS 10. User generated content is a type of EGC.

Below are some examples of IDS that can be employed with the RMS 10. There are many types of content that can be utilized in RMS. The following are some IDS types:

IT—an instantiated data structure that represents an item. An IT may also be referred to as an item in an item catalog. Items are normally contained with an item catalog.

ICAT—an instantiated data structure that represents an item category in the item catalog.

Feedback DS (FDS) and Feedback IDS (FIDS)—an FDS is a data structure that contains fields of Associated IDSID (AIDSID—represents a particular instantiated data structure that the FIDS is providing feedback information for), rating, comment, date, creating entity and OWS. A FIDS is an instantiated data structure based on the FDS and is a instantiated data structure that is intended to allow feedback on any instantiated data structure including other FIDS. An example of a FIDS is where an FIDS is generated by an external entity to indicate that an IRIDS is useful and the external entity selects a rating of 4 (out of 5) for the IRIDS and provides a comment of "useful information". An FIDS can also be referred to as feedback.

Quality can be determined in the RMS 10 for various types of content such as an IT, item reviews and others). In one embodiment, quality can be determined for content in RMS as follows. Content can have one or more Quality Scores (QS). The QS for content can indicate the quality level for said content by indicating a score. By comparing corresponding QS scores a relative quality level can be determined among multiple content. One or more QS is possible for each type of content and the calculation of a QS score can differ based on the type of content for which said score is calculated.

Figure 62:
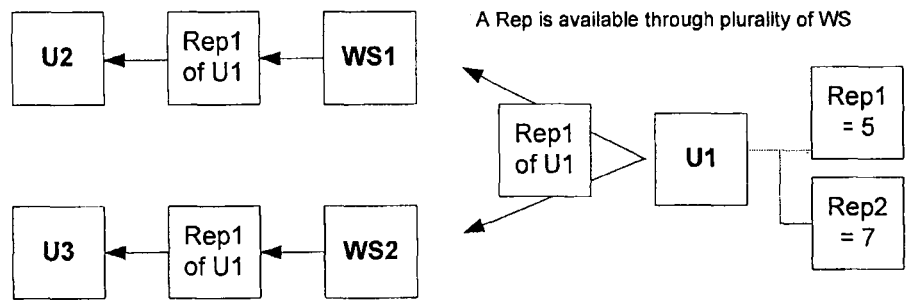
FIG. 62 illustrates reputations being available via a plurality of websites in the review management system in accordance with an exemplary embodiment.

In FIG. 62, quality comparison between two (2) item reviews is shown. Review1 has a higher quality for feedback but a lower quality overall when compared to Review2. The multiple quality comparisons are accomplished by utilizing multiple QS for each item review.

Figure 63:
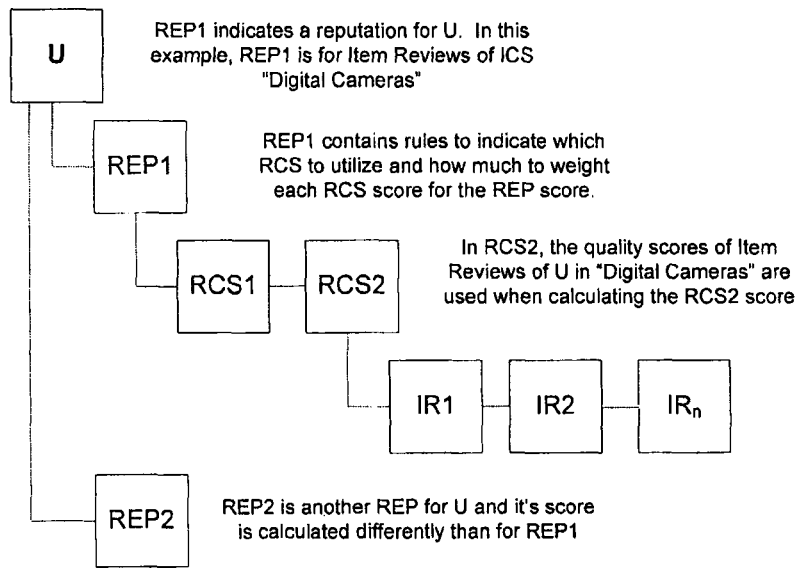
FIG. 63 illustrates an example of how a reputation can be implemented in the review management system in accordance with an exemplary embodiment.

The QS score is calculated based on one or more Quality Contributing Scores (QCS). If there is more than one QS associated with the same content then each QS will differ in how the score for each is calculated. For example, it is possible to have a QS that utilizes all QCS to generate its score or a QS that utilizes a subset of QCS for calculating its score. The scoring for a QS can be extensively configured in the RMS 10 by utilizing one or more QCS as shown in FIG. 63.

The QCS can be a score calculated for one or more types of IDS and there can be more than one QCS contributing to the score of a QS. In one example, a QCS is calculated based on the average of the scores in associated FIDS (feedback on item reviews). When calculating a particular QS, the FIDS (or any IDS type) used in the calculation of the QCS for said QS must be associated with the particular content (such as the feedback) to which said QS is associated.

Another example of a QCS is a QCS calculated based on the number of associated UBIDS (User Baskets). By combining the two (2) QCSs (one for UBIDS and one for FIDS) and another QCS, the score for a QS can be calculated.

Figure 64:
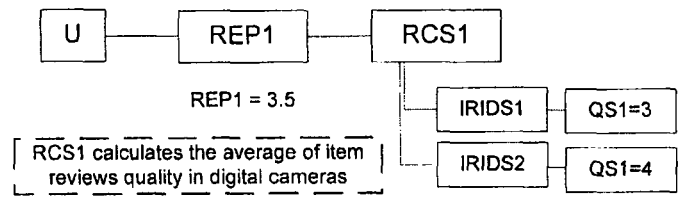
FIG. 64 illustrates a first reputation score equaling 3.5 in the review management system in accordance with an exemplary embodiment.

FIG. 64 shows that QCS1 is calculated using FIDS, whereas QCS3 is calculated using UBIDS. Other examples of what QCS can be calculated based upon are WSSIDS, CE Certifications, Quality Algorithms IDS and others.

Not all associated IDS will necessarily be used in calculating the QCS. For example, only associated FIDS that have feedback scores for specified factors might be used for QCS score. It is to be appreciated that there can be many configurations for the scoring rules of a QCS.

The rules for calculating the score for a QS can vary including specifying which QCS are used for said QS score. The QCS also has rules that are used to calculate its score. In addition, the QS can specify parameters that control how the QCS is calculated. For example, if a QCS allows weighting the contribution to the QCS for individual factors, then the QS of said QCS can specify the weighting for the various parameters. When creating the QS for a specific IT or IRIDS, the relevant factors of said IT or IRIDS are presented so that the weighting rules can be specified.

Example of scoring rules used in a QCS:

Multiply any IDS CE certification value by 3

Utilize only IDS whose CE reputation is greater than 4

Utilize only IDS (feedback) whose OWS is subscribed to ICS of 'Digital Cameras'

Utilize only IDS (feedback) whose relevant factors score at least 3.5

Utilize only IDS (WS stickies) whose WS reputation is above 3 and who are subscribed to ICS of 'Film Cameras'

Utilize only IDS whose OWS reputation is above 4

Utilize only IDS whose (quality algorithm) score is above 7.5

Multiply count of (user baskets) value by 12

One or more scoring rules may be applied and also the scoring rules are optional.

There can be differences for how QS are calculated for IGC and EGC.

The QS can be calculated either in real-time (when said QS is requested or accessed) or at a scheduled time or calculated in intervals. An example of a schedule time is when the QS for all data are calculated at 9 pm every night. Alternatively, the QS may be calculated at some time interval (e.g., hourly) or when the QS is requested.

A QAIDS calculates a score based on an algorithm (algorithm is specified in corresponding QADS) for an IDS and is associated with said IDS. Many IDS may have associated QAIDS. If the algorithm used in a QAIDS is the same for two or more QAIDS, then the relative quality between the associated IDS of the various QAIDS can be determined by comparing the QAIDS scores. Multiple QAIDS can be generated for one IDS as long as the algorithm used in each QAIDS is different.

An IDS may not have a usable QS if there are not enough associated IDS that help generate the QS for said IDS. This may be useful so that enough feedback is received for an IDS before it is compared to other IDS.

Quality is available at a plurality of websites. This is accomplished by displaying the quality score in the RMWD alongside the content for which the reputation is applicable.

Reputation of entities indicates a relative comparison of entities in the RMS 10. The reputation of one entity can be compared with the reputation of another entity to indicate which entity is better or worse or whether the entities are equal in context to what said reputations are measuring.

Figure 65:
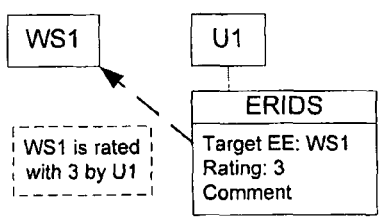
FIG. 65 illustrates an example of a first user rating a first website with a 3 in the review management system in accordance with an exemplary embodiment.

Any EE in the RMS 10 may have one or more reputations. For example, a U, WS and ADV may have reputations. An example of more than one reputation for an EE (any external entity) is a user having an item reviews reputation and also having a feedback reputation. The item reviews reputation indicates the reputation calculated by utilizing the quality ratings of item reviews that the user generated and the feedback reputation is a reputation calculated by utilizing the quality ratings of feedback content that the user generated. See, for example, FIG. 65.

Figure 66:
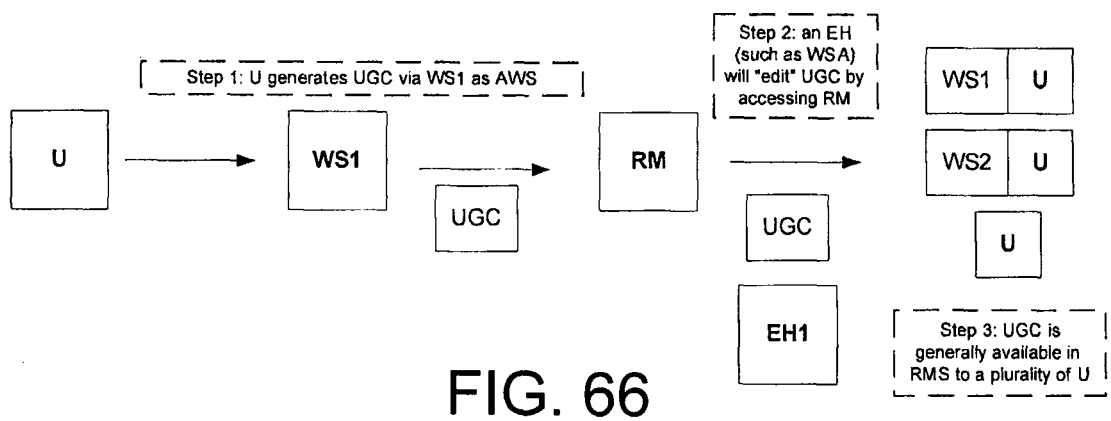
FIG. 66 illustrates an example overview of editing functionality in the review management system in accordance with an exemplary embodiment.

Reputations in the RMS 10 can be generally available via a plurality of websites WS (see, for example, FIG. 66). This is accomplished by displaying the reputation score in the RMWD alongside the entity for which the reputation is applicable.

Reputations can be represented in the RMS by utilizing a Reputation IDS (REPIDS or REP) that contains an ID of the EE (EEID) for which said REP is relevant. There may be more than one REP for one EE. A REP contains a description and a score representing the reputation score. Also an REP contains rules that determine how the REP score is calculated. A REP can be the target IDS of one or more Reputation Contributing Scores (RCS).

Figure 67:
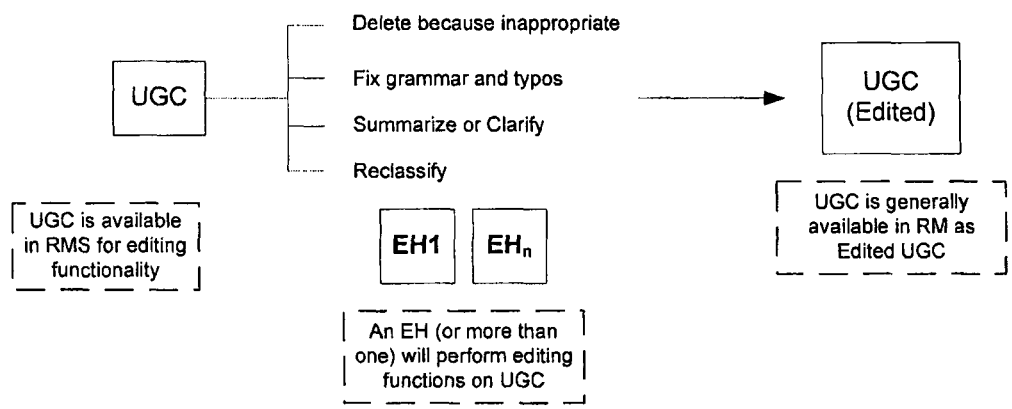
FIG. 67 illustrates an example overview of editing functionality being implemented in the review management system in accordance with an exemplary embodiment.

An RCS is an IDS that contains rules, a score and is associated with other IDS that determine the score of said RCS. For example, an RCS may have rules that indicate which IDS is to analyze to determine the RCS score. An RCS may also contain parameters that can be set to control the rules and algorithms used in said RCS to determine the RCS score. When a REP utilizes an RCS, the EEID is passed to the RCS for use when the RCS calculates the RCS score. An example is to use the EEID to get all Item Reviews that the EE generated and then to use the quality scores of the reviews to generate the RCS score. If more than one RCS is used in a REP, the rules for utilizing each RCS score are configured in the REP. See, for example, FIG. 67 for an example of how a REP can be implemented.

CT that the EE generated (EE is CE of CT) is analyzed to determine the quality ratings (the QS) in each. The quality ratings are used to as a component of an RCS score and thus affect the REP score. For example to generate a REP for a user, an RCS score is composed of the average score of the QS of all item reviews (IRIDS) generated by said user in ICS of Digital Cameras. See, for example, in FIG. 68, REP1 is equal to 3.5 because the user generated two (2) item reviews in Digital Cameras and the QS for the items reviews was, respectively, 3 and 4 (average is 3.5).

The feedback for a target EE received from other EE are utilized to determine the reputation of target EE. Such feedback can be captured by an Entity Review IDS (ERIDS). For example, in FIG. 69, U1 (a first user) rated WS1 with a 3.

Certifications for EE are also components utilized in the REP of said EE. By a plurality of Certifications from a plurality of WS, the REP can be affected similar to how ERIDS affect the REP.

The reputation for EE that is received from other system can also be used in calculating the REP for said EE in RMS. An RCS can be configured to utilize the external ratings of an EE for its calculations and by utilizing said RCS, the reputations from other systems can be incorporated into RMS.

Editing features are such that a website (WS) will be able to perform editing functions on content that is generated via said WS (WS is AWS). In addition, the WS may also perform editing functions on content that is not generated at the WS as well. Content such as UGC (user generated content) that is subject to Editing may or may not be generally available in the RM system 10 until Editing has completed for said content. Optionally, if editing is not timely performed for content then said content may become generally available in the RM system 10 after a set time limit expires.

The WSA will be one Entity who may perform editing functions on behalf of the WS. In the case that editing functionality is activated for a WS, the WSA of said WS becomes an Editor Helper (EH) in the RM system 10 in order that said WSA may perform editing functions for WS. FIG. 70 shows an overview of the editing functionality according to one exemplary embodiment.

Editing Examples include but are not limited to:

EH deletes content determined to be inappropriate or not useful.

EH makes spelling and other typographical improvements to content.

EH summarizes lengthy content.

EH asks the CE of content to clarify content.

To initiate the Editing features available to a WS, a WSA selects an option to Edit content that is generated at the WS in the account screens for the WS. Thereafter, an EH of said WS will be able to perform editing functions for said WS.

Periodically, an EH will log into RMS and go to an Editing section. Here the EH will see UGC that is available for Editing for said EH. For example, if a EH is associated with a WS, then the EH will see content that was generated at the WS such as a item review. For each UGC (such as the item review), there are several options (options are shown as follows for illustration but the options are not limited by those listed here):

1. Mark as Inappropriate (may be deleted later, if CE does not fix)
2. Mark as Need Clarification
3. Re-Classify Content to another IT, ICAT or ICS
4. Add Target Consumption information
5. Add Clarification text
6. Other Editing Options . . .
7. Editing Approval If the EH completes editing on content, for example by selecting option "Editing Approval," then said content is released for general availability in the RM System 10. See FIG. 71, for example to see an exemplary illustration of the editing functionality implementation.

A user may be an EH and reputation of said user increases and decreases based on editing performed by said user similar to how WS performed editing functionality as an EH and generated reputation points.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A distributed network-based review management system, comprising:

A computer to store and interact with the review management system, a review management system having a database that is accessible over an electronic network, said database including a plurality of products, one or more reviews associated with each of said plurality of products, and one or more review/feedback factors associated with each of said one or more reviews;

wherein the review management system allows a website administrator to enroll the access website with the review management system; the website administrator provides an access website to the review management system with information pertaining to the website, wherein the review management system associates the access website with one or more default products, wherein the default products are prioritized and filtered for distribution to the access website;

wherein the information pertaining to the access website consists of a unique identifier, wherein the unique identifier identifies the specific access website that is accessed through the review management system;

wherein each of said one or more review includes review content properties, and wherein said first relevancy profile specifies which of said one or more reviews are relevant reviews or relevant products to be displayed on a first access website based on said review content properties;

said first access website having a first relevancy profile associated therewith that is related to at least one of said plurality of products, said one or more reviews associated with each of said plurality of products, or said one or more review/feedback factors associated with said each one or more reviews, said first relevancy profile particular to said first access website and applied to any users accessing said review management system through said first access website, said first access website and said review management system configured such that, when said first access website initiates a connection with said review management system over said electronic network, at least one of relevant products from said plurality of products or relevant reviews from said one or more reviews of said database is displayed on a display device, said at least one of said relevant products from said plurality of products of said database or said relevant reviews from said one or more reviews of said database that are displayed on said display device are displayed based on said relevancy profile of said first access website; and at least a second access website having a second access website relevancy profile associated therewith that is related to at least one of said plurality of products, said one or more reviews associated with one of said plurality of products or said one or more review/feedback factors associated with said one or more reviews, said second access website relevancy profile particular to said second access website and applied to any users accessing said review management system through said second access website, said second access website and said review management system configured such that, when said second access website initiates a connection with said review management system over said electronic network, at least one of relevant products from said plurality of products or relevant reviews from said one or more reviews of said database is displayed on a display device, wherein the first or second access website is viewed simultaneously with the review management system, said at least one of said relevant products from said plurality of products of said database or said relevant reviews from said one or more reviews of said database that are displayed on said display device are displayed based on said second access website relevancy profile of said second access website, wherein said first relevancy profile of said first access website is different than said second access website relevancy profile of said second access website.

2. The system of claim 1 wherein that when said relevant items and relevant reviews are displayed, said relevant items and said relevant reviews are based on a said relevancy profile associated with said identifier.

3. The system of claim 1 wherein sad access website initiates said connection with said review management system also to avow user to add additional reviews to said one or more reviews of said database and add additional review/feedback factors to said one or more review/feedback factors of said database.

4. The system of claim 1 wherein said access website initiates said connection with said review management system also to allow user to modify said one or more reviews of said database.

5. The system of claim 1 wherein a said relevancy profile associated with said identifier specifies which of said plurality of items are relevant items and said relevant reviews are those of said one or more reviews that are associated with said relevant items based on said review/feedback factors.

6. The system of claim 1 wherein a said relevancy profile associated with said identifier specifying which of said plurality of items are relevant items includes at least one of identifying a list of said plurality of items, prioritizing said plurality of items, or filtering said plurality of items.

7. The system of claim 1 wherein each of said one or more items includes item content properties, and wherein a said relevancy profile associated with said identifier specifies which of said one or more items are relevant items based on said item content properties.

8. The system of claim 7 wherein said item content properties include at least one of: item specifications, item text length, user interaction data and user interaction originating information.

9. The system of claim 1 wherein a said relevancy profile associated with said identifier specifies which of said one or more reviews are relevant reviews based on said one or more review/feedback factors associated with each of said one or more reviews.

10. The system of claim 9 wherein a said relevancy profile associated with said identifier specifying which of said one or more reviews are relevant reviews includes at least one of identifying a list of said one or more reviews, prioritizing said one or more reviews, or filtering said one or more reviews.

11. The system of claim 1 wherein each of said one or more reviews includes review content properties, and wherein a said relevancy profile associated with said identifier specifies which of said one or more reviews are relevant reviews or relevant items based on said review content properties.

12. The system of claim 11 wherein said review content properties include at least one of: specified keywords, review text length, an author rating related to a reputation or certification of an author of a review, an origin rating related to a reputation or certification of an originating website from where a particular review originated, user interaction data and user interaction originating information.

13. The system of claim 12 wherein each of said one or more reviews includes at least one of an author rating and an origin rating, and wherein a said first relevancy profile associated with said identifier specifies which are relevant reviews or relevant items based on said at least one of said author rating and said origin rating, and wherein said author rating relates to a reputation or certification of an author of a review and said origin rating relates to a reputation or certification of an originating website from where a particular review originated.

14. The system of claim 1 further including: an originating website having an origin rating, said originating website implementing a said review management web document to avow user to add said one or more reviews, each of said one or more reviews added on said originating website having said origin rating of said originating website, and each of said one or more reviews being displayed with said origin rating or a hyperlink to said originating website.

15. The system of claim 1 wherein a said relevancy profile associated with said identifier is based on or altered by at least one of said one or more reviews or said one or more review/feedback factors.

16. The system of claim 12 wherein said review content properties include said origin rating related to said reputation or certification of said originating website from where said particular review originated, said user interaction data and said user interaction originating information.

17. The system of 13 wherein said author rating and said origin rating relate to one another such that said author rating changes a corresponding origin rating and an origin rating changes a corresponding author rating.

18. A distributed network-based review management method, comprising:
   a review management system having a database that is accessible over an electronic network, said database including a plurality of products, one or more reviews associated with each of said plurality of products, and one or more review/feedback factors associated with each of said one or more reviews;
   wherein the review management system allows a website administrator to enroll the access website with the review management system; the website administrator provides an access website to the review management system with information pertaining to the website,
   wherein the review management system associates the access website with one or more default products, wherein the default products are prioritized and filtered for distribution to the access website;
   wherein the information pertaining to the access website consists of a unique identifier, wherein the unique identifier identifies the specific access website that is accessed through the review management system;
   wherein each of said one or more review includes review content properties, and wherein said first relevancy profile specifies which of said one or more reviews are relevant reviews or relevant products to be displayed on a first access website based on said review content properties;

said first access website having a first relevancy profile associated therewith that is related to at least one of said plurality of products, said one or more reviews associated with each of said plurality of products, or said one or more review/feedback factors associated with said each one or more reviews, said first relevancy profile particular to said first access website and applied to any users accessing said review management system through said first access website, said first access website and said review management system configured such that, when said first access website initiates a connection with said review management system over said electronic network, at least one of relevant products from said plurality of products or relevant reviews from said one or more reviews of said database is displayed on a display device, said at least one of said relevant products from said plurality of products of said database or said relevant reviews from said one or more reviews of said database that are displayed on said display device are displayed based on said relevancy profile of said first access website; and at least a second access website having a second access website relevancy profile associated therewith that is related to at least one of said plurality of products, said one or more reviews associated with one of said plurality of products or said one or more review/feedback factors associated with said one or more reviews, said second access website relevancy profile particular to said second access website and applied to any users accessing said review management system through said second access website, said second access website and said review management system configured such that, when said second access website initiates a connection with said review management system over said electronic network, at least one of relevant products from said plurality of products or relevant reviews from said one or more reviews of said database is displayed on a display device, wherein the first or second access website is viewed simultaneously with the review management system, said at least one of said relevant products from said plurality of products of said database or said relevant reviews from said one or more reviews of said database that are displayed on said display device are displayed based on said second access website relevancy profile of said second access website, wherein said first relevancy profile of said first access website is different than said second access website relevancy profile of said second access website.

19. The method of claim 18 further including: modifying said relevancy profile for said access website from at least a second access website access website.

20. The method of claim 18 wherein website administration is enabled on said database to allow alteration of said user account through a website.

21. The method of claim 18 wherein website administration is enabled on said database to allow alteration of said relevancy profile by one or more of said at least two access websites through review management system.

22. The system of claim 16 wherein a said relevancy profile associated with said identifier is altered by at least one of said one or more reviews or said one or more review/feedback factors.

23. The system of claim 17 wherein each of said one or more reviews includes review content properties, and wherein said relevancy profile specifies which of said one or more reviews are relevant reviews or relevant products to be displayed on said accessed on of said at least two access websites based on said review content properties, and wherein said review content properties include at least one of: specified keywords, review text length, an author rating related to a reputation or certification of an author of a review, an origin rating related to a reputation or certification of an originating website from where a particular review originated, user interaction data and user interaction originating information, and further wherein said review content properties include said origin rating related to said reputation or certification of said originating website from where said particular review originated, said user interaction data and said user interaction originating information, and wherein said relevancy profile is altered by at least one of said one or more reviews or said one or more review/feedback factors.

* * * * *